United States Patent [19]
Yokota et al.

[11] Patent Number: 5,552,948
[45] Date of Patent: Sep. 3, 1996

[54] DISK DRIVE HAVING A LIFTING MEMBER

[75] Inventors: Yuji Yokota; Akio Hoshi, both of Chichibu, Japan

[73] Assignee: Canon Denshi Kabushiki Kaisha, Saitama, Japan

[21] Appl. No.: 277,297

[22] Filed: Jul. 22, 1994

Related U.S. Application Data

[63] Continuation of Ser. No. 813,381, Dec. 27, 1991, abandoned.

[30] Foreign Application Priority Data

| Dec. 28, 1990 | [JP] | Japan | 2-417029 |
| Jan. 8, 1991 | [JP] | Japan | 3-011465 |
| Jan. 8, 1991 | [JP] | Japan | 3-011466 |
| Feb. 5, 1991 | [JP] | Japan | 3-035491 |
| Apr. 12, 1991 | [JP] | Japan | 3-079933 |
| Apr. 12, 1991 | [JP] | Japan | 3-079937 |
| Apr. 12, 1991 | [JP] | Japan | 3-079938 |

[51] Int. Cl.$^6$ .............................. G11B 5/54; G11B 21/22
[52] U.S. Cl. ........................................................... 360/105
[58] Field of Search .................... 360/105, 99.02, 360/99.03, 99.06, 99.07; 369/77.2

[56] References Cited

U.S. PATENT DOCUMENTS

| 4,604,666 | 8/1986 | Kitahara et al. | 360/105 |
| 4,750,065 | 6/1988 | Masaki et al. | 360/99.02 |
| 5,196,975 | 3/1993 | Inoue | 360/105 |

FOREIGN PATENT DOCUMENTS 2-161680   6/1990   Japan.

*Primary Examiner*—Robert S. Tupper
*Attorney, Agent, or Firm*—Spencer & Frank

[57] ABSTRACT

A disk drive for recording data on and/or reproducing data from a disk including a base provided with a top opening and a front opening, a cassette guide member housed in the base, the cassette guide member being supported so as to be freely movable upward and downward between an upper position, where the disk is to be installed on or removed from the disk driver, and a lower position, where the disk is to be loaded at a predetermined loading position, a head unit housed in the base and having a head for recording data on and/or reproducing data from the disk, and a head arm having first and second end portions, the first end portion supporting the head, a carriage supporting the second end portion of the head arm on one end thereof, a lifting mechanism provided on the cassette guide member for elevating and lowering the head arm, the lifting mechanism comprising an upper surface of the cassette guide member, and a resilient member connected on one end thereof to the head arm and on another to the carriage, the head being movable upward and downward relative to the carriage. The head arm has a lifter portion having a contact surface, the contact surface contacting the upper surface of the cassette guide member and controlling an angle of the head arm relative to the cassette guide member when the head arm is moved to the upper position by the lifting mechanism.

16 Claims, 49 Drawing Sheets

K > M

DISK DRIVE HAVING A LIFTING MEMBER

This application is a Continuation of application Ser. No. 07/813,381, filed Dec. 27, 1991, now abandoned.

BACKGROUND OF THE INVENTION

1. Field of the Invention

The present invention relates to a disk drive for recording data on or reproducing data from a disk such as a floppy disk or a rigid disk, and more particularly to a disk drive preferably used as an external storage of electronic apparatus such as personal computers, word processors or the like.

2. Description of the Prior Art

Disk drives carry out recording to or reproducing from disk-shaped recording media such as magnetic disks, laser disks or the like. The disk drive is constructed to perform recording to or reproducing from a disk as follows: a disk, the recording medium, is inserted into the disk drive and is ejectably loaded thereto; the disk is rotated by a driving motor; heads are made to contact or made to approach a surface of the disk; and writing data on or reading data from the disk is carried out while the heads are moving. In this case, the heads are mounted on a carriage which is moved by a driving motor, so that the heads are moved on the disk in the radial direction (seek operation). An example of the disk drive is shown in Japanese Patent Application Laying-open No. 161,680/1990 (U.S. Ser. No. 07/392,045).

The disk drive comprises, on a base that supports respective component parts of the disk drive, an installation and removal means for installing or removing the disk, a disk rotation drive means for rotating the disk by a motor, a head seek means for moving heads on the disk in the radial direction to position the heads on a target track, a head loading means for loading or unloading the head to or from the disk, and the like. In addition, there are provided a control circuit for controlling the entire disk drive, and a connector for a power supply. The control circuit is connected to a host computer system via an interface so that the control circuit receives data from and supplies data to the host computer system.

In general, the installation and removal means includes a cassette guide that supports a disk cassette in which the disk is housed, and guides the disk cassette into the disk drive so as to install it on the disk rotation drive means and guides the disk cassette out of the disk drive so as to remove it from the disk rotation drive means, a slide plate that has a cam portion which engages a part of the cassette guide to lower or raise it, and is movable in directions in which the disk cassette is installed or removed, a latch member that controls an ejection of the disk cassette in response to the movement of the slide plate. The disk drive has a shutter opening means for opening a shutter of the disk cassette by engaging the shutter in accordance with the installation of the disk cassette. The shutter opening means has an arrangement such that the latch member functions also as an engaging member which engages the shutter, or alternatively, an arrangement in which is used a shutter lever having an engaging member that is rotatably supported on the cassette guide and can engage the shutter.

The aforementioned components of the disk drive are housed in the base which is shaped like a box, the opening of which is covered by a cover for forming a dustproof and magnetic shield.

When such disk drives are used as external storage for electronic apparatus such as personal computers or word processors, they are sometimes constructed as independent apparatus. In general, however, they are incorporated into the main bodies of the electronic apparatus. As the electronic apparatus are reduced in size and increased in portability, a reduction in size and weight and an increase in the portability of the disk drives are increasingly required.

In the conventional disk drive, at an upright portion, is provided a cam portion of a slide plate. The upright portion overlaps an outer surface of a side wall of the cassette guide. As a result, the base for housing the components of the disk drive needs extra space for the overlapping of the upright portion with the outer surface of the side wall of the cassette guide. This presents a problem in that the width of the disk drive becomes large, and hence it is hard for the disk drive to be made small. Additionally, in the conventional disk drive, a cam mechanism for raising or lowering the cassette guide is disposed in substantially the same horizontal plane in which the disk cassette is placed. With this arrangement, it is also hard for the disk drive to be made small.

Further, in the head loading means used in the conventional disk drive, the head is attached to the head arm which is rotatable around a fulcrum on the carriage. As a result, when the head is unloaded upon ejection, the head arm is elevated approximately linearly at an angle starting from the fulcrum. This causes a problem in that the tip portion of the head arm reaches a considerable height when the head arm is elevated, or in that the height of an upper end of a head unit including the head arm becomes considerably large, which requires an increase in the height of the inner space of the disk drive and accordingly an increase in the thickness or height of the disk drive in order to eliminate contact between the head unit and the inside of the disk drive.

A proposal could be made to attach the head arm to the carriage through a leaf spring or the like in order to decrease the angle of inclination of the head arm to be as small as possible or until the head arm becomes horizontal giving the advantage of a deflection effect of the leaf spring. However, this would be insufficient since the use of the leaf spring alone for supporting the head arm is based fundamentally on swinging action. Hence not only the height of the tip of the head arm must necessarily be larger in order to keep a predetermined gap between the head and the inner surface of the case of the disk drive, but also it becomes difficult to stably control the height and angle of the tip of the head arm. As a result, the uppermost position of the head unit at its highest portion is also unstable. Therefore, it is necessary to set up the height of the disk drive to a sufficiently large value with allowance, which is contradictory to the compactness of the disk drive.

A conventional approach could be adopted in which the head arm is attached to the carriage through a leaf spring or the like, and a stopper for controlling the uppermost height of the head arm is provided. However, the provision of such a stopper results in the production of an abrasion dust due to frictional sliding between the head arm and the stopper as a result of movement (seeking) of the head unit which occurs even in a head unloaded state (in a raised state). The dust invades the inside of the disk cassette through its head accepting aperture to cause the possibility of damaging the recording medium held in the disk cassette.

In addition, in the conventional disk drive, a cover of a uniform thickness is fitted on an open end of the base, which inevitably increases the thickness or height of the disk drive by the thickness of the cover itself. This not only makes it difficult to make for compactness of the disk drive but also gives rise to the possibility of causing distortion in the base because the cover should be detached every time inspection of the inside, or exchange or adjustment of the parts of the disk drive is performed. As a result, adverse influences on the reliance of the disk drive could result and it would be troublesome to perform such an adjustment or the like.

SUMMARY OF THE INVENTION

Therefore, it is a primary object of the present invention to provide a disk drive which is compact and light in weight.

Another object of the present invention is to provide a disk drive with a simple construction and having a decreased total height (thickness) in which the height of the head arm is stabilized and sufficiently small when the head is raised.

Still another object of the present invention is to provide a disk drive which is not only compact but also can effectively prevent the invasion of abrasion dust and the like into the inside of the disk drive.

Yet another object of the present invention is to provide a disk drive which is easy to handle and has a reduced thickness or width, allowing easy inspection of the head unit or exchange of parts of the disk drive.

Further, an object of the present invention is to provide a disk drive having a restricted width of the cassette guide and the slide plate or the like.

In the first aspect of the present invention, a disk drive for recording data on and/or reproducing data from a disk comprises:

a base provided with a top opening and a front opening;

a cover detachably connected to the base for covering the top opening of the base;

a front panel connected to the base, the front panel being formed with a cassette insertion aperture;

a guide member housed in the base, the guide member supporting the disk during installation or removal of the disk to or from the disk drive;

a head unit housed in the base and having a magnetic head for recording data on and/or reproducing data from the disk, and a head arm having first and second end portions, the first end portion supporting the magnetic head;

a carriage supporting the second end portion of the head arm on one end thereof;

a moving means for elevating and lowering the head arm, the moving means being operatively connected to the guide member; and a resilient connector connected on one end thereof to the head arm and on another to the carriage so that the head arm is supported movable up and down;

wherein the head arm has a lifter portion having a contact surface which contacts the guide member when the head is in an unloaded state, the contact surface of the lifter portion having a predetermined width in a longitudinal direction of the resilient connector.

Here, the contact surface of the lifter portion may have a pair of protrusion, the protrusions being spaced apart at a predetermined distance in a longitudinal direction of the resilient connector.

The head arm may have an upper surface substantially parallel to the contact surface of the lifter portion. In the second aspect of the present invention, a disk drive for recording data on and/or reproducing data from a disk comprises:

a base provided with a top opening and a front opening;

a cover detachably connected to the base for covering the top opening of the base;

a front panel connected to the base, the front panel being formed with a cassette insertion aperture;

a guide member housed in the base, the guide member supporting the disk during installation or removal of the disk to or from the disk drive;

a head unit housed in the base and having a magnetic head for recording data on and/or reproducing data from the disk, and a head arm having first and second end portions, the first end portion supporting the magnetic head;

a carriage supporting the second end portion of the head arm on one end thereof;

a moving means for elevating and lowering the head arm, the moving means being operatively connected to the guide member; and a resilient connector connected on one end to the head arm and on another to the carriage so that the head arm being supported movable up and down;

wherein the head arm and the cover have respective contact portions at which the head arm and the cover slidably contact each other so that an uppermost height of the head unit can be restricted.

Here, one of the contact portions of the cover and the head arm may have a stopper portion.

The contact portions of the cover and the head arm may be situated at positions remote outwardly from the head accepting aperture.

In the third aspect of the present invention, a disk drive for recording data on and/or reproducing data from a disk comprises:

a base provided with a top opening and a front opening;

a cover detachably connected to the base for covering the top opening of the base;

a front panel connected to the base, the front panel being formed with a cassette insertion aperture;

a guide member housed in the base, the guide member supporting the disk during installation or removal of the disk to or from the disk drive;

a head unit housed in the base and having a magnetic head for recording data on and/or reproducing data from the disk, and a head arm having first and second end portions, the first end portion supporting the magnetic head;

a carriage supporting the second end portion of the head arm on one end thereof;

a moving means for elevating and lowering the head arm, the moving means being operatively connected to the guide member; and a resilient connector connected on one end thereof to the head arm and on another end thereof to the carriage so that the head arm being supported movable up and down;

wherein the cover is formed with an opening in a region corresponding to the head unit, and wherein the disk drive has a cap having a thickness smaller than the cover, the cap being detachably fitted to the opening.

Here, the cap may have a concave at its inner surface corresponding to the head arm.

In the disk drive according to the first, second and third aspects of the invention, the guide member may have a side wall formed with a concave portion and having an outer surface, and the disk drive further comprises:

a slide member having an outer surface and an engage portion which engages with the guide member so as to move the guide member in response to the installation or the removal of the disk, with the engage portion being disposed in the concave portion formed in the side wall of the guide member, with the outer surface of the side wall of the guide member being substantially coplanar with the outer surface of the side wall of the slide member.

The engage portion may be an upright portion which is formed at a side end portion of the slide plate, and at which a cam slot for fitting with a pin provided at the guide member is formed.

The engage portion may be an upright plate which is formed at a side end portion of the slide plate, and at an upper portion of which a cam slot for fitting with a pin provided at a top of the guide member, is formed.

The engage portion may engage the guide member at an upper portion of the guide member.

The engage portion may engage the cam slot at an upper portion of the guide member.

In the fourth aspect of the present invention, a carriage mechanism for a floppy disk drive, comprises:

a carriage;

a first head mounted on the carriage;

a head arm connected to the carriage with a resilient member;

a second head supported by the head arm and opposing the first head; and a moving means for moving the head arm up and down;

wherein the moving means holds the head arm so that the first and second heads are substantially parallel to each other and spaced apart at a predetermined distance from one another when the head arm is elevated.

In the fifth aspect of the present invention, a carriage mechanism for a floppy disk drive, comprises:

a carriage;

a first head mounted on the carriage;

a resilient member having a first end and a second end, the first end being connected to the carriage at a first connection point;

a head arm connected to the second end of the resilient member at a second connection point;

a second head supported on the head arm, the second head opposing the first head; and a moving means for moving the head arm up and down;

wherein the moving means urges the head arm at a position between the first and second connection point when the head arm is elevated.

In the sixth aspect of the present invention, a carriage mechanism for a floppy disk drive, comprises:

a carriage;

a first head mounted on the carriage;

a resilient member having a first end and a second end, the first end being connected to the carriage at a first connection point;

a head arm connected to the second end of the resilient member at a second connection point;

a second head supported on the head arm, the second head opposing the first head;

a cassette guide for moving a cassette in which a recording medium is housed to a predetermined position; and a drive member for moving the head arm up and down;

wherein the drive means is operated by a force generated when the cassette is moved, the drive means urging the head arm at a position between the first and second connection point when the head arm is elevated.

Here, the drive member may be provided on the carriage rotatably.

In the seventh aspect of the present invention, a disk drive for recording data on and/or reproducing data from a disk comprises:

a base provided with a top opening and a front opening;

a cover detachably connected to the base for covering the top opening of the base;

a front panel connected to the base, the front panel being formed with a cassette insertion aperture;

a guide member housed in the base, the guide member supporting the disk housing a recording medium therein during installation or removal of the disk to or from the disk drive; and a carriage mechanism having:

a carriage;

a first head mounted on the carriage;

a head arm connected to the carriage;

a second head supported by the head arm and opposing the first head; and a moving means for moving the head arm up and down;

wherein the moving means holds the head arm so that the first and second heads are substantially parallel to each other and spaced apart at a predetermined distance from one another when the arm is elevated; and a resilient connector connected on one end thereof to the head arm and on another to the carriage so that the head arm is supported movable up and down.

In the eighth aspect of the present invention, a disk drive for recording data on and/or reproducing data from a disk comprises:

a base provided with a top opening and a front opening;

a cover detachably connected to the base for covering the top opening of the base;

a front panel connected to the base, the front panel being formed with a cassette insertion aperture;

a guide member housed in the base, the guide member supporting the disk housing a recording medium therein during installation or removal of the disk to or from the disk drive; and a carriage mechanism having:

a carriage;

a first head mounted on the carriage;

a resilient member having a first end and a second end, the first end being connected to the carriage at a first connection point;

a head arm connected to the second end of the resilient member at a second connection point;

a second head supported on the head arm, the second head opposing the first head; and a moving means for moving the head arm up and down;

wherein the moving means urges the head arm at a position between the first and second connection points when the head arm is elevated; and a resilient connector connected on one end thereof to the head arm and on another to the carriage so that the head arm is supported movable up and down.

In the ninth aspect of the present invention, a disk drive for recording data on and/or reproducing data from a disk comprises:

a base provided with a top opening and a front opening;

a cover detachably connected to the base for covering the top opening of the base;

a front panel connected to the base, the front panel being formed with a cassette insertion aperture;

a guide member housed in the base, the guide member supporting the disk housing a recording medium therein during installation or removal of the disk to or from the disk drive; and a carriage mechanism having:
  a carriage;
  a first head mounted on the carriage;
  a resilient member having a first end and a second end, the first end being connected to the carriage at a first connection point;
  a head arm connected to the second end of the resilient member at a second connection point;
  a second head supported on the head arm, the second head opposing the first head;
  a cassette guide for moving a cassette in which a recording medium is housed to a predetermined position; and
  a drive member for moving the head arm up and down; wherein the drive means is operated by a force generated when the cassette is moved, the drive means urging the head arm at a position between the first and second connection points when the head arm is elevated; and
  a resilient connector connected on one end thereof to the head arm and on another to the carriage so that the head arm is supported movable up and down.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1A:
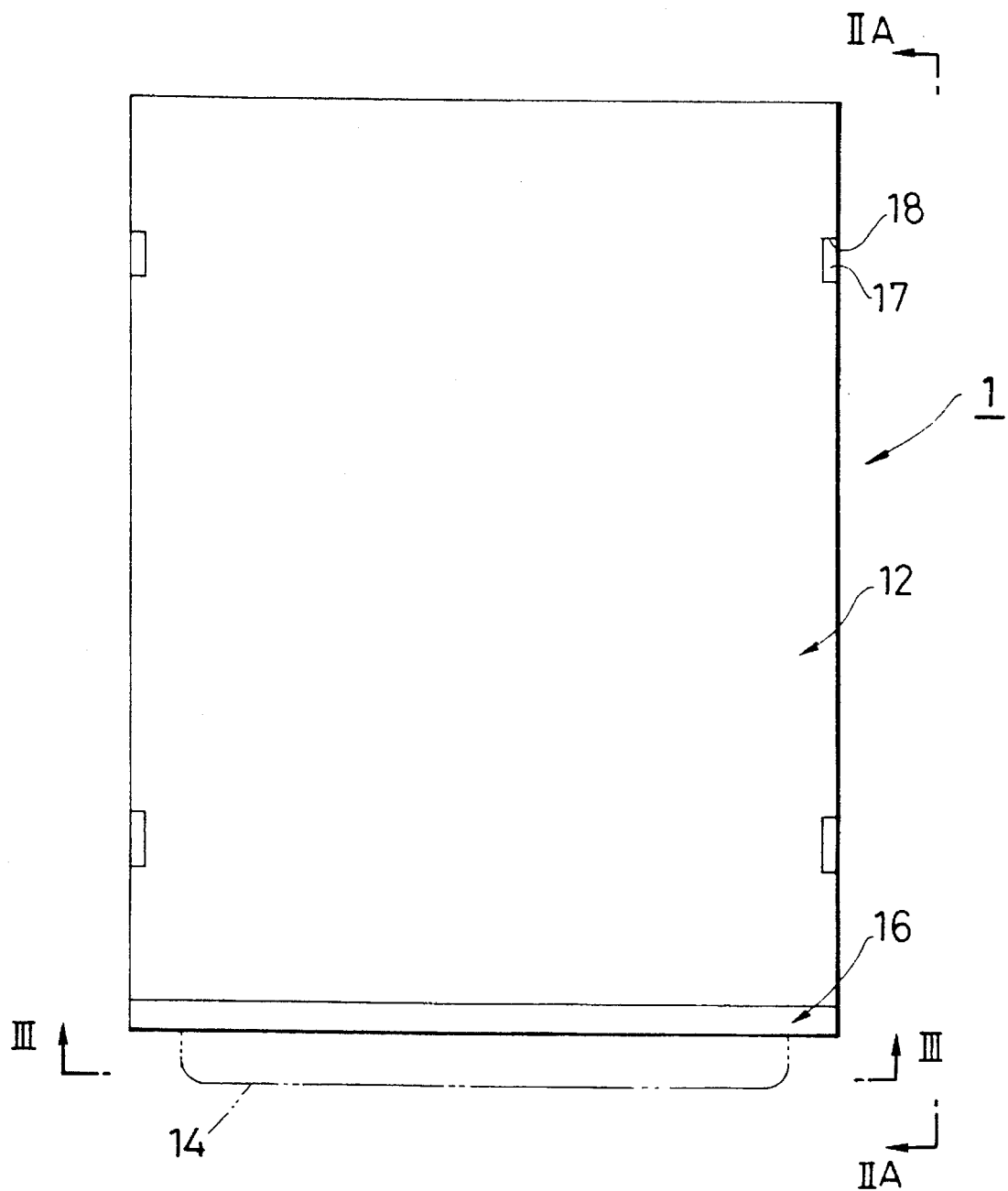
FIG. 1A is a top plan view showing an embodiment of a disk drive in accordance with the present invention.
Figure 1B:
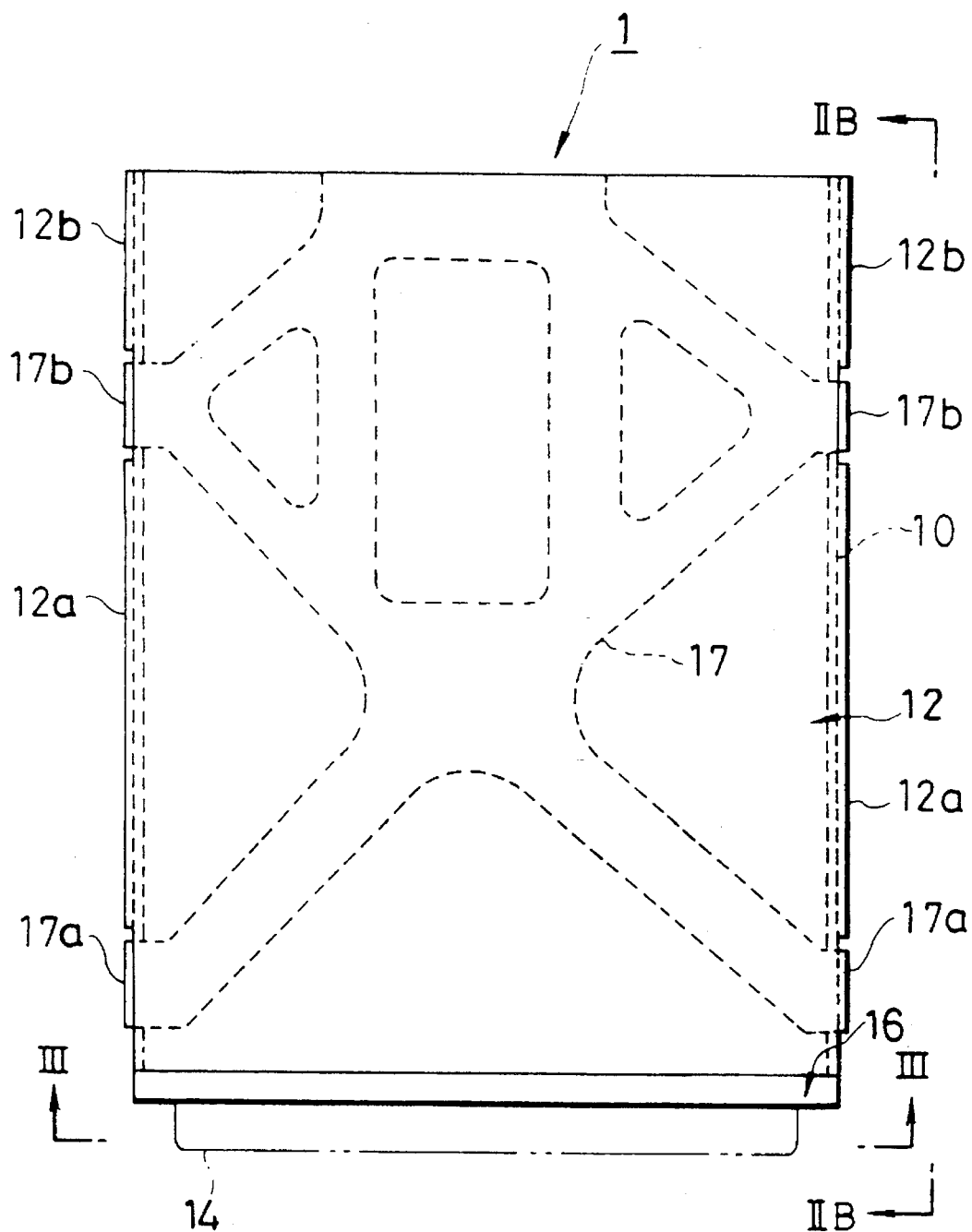
FIG. 1B is a top plan view showing a variation of the disk drive shown in FIG. 1A.
Figure 2A:
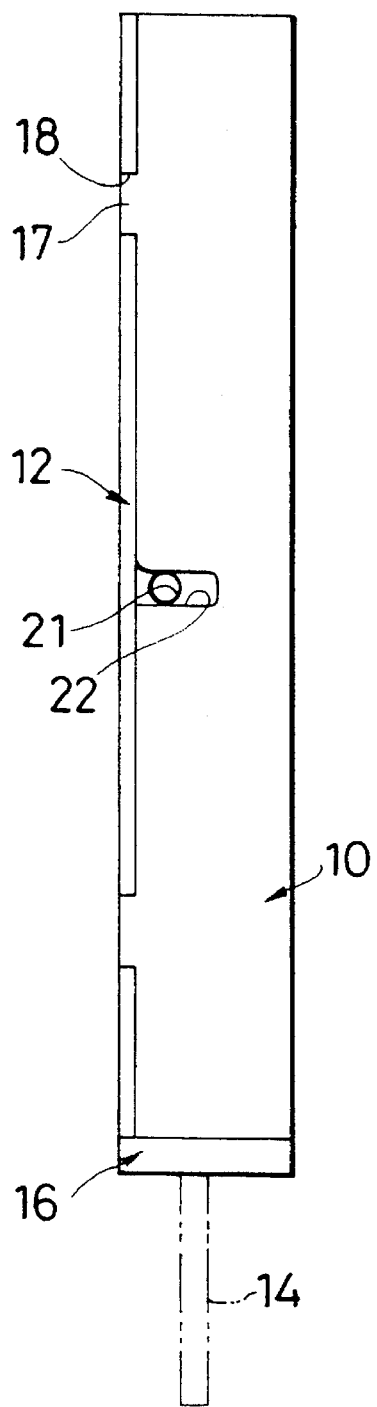
FIG. 2A is a right side view taken along the line $II_A$—$II_A$ of FIG. 1A.
Figure 2B:
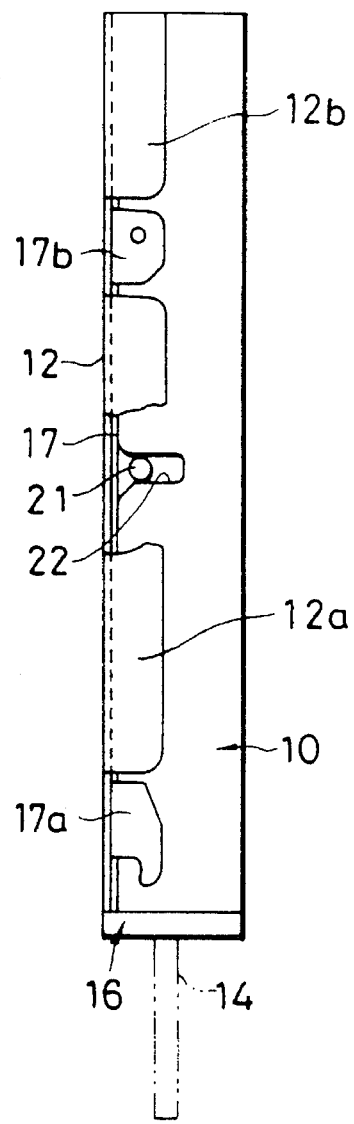
FIG. 2B is a right side view taken along the line $II_B$—$II_B$ of FIG. 1B.
Figure 3:
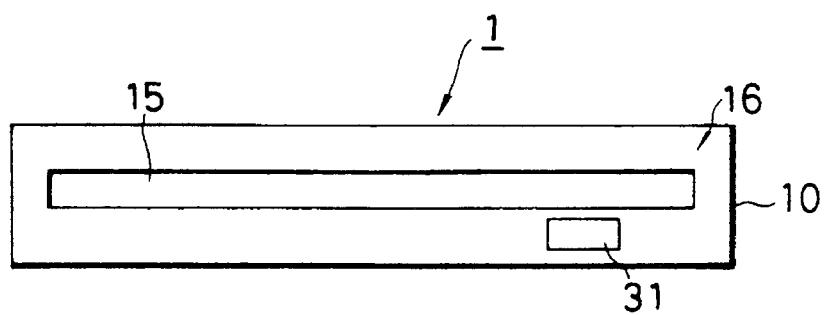
FIG. 3 is a front view taken along the line III—III of FIG. 1A or 1B.

The invention will now be described with reference to the accompanying drawings, in which the same reference numerals designate the same or corresponding parts. First, an example of the entire structure of a disk drive to which the present invention can be suitably applied will be described with reference to FIGS. 1A to 17. FIG. 1A is a top plan view of an embodiment of a disk drive in accordance with the present invention; FIG. 1B is a top plan view of a variation of the disk drive shown in FIG. 1A; FIG. 2A is a right side view taken along the line $II_A$—$II_A$ of FIG. 1A; FIG. 2B is a right side view taken along the line $II_B$—$II_B$ of FIG. 1B; and FIG. 3 is a front view taken along the line III—III of FIG. 1.

In FIGS. 1A, 1B, 2A, 2B and 3, a disk drive 1 has a case composed of a base 10 shaped like a box the top and the front of which are open, and a cover 12 and a front panel 16 which cover these openings. On the top open portion of the base 10 is provided with a reinforcing member 17 and the cover 12 which is disposed at an upper side of the reinforcing member 17. Bent portions 17a and 17b formed at the both side of the reinforcing member 17 are respectively engaged to and screwed on the side face of the base 10, so that the reinforcing member 17 is fixed to the base 10. As a result, a rigidity of the base 10 is ensured. The cover 12 is also fixed to the base 10 with its bent portions 12a and 12b being engaged to the side face of the base 10.

The base 10 and the reinforcing member 17, for example, are made of a metal plate such as an aluminum plate. The cover 12, which functions as a shield against magnetism and dust, is made of a thin plate of nonmagnetic material such as aluminum. At the front of the base 10, there is provided a front panel 16 in which a cassette insertion aperture 15 is formed through which a disk cassette 14 is inserted or ejected.

Each of the components of the disk drive housed in the case described above will be described below.

Figure 4:
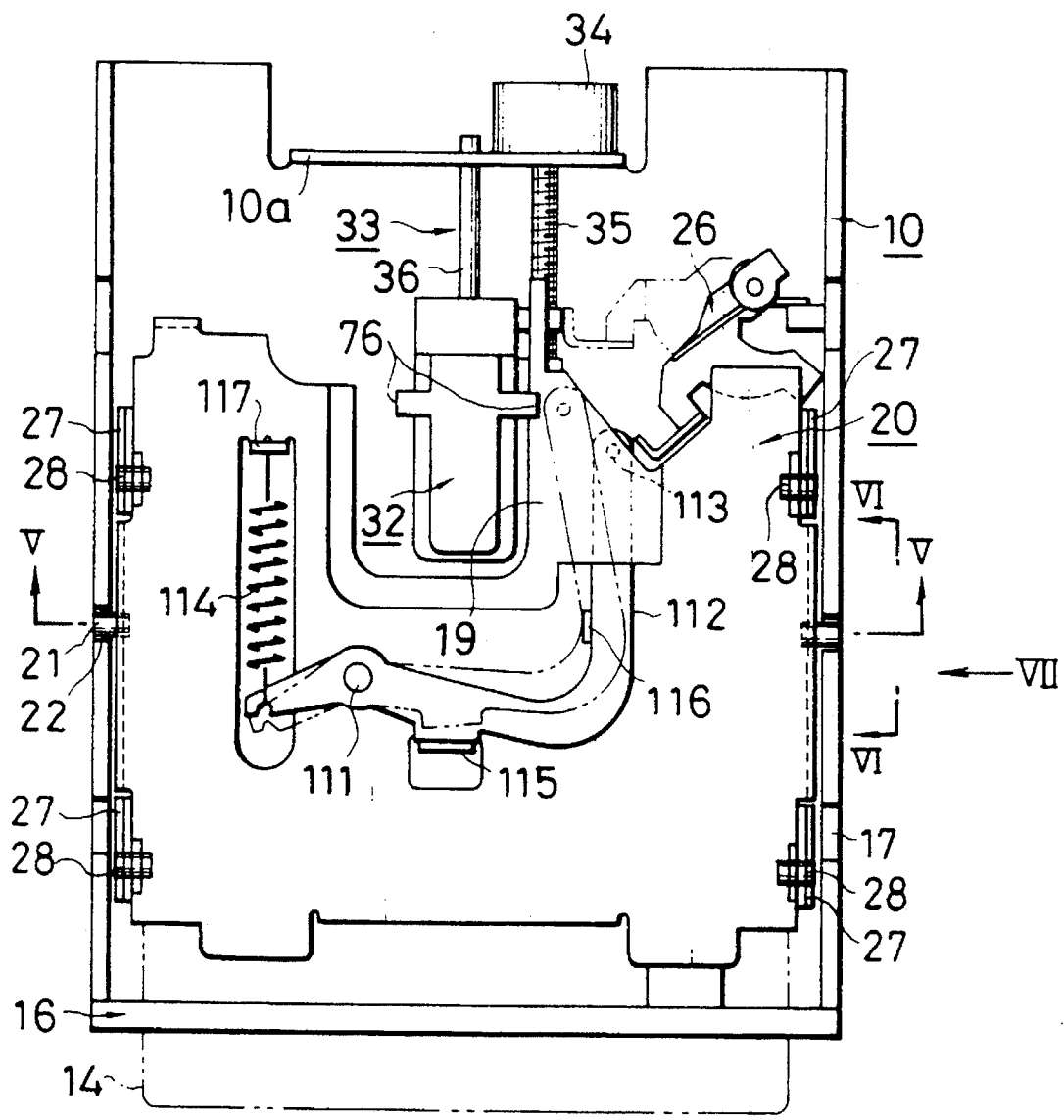
FIG. 4 is a plan view showing the disk drive of FIG. 1 with its cover removed.
Figure 5:
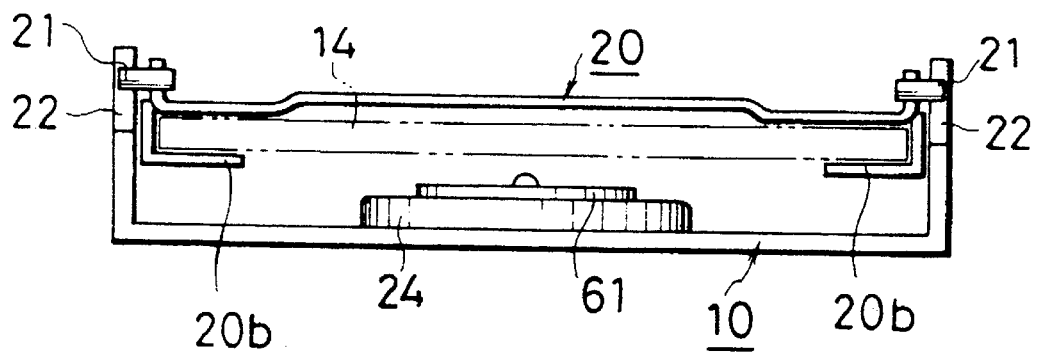
FIG. 5 is a cross sectional view taken along the line V—V of FIG. 4.
Figure 6:
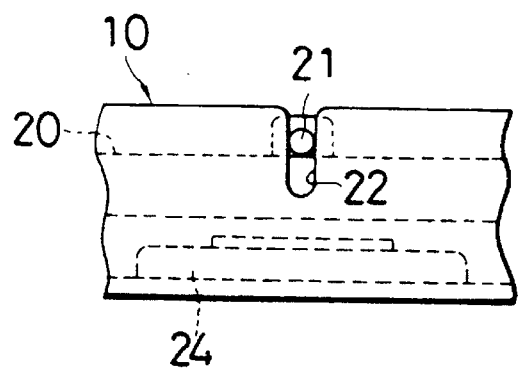
FIG. 6 is a partial side view taken along the line VI—VI of FIG. 4.

FIGS. 4 is a plan view showing the disk drive with its cover 12 and reinforcing member 17 removed. FIG. 5 is a cross sectional view taken along the line V—V of FIG. 4, showing the base 10 and the cassette guide 20. FIG. 6 is a partial side view taken along the line VI—VI of FIGS. 4. In FIGS. 4, 5 and 6, a cassette guide 20 is arranged to be able to be raised or lowered (in vertical directions to a plane of FIG. 4) against the base 10 so that the cassette guide 20 can guide an insertion and an ejection of the disk cassette 14 to the disk drive as well as to guide the loading and unloading of the disk cassette 14 to a motor 24.

The cassette guide 20 has a holder 20b shown in FIG. 5 to guide and hold the disk cassette 14, and has guide pins 21 on both sides thereof. On the other hand, the base 10 has, on both sides, slots 22 to which the guide pins 21 of the cassette guide 20 slidably fit, and which elongate in the direction vertical to the bottom plane of the base 10. Thus, the cassette guide 20 is attached to the base 10 in such a manner that it can move up or down along the slots 22 in a predetermined range. The cassette guide 20 has cam pins 28 at its four corners. Each of the cam pins 28 engages a cam slot formed at each of the upright portions provided at four corners of a slide plate of FIG. 7, which will be described later. Thus, a relative movement of the cassette guide 20 to the slide guide can be produced when the cassette 14 is inserted or ejected. The cassette guide 20 moves up and down with regard to the base 10 during the relative movement of the cassette guide 20 to the slide guide.

A vertical pin 111 attached to the top surface of the cassette guide 20 rotatably pivots a shutter lever 112. The shutter lever 112, interlocking with the insertion or the ejection of the disk cassette 14, moves the shutter 47 (of FIG. 10) of the head accepting openings of the disk cassette 14 so that the openings can be opened or closed. On the lower side surface of an end of the shutter lever 112, is projected a shutter pin 113 to be engaged with the end edge of the shutter 47. The another end of the shutter lever 112 is pulled clockwise in FIG. 4 by a spring 114 an end of which is supported by a spring supporting portion 117 which is projected on the upper surface of the cassette guide 20. On the cassette guide 20, is formed a stopper 115 for restricting the cassette non-loading position of the shutter lever 112, and on the shutter lever 112, is provided a stopper 116 for limiting the cassette installing position at which the head accepting aperture is opened. In this arrangement, the shutter lever 112 can swing between the two positions, that is, between the cassette non-loading position shown by solid lines and the cassette loading position shown by phantom lines. Incidentally, the end of the shutter lever 112 on which the shutter pin 113 is projected is covered with a cover 19 which is formed on the cassette guide 20.

Figure 7:
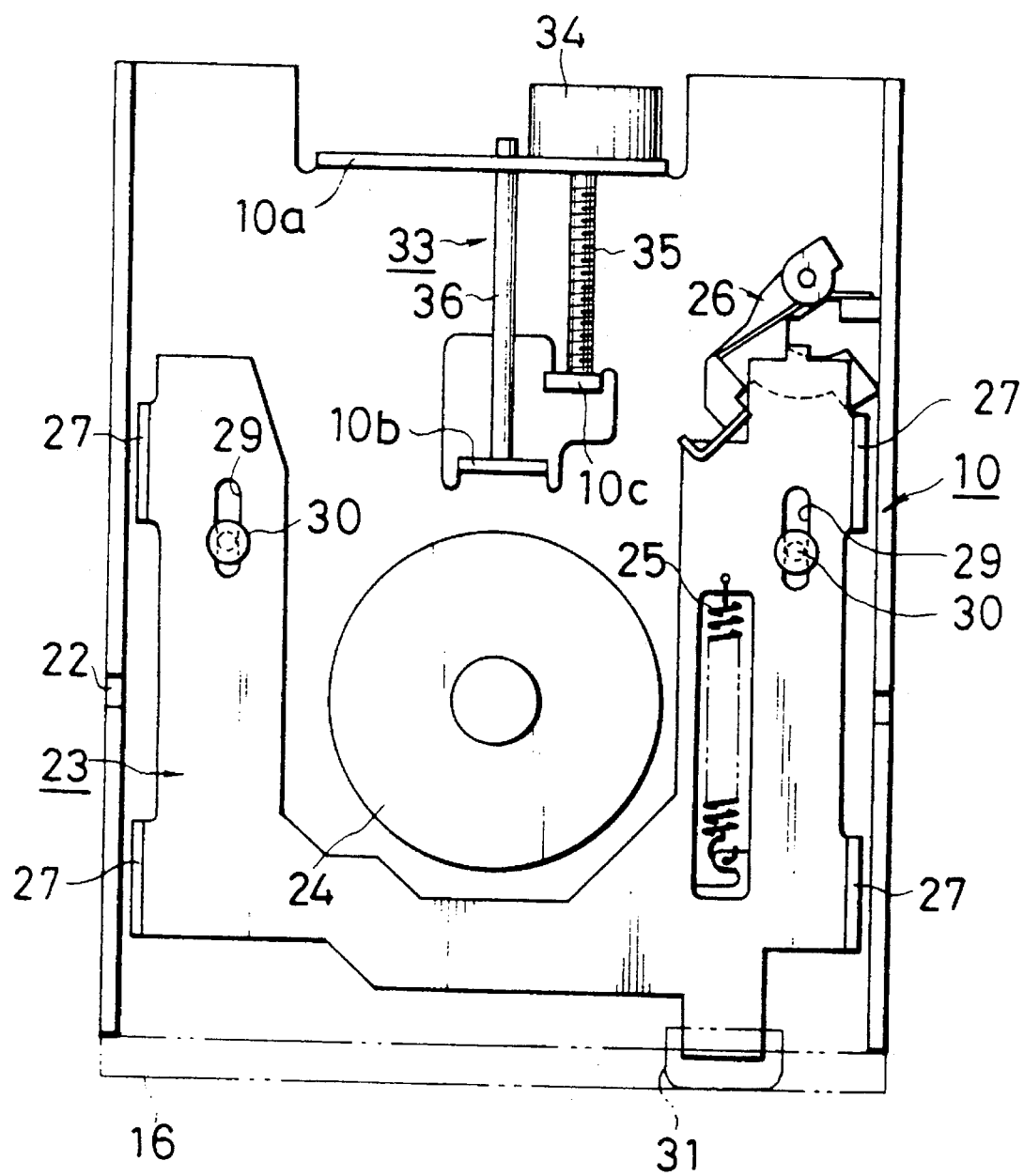
FIG. 7 is a plan view showing the disk drive of FIG. 4 with the cassette guide removed therefrom.

FIG. 7 is a plan view showing the disk drive of FIG. 4 with the cassette guide 20 removed therefrom. In FIG. 7, under the cassette guide 20, is provided a slide plate 23 that has the upright portions 27 which is provided at four corners thereof and each of which has the cam slot described above so that the slide plate 23 restricts the lateral motion (left to right or right to left direction in FIG. 7) of the cassette guide 20 as well as can raise or lower the cassette guide 20. The slide plate 23 is arranged in the base 10 in such a manner that it can slide in the directions (back or forth direction) in which the disk cassette 14 is inserted or ejected.

Near the center of the bottom of the base 10, a disk shaped disk drive motor 24 is disposed, and the slide plate 23 has a cutout at the center thereof so as to avoid an interference with the disk drive motor 24. The slide plate 23 is supported by a plurality of (four, for example) projections (not shown) formed on the base 10 to support the bottom of the slide plate, and slot is 29 formed at the two positions, namely, at right hand and left hand positions of the slide plate 23, are fitted to headed pins 30 attached to the base 10 so that the slide plate 23 can slide in the back or forth direction in a predetermined range with its upward movement (in the direction normal to the paper of FIG. 7) being restricted. The slide plate 23 is normally pulled forward (toward the front panel 16) by a pulling spring 25 spanned between the slide plate 23 and a member formed on the bottom of the base 10. On the other hand, the slide plate 23 can engage a latch member 26 (which will be described later), and when latched, the slide plate 23 is held at the back position (the position as shown in FIG. 7) against the force of the pulling spring 25.

As described above, the upright portions 27 are formed at two (back end and front end) portions of each side of the slide plate 23 (total four positions thereof) to regulate the lateral position of the cassette guide 20. In the upright portions 27, are formed cam portions (cam slots) 65 (see FIGS. 8 and 9) for raising and lowering the cassette guide 20, and at the same time for specifying the position in the back and forth direction of the slide plate 23 in response to the vertical position of the cassette guide 20.

Motions of the cassette guide 20 and the slide plate 23, relative to each other and in relation to the cam slots 65, will be described with reference to FIGS. 8 and 9.

Figure 8:
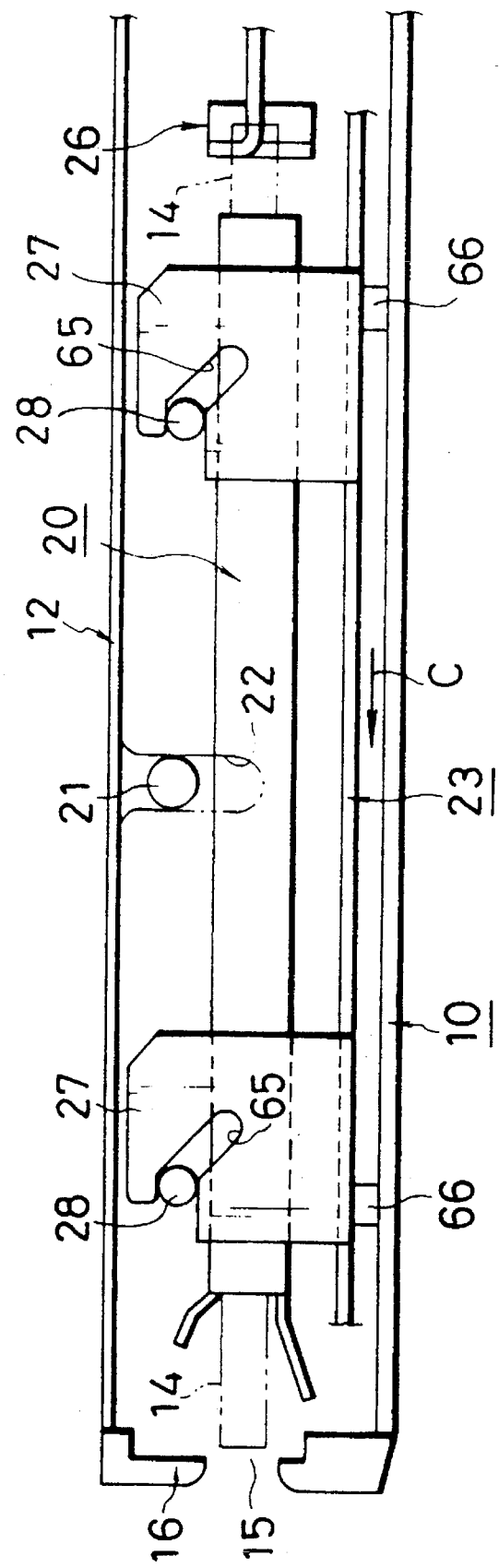
FIG. 8 is a sectional side view showing the disk drive of FIG. 4 with the cassette guide elevated.
Figure 9:
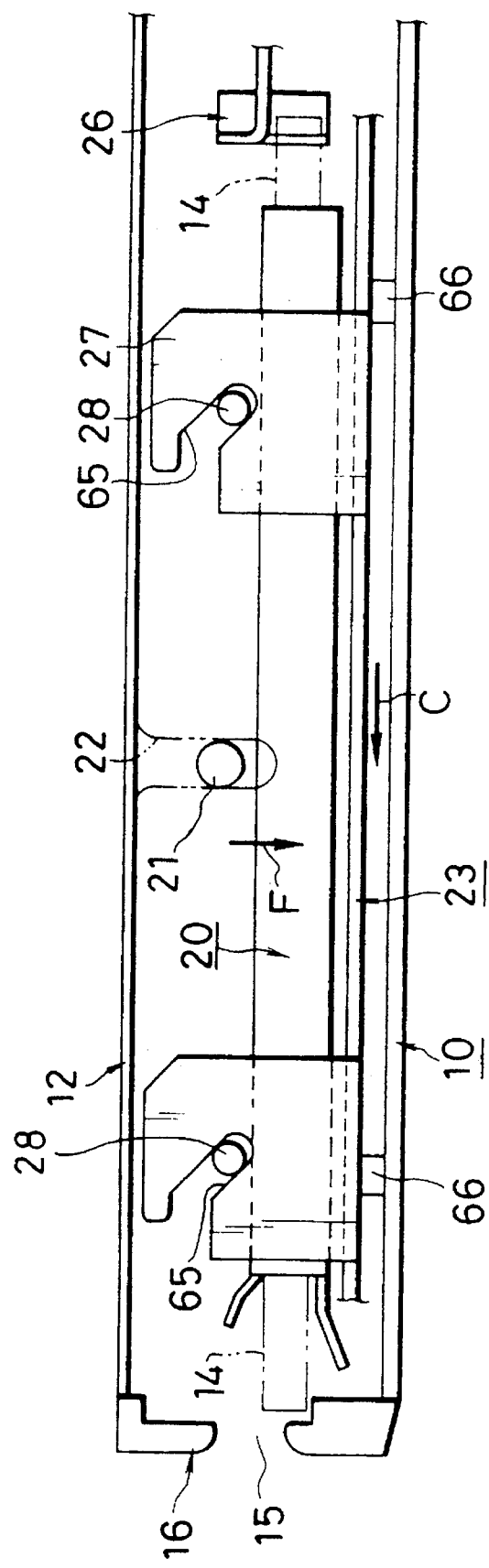
FIG. 9 is a sectional side view showing the disk drive of FIG. 4 with the cassette guide lowered.

FIGS. 8 and 9 are side views taken along the arrow VII of FIG. 4, showing the relative motion of the cassette guide 20 to the slide plate 23: FIG. 8 illustrates the raised state of the cassette guide 20 in which the disk cassette 14 is not housed or in the course of insertion; and FIG. 9 illustrates the lowered state of the cassette guide 20 in which the disk cassette 14 is housed.

In FIGS. 8 and 9, the cam slots 65 are formed in the upright portions 27 disposed on each side of the slide plate 23. Each cam slots 65 consists of a horizontal slot portion formed at the front side (the front panel side), and a sloped slot portion extending from the horizontal slot portion to the bottom back of the upright portion 27. To each cam portion 65, the cam pin 28 fits which is provided on each side of the cassette guide 20. In this case, the guide pins 21 provided at the center of each side of the cassette guide 20 fit to the slots 22 of a predetermined length which are formed on both sides of the base 10 and are shown by phantom lines. Thus, the cassette guide 20 can move only up and down relative to the base 10.

Figure 10:
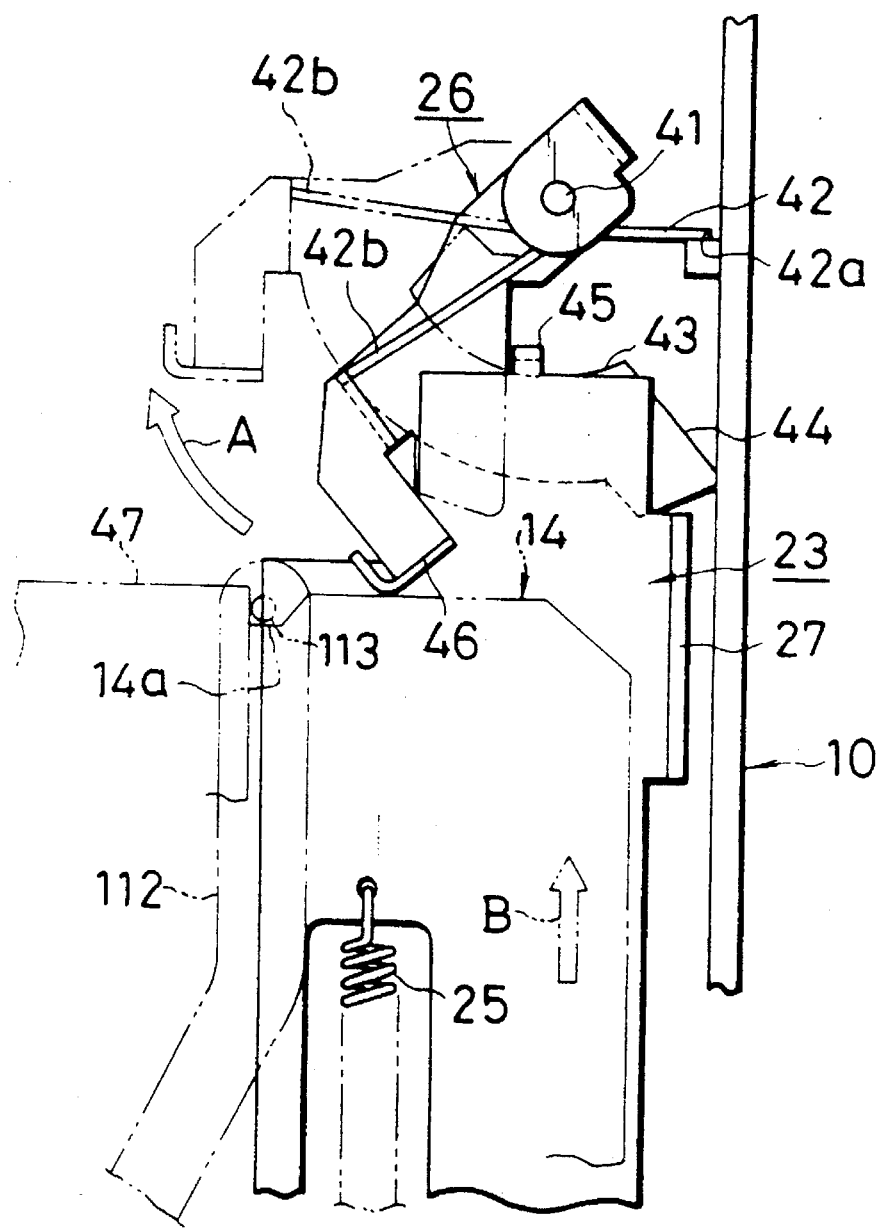
FIGS. 10 and 11 are partial plan views showing a latch state and a non-latch state, respectively, of the latch member of FIG. 4.
Figure 11:
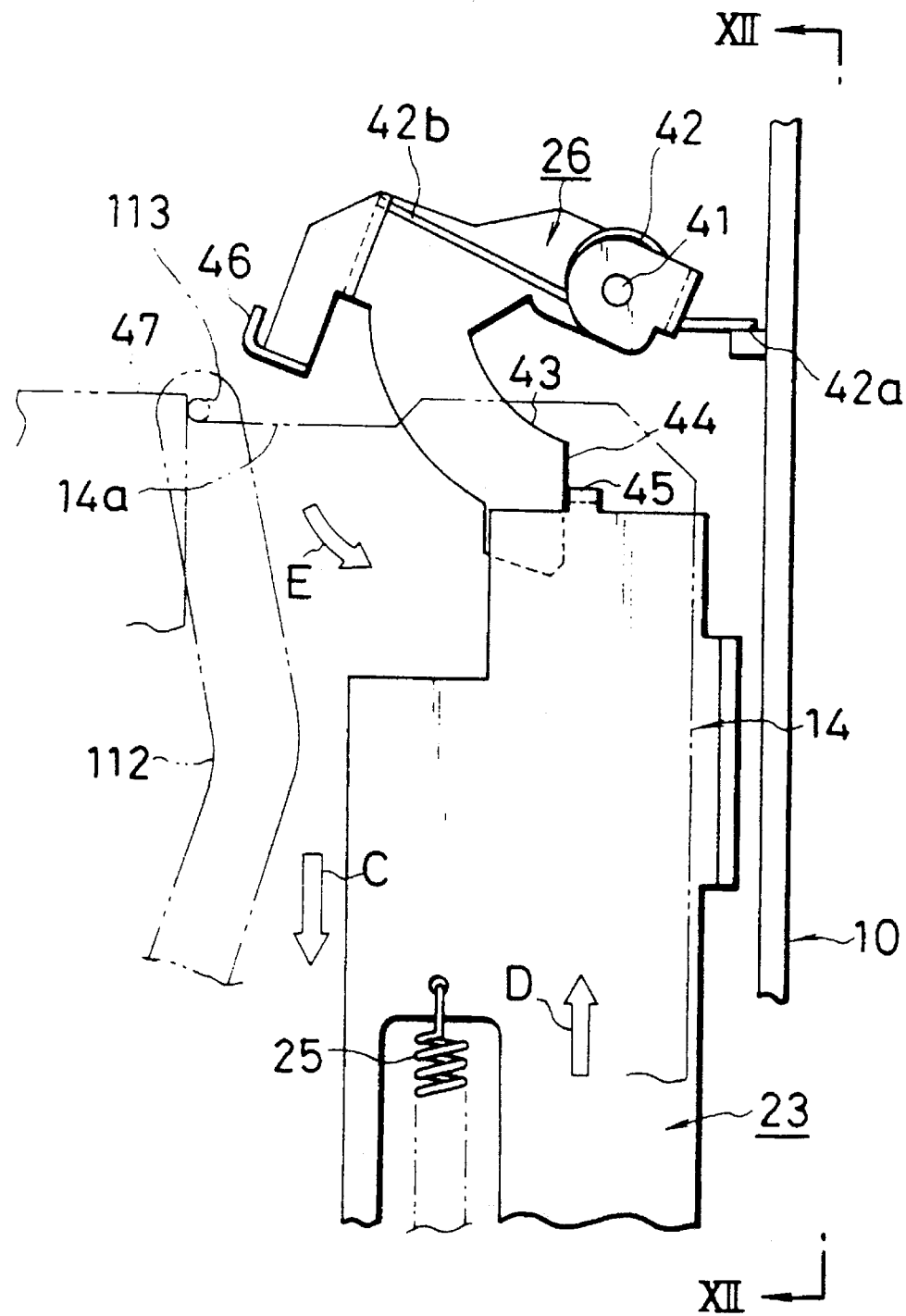

In the state of FIG. 8, when the disk cassette 14 is inserted through the cassette insertion aperture 15 in the front panel 16 and is pushed to the inner part of the disk drive, as described after with reference to FIGS. 10 and 11, the latch member 26 engages the front edge of the disk cassette 14 in response to the pushing of the disk cassette 14, so that the latch member 26 is turned clockwise and sets the engagement with the slide plate 23 free. As a result, the slide plate 23 is moved toward the arrow C of FIGS. 8 and 9 (toward the front panel 16) by the pulling spring 25. In accordance with this motion, each of the cam pins 28 is guided downward by each of the cam slots 65, thereby lowering the cassette guide 20 at the cassette loaded position as shown in FIG. 9. With these series of the motions, a disk housed in the disk cassette 14 is loaded on a rotor of the motor In this case, the forward stop position of the slide plate 23 (see FIG. 9) is determined by the shape of the cam slots 65 because the lowered position of the guide cassette 20 is restricted, and the cam slots 65 engage the cam pins 28. Incidentally, reference numeral 66 in FIGS. 8 and 9 designates projections provided at a plurality of positions on the base 10 for slidably supporting the slide plate 23.

On ejecting the disk cassette 14, by pushing an ejection button 31 shown in FIG. 7, the slide plate 23 is pushed backward. This pushing produces a different engagement of the slide plate 23 with the latch member 26 so that the latch member 26 rotates counterclockwise, and the slide plate 23 is latched at the back position (pushed position). With the counterclockwise rotation of the latch member 26, the pushing arm thereof pushes the disk cassette 14 forward to eject it.

Referring to FIGS. 4 and 7 again, a head seek means (a head moving means) 33 is provided in the base 10. The head seek means 33 is a mechanism for moving a head unit 32 shown in (FIG. 4), which includes recording and reproducing heads, in the radial direction of the disk which is loaded and positioned on the drive motor 24 so that the heads are placed on a desired track. The head leading means for loading or unloading the head to or from the disk as described later, is provided in the head unit 32. The head seek means 33 is composed of the driving motor (a stepper motor, for example) 34, a lead screw 35 for converting the rotational movement of motor 34 to the radial movement of the head unit 32, a guide bar 36 for correctly guiding the radial movement of the head unit 32, etc., and the lead screw 35 and the guide bar 36 are supported by upright portions 10a, 10b and 10c formed by cutting the bottom plate of the base 10. Incidentally, FIG. 7 illustrates a state that the head unit 32 is removed.

Figure 12:
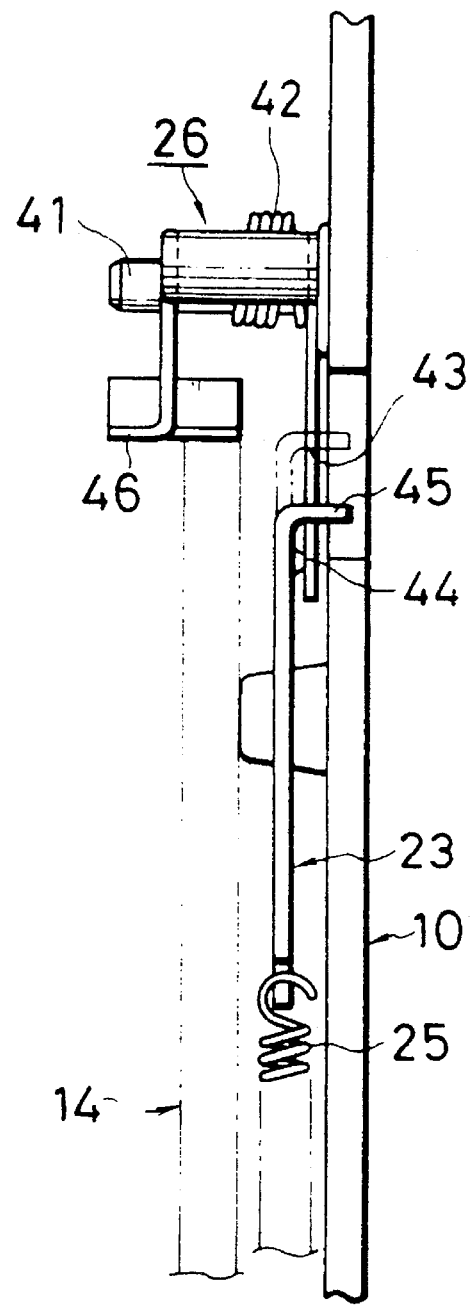
FIG. 12 is a side view taken along the line XII—XII of FIG. 11.

FIG. 10 is partial plan view showing the major portion of the latch mechanism in the non-loaded state of a disk cassette, or in the latch state in which the latch member 26 is in engagement with the slide plate 23. FIG. 11 is a partial plan view showing the same portion as in FIG. 10 in the loaded state of the cassette disk, or in the non-latch state in which the slide plate 23 is released. FIG. 12 is a side view of the portion shown in FIG. 11. The motion of the slide plate 23 and the latch member 26 will be described with reference to FIGS. 10 to 12.

The latch member 26 is rotatably mounted on a vertical pin 41 attached to the bottom of the base 10, and is normally pressed by an ejector spring 42 in a counterclockwise direction in FIG. 10. The ejector spring 42 is fixed at one end 42a thereof to a fixed member provided on a side surface of the base 10, and at the other end 42b thereof to a predetermined portion of the latch member 26 in such a manner that the spring 42 winds around the pin 41. Thus, the pressing force can act on the latch member 26. The latch member 26 has a curved engaging edge 43 and a sliding edge (stopper edge) 44 that turns in an approximately longitudinal direction (back-and-forth direction in FIG. 11) in the non-latch state. In the latch state shown in FIG. 10, an engaging portion (a downward portion) 45 formed on the slide plate 23 fits at the engaging edge 43, and hence the slide plate 23 is held at the back position against the force of the pulling spring 25. The latch member 26 is further provided with an ejection arm 46 that makes contact with the front portion of the disk cassette 14. The ejection arm 46 functions, when ejecting the cassette 14, as an ejector for expelling the disk cassette 14 with the force produced by the ejector spring 42.

When the disk cassette 14 is inserted in the latch state as shown in FIG. 10 (in the direction of the arrow B), the front portion of the cassette 14 makes contact with the ejection arm 46 so that as the cassette is further inserted, the latch member 26 rotates in the direction of the arrow A against the force of the ejection spring 42, and thus, the engaging edge 43 of the latch member 26 slips out of the engaging portion 45 of the slide plate 23 and engages the sliding edge 44. Thus, the slide plate 23 moves in the direction of the arrow C with the force of the pulling spring 25, thereby resulting in the cassette loaded state or non-latch state as shown in FIG. 11. In this state, the rotational position of the latch member 26 is held by the engagement of the engaging portion 45 with the sliding edge 44.

With the insertion of the disk cassette 14, the shutter 47 of the disk cassette 14 is simultaneously opened. More specifically, when the disk cassette 14 is inserted, a shutter pin 113 on the shutter lever 112 fits on the edge of the shutter 47 as well as fits a slide portion 14a formed at the front edge of the disk cassette 14 (as shown in FIG. 10). As the disk cassette 14 further advances, with this advance, the shutter pin 113 slides leftward on the slide portion 14a with pushing the shutter 47. In accordance with this sliding, the shutter lever 112 rotates counterclockwise, and hence the shutter 47 begins to open against the force of the spring which is provided in the disk cassette 14. Thus, when the cassette is placed at the loaded position as shown in FIG. 11, the head accepting aperture is entirely open. Once the head accepting aperture is open, the head loading becomes possible as will be described later: the heads in the head unit 32 are pressed (or placed close) to the disk so that a writing data on or reading data from the disk becomes possible.

On the other hand, when the disk cassette is to be ejected, the eject button 31 in FIG. 7 is depressed so that the slide plate 23 is pushed into the direction of the arrow D of FIG. 9. As a result, the engaging portion 45 separates from the sliding edge 44 of the latch member 26 and engages the engaging edge 43. Thus, the latch member 26 is turned by the force of the ejector spring 42 in the direction of the arrow E in FIG. 11, and hence the disk cassette 14 is ejected forward by the advancing force of the pushing arm 46 of the latch member 26. In this case, the shutter 47 of the disk cassette 14 separates from the shutter lever 112 in accordance with the ejection of the cassette, and automatically returns to its normal position with the force of the spring so as to close the head accepting aperture. At the same time, the engaging edge 43 of the latch member 26 fits on the engaging portion 45 of the slide plate 23 so that the slide plate 23 is held at the back position. Accordingly, as shown in FIG. 8, the cassette guide 20 is maintained at the raised position, and one of the heads is also held at the elevated position (the unloaded position) with the cassette guide 20 as described later with reference to FIG. 15.

Figure 13:
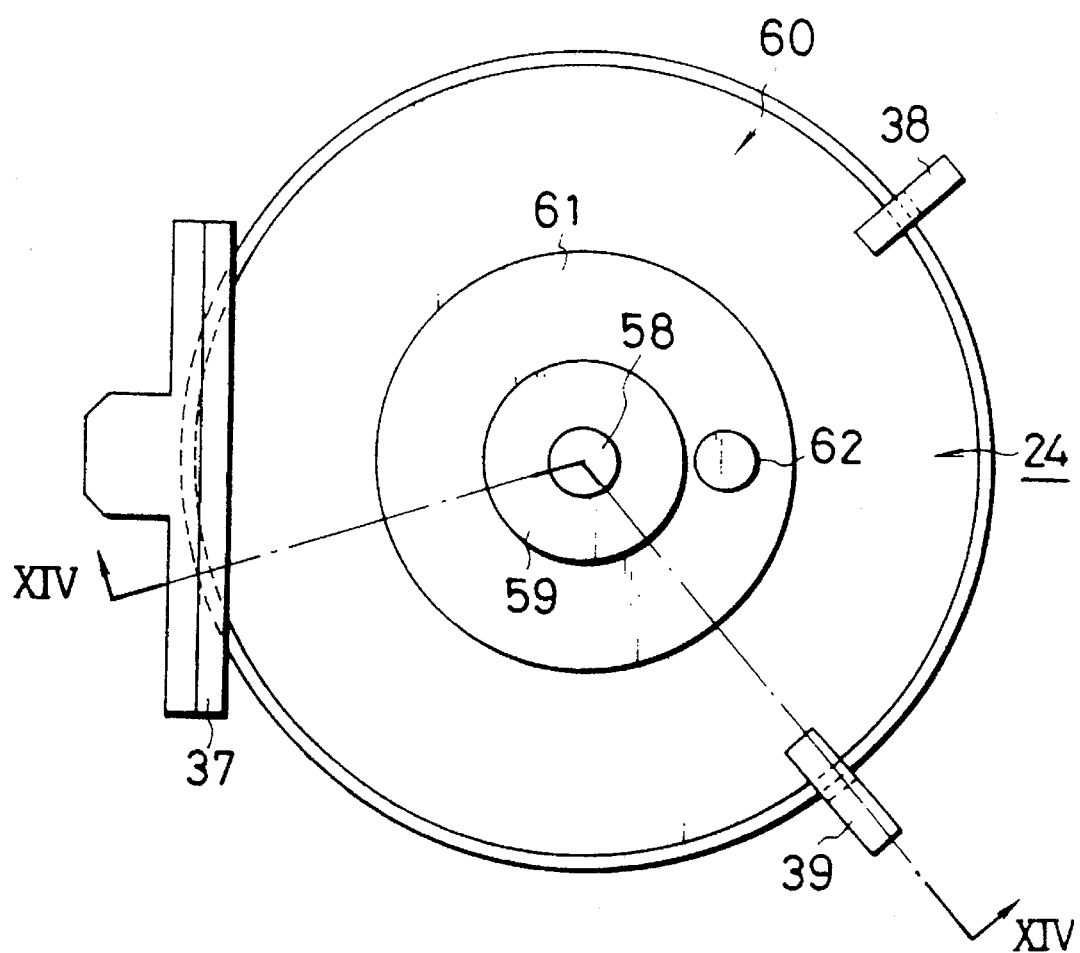
FIG. 13 is a plan view showing the motor of FIG. 7 for driving the disk.
Figure 14:
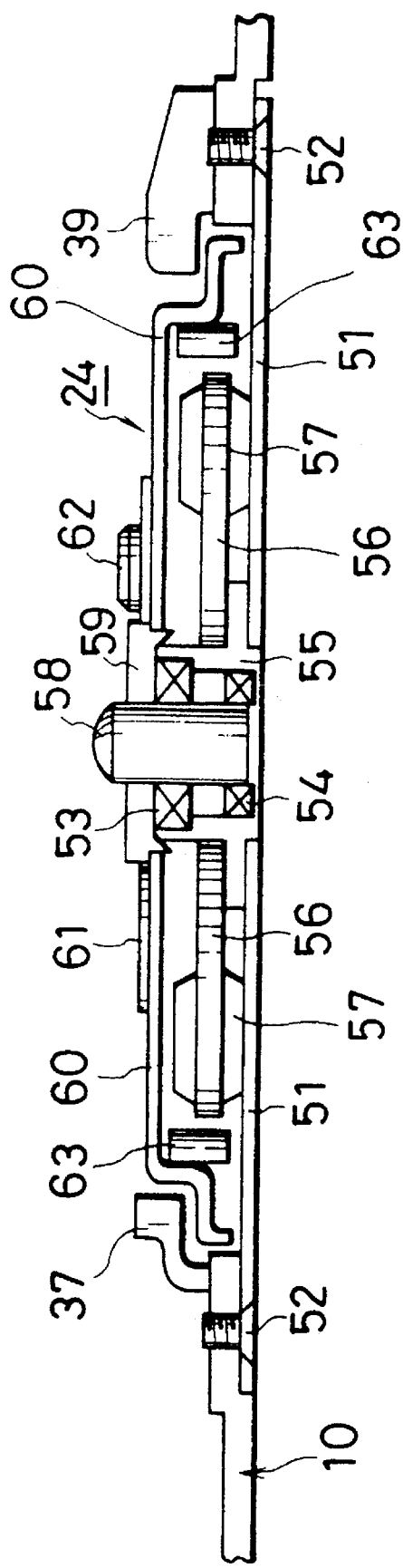
FIG. 14 is a longitudinal sectional view of the motor taken along the line XIV—XIV of FIG. 13.

FIG. 13 is a plan view showing the motor 24 for driving the disk (the recording medium) in the disk cassette 14, and FIG. 14 is a longitudinal sectional view of the motor taken along the line XIV—XIV of FIG. 13. As the disk drive motor 24, a flat motor of circumference facing outer rotor type is used, and the motor 24 is mounted on the bottom of the base 10.

In FIGS. 13 and 14, a stator yoke 51 is fixed to the bottom of the base 10 with screws 52. On the stator yoke 51, are mounted stator side component parts such as a bearing housing 55 that holds bearings 53 and 54, a stator 56, a coil 57, etc. The bearings 53 and 54 support a spindle shaft 58. On the spindle shaft 58 are mounted rotor side component parts such as a disk-like outer rotor 60 which is mounted on the shaft via a flange 59, an attracting magnet 61 for fixing the disk on the rotor, a disk drive pin 62 on the attracting magnet 61, drive magnets 63 fixed inside the rotor 60 so as to face the stator 56.

Furthermore, on the bottom of the base 10, stoppers 37, 38 and 39 for preventing the rotor from moving upward along the shaft are fastened with screws or the like. The stoppers 37, 38 and 39 also serve to prevent the bottom surface of the disk cassette 14 from contacting the rotor 60 owing to the warp of the bottom surface in the disk cassette loaded state. Alternatively, the stoppers 37, 38 and 39 can be formed on the base 10 integrally with the base. In the loaded state of the disk cassette 14, the magnetic body (not shown) provided at the center of the disk is attracted by the attracting magnet 61, and the index hole (not shown) of the disk is fitted into the drive pin 62 so that the disk (the recording medium) is correctly positioned with regard to the rotor 60.

Figure 15:
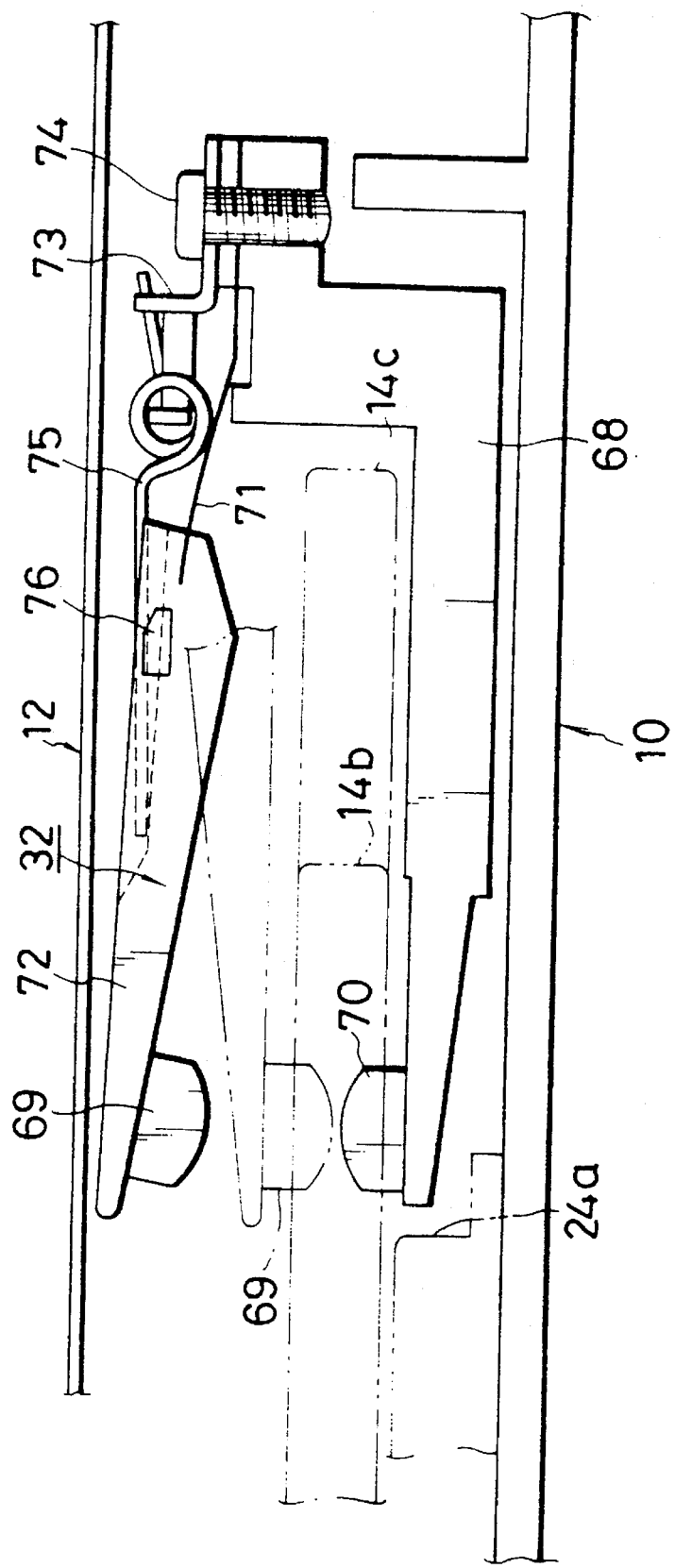
FIG. 15 is a side view showing the construction of the head unit of FIG. 4.

FIG. 15 is a side view showing the construction of the head unit 32 (see FIG. 4). In FIG. 15, the head unit 32 is arranged in such a manner that various component parts of the head unit 32 are mounted on a carriage 68. In addition, on the carriage 68, there are provided an upper head 69 that performs writing data on and reading data from the upper tracks of the disk, and a lower head 70 that performs writing data on and reading data from the lower tracks of the disk. The head unit 32 (or the carriage 68) extends in the radial direction of the disk by a predetermined length so that the heads 69 and 70 can achieve writing data on and reading data from the tracks. The lower head 70 is attached on the front end portion of the carriage 68.

On the other hand, the upper head 69 is arranged so as to be raised or lowered with regard to the carriage 68. More specifically, the upper head 69 is attached to a head arm 72 to the backend portion of which leaf springs 71 are attached. An end of each leaf spring 71 is fixed to the carriage 68 together with a supporting member 73 with a attaching screw 74. With these arrangement, the carriage 68 can support the head arm 72 via the leaf springs 71 in such a manner that the head arm 72 can move up or down. To the supporting member 73, is attached a head loading spring 75 that sets the head 69 in the loaded state by forcing the head arm 72 downward to the disk so that the head 69 makes contact with or approaches the disk to make it possible write data on or read data from the disk. At a side or both sides of the head arm 72, there is provided a lifter or lifters 76 which engage the cover 19 (shown in FIG. 4) on the cassette guide 20. With this arrangement, when the cassette guide 20 is raised, the head arm 72 is also raised, and thus the head 69 is raised (i. e., unloaded). In the arrangement shown in FIG. 15, the head arm 72 is supported by the leaf springs 71 of a considerable length in such a manner that the head arm 72 can move up and down, and the lifter 76 is placed closer to the leaf springs 71 than to the point of action of the head loading spring 75. Thus, a moment of force is produced in such a way that the head arm 72 is forced to lower its front end (counterclockwise in FIG. 15) in the course of head raising (during unloading of the head). As a result, the front end of the head arm 72 is lowered by the bending action of the leaf springs 71 so that the top position of the head arm 72 is lowered.

Incidentally, the phantom lines 14a and 14b in FIG. 15 represent the relative positions of the disk cassette 14 to the head unit 32. The phantom lines 24a indicates the relative position of the disk drive motor 24 to the head unit 32 when the head unit 32 advances to the innermost depth. The seek operation of the head unit 32 is carried out by moving the carriage 68 in the radial direction of the disk by the motor 34.

Figure 16:
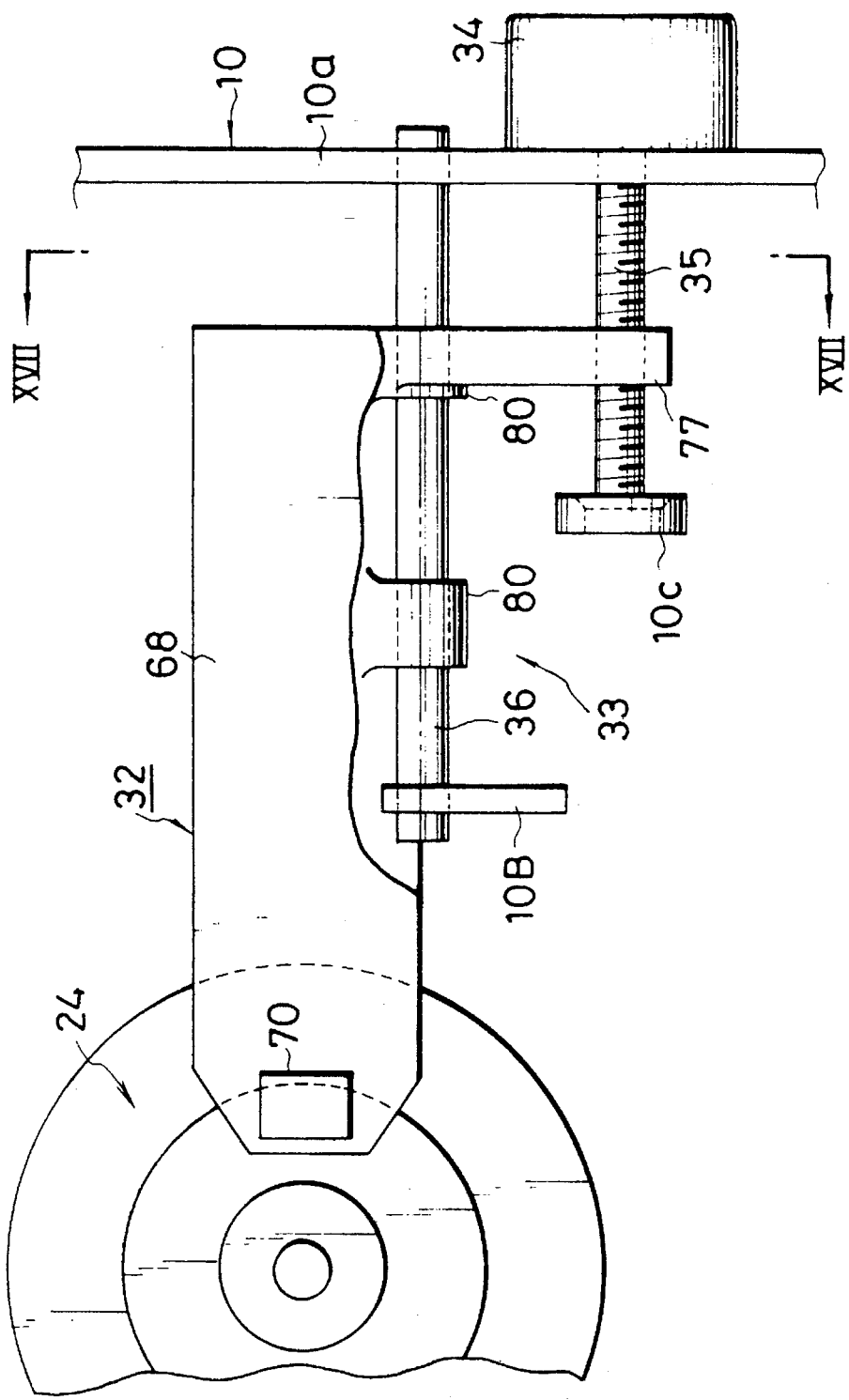
FIG. 16 is a partial plan view showing a relationship between the head unit and the head seek mechanism.
Figure 17:
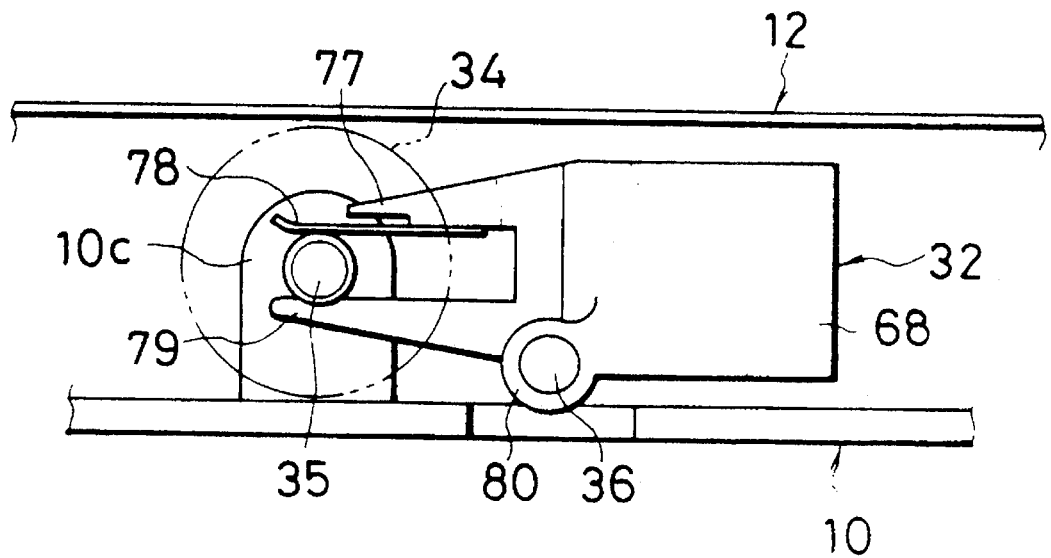
FIG. 17 is a transverse sectional view taken along the line XVII—XVII of FIG. 16.
Figure 18:
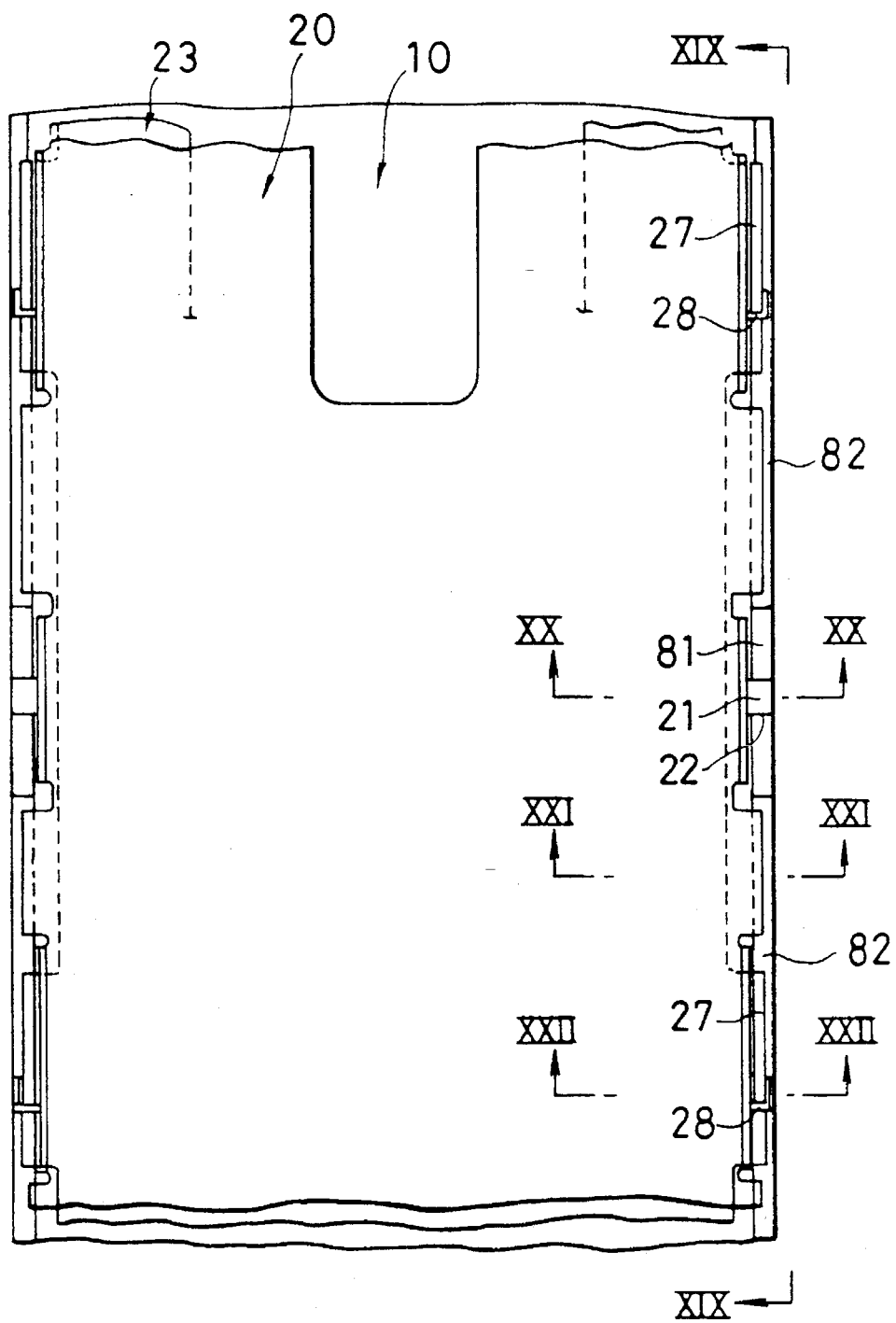
FIG. 18 is a plan view showing a disk drive of a first example of the present invention.

FIG. 16 is a partial plan view showing a relationship between the head unit 32 and the head seek means 33 with the head arm 72 and the upper head 69 in FIG. 18 removed, and FIG. 17 is a transverse sectional view taken along the line XVII—XVII of FIG. 16. In FIGS. 16 and 17, the head seek motor (a stepper motor, for example) 34 is mounted on the upright plate 10a on the base 10, and the output shaft thereof, namely, the screw shaft 35 is rotatably supported at the ends thereof by the upright plate 10a and the upright plate 10c. In addition, the guide bar 36, which guides the carriage 68 during the seek operation, is supported at the ends thereof in the radial direction by the upright plate 10a and the upright plate 10b.

As shown FIG. 17, under a projection 77 of the carriage 68, a leaf spring 78 is attached in such a manner that it is pressed to the screw shaft 35. To the carriage 68, is fastened a needle pin 79 that extends in the lateral direction, and fits in a screw thread under the screw shaft 35. On two positions of the carriage 68, are provided bearings 80 which slidably fit to the guide bar 36 so that the carriage 68 can move along the guide bar 36.

With these arrangement, when the screw shaft 35 is rotated by the motor 35, the head unit 32 and the carriage 68 move in the radial direction of the disk via the needle pin 79, thereby performing the seek operation so as to place the heads 69 and 70 on the desired tracks. Next, some embodiments of arrangement for making compactness of the disk drive explained above will be described.

FIRST EXAMPLE

Figure 19:
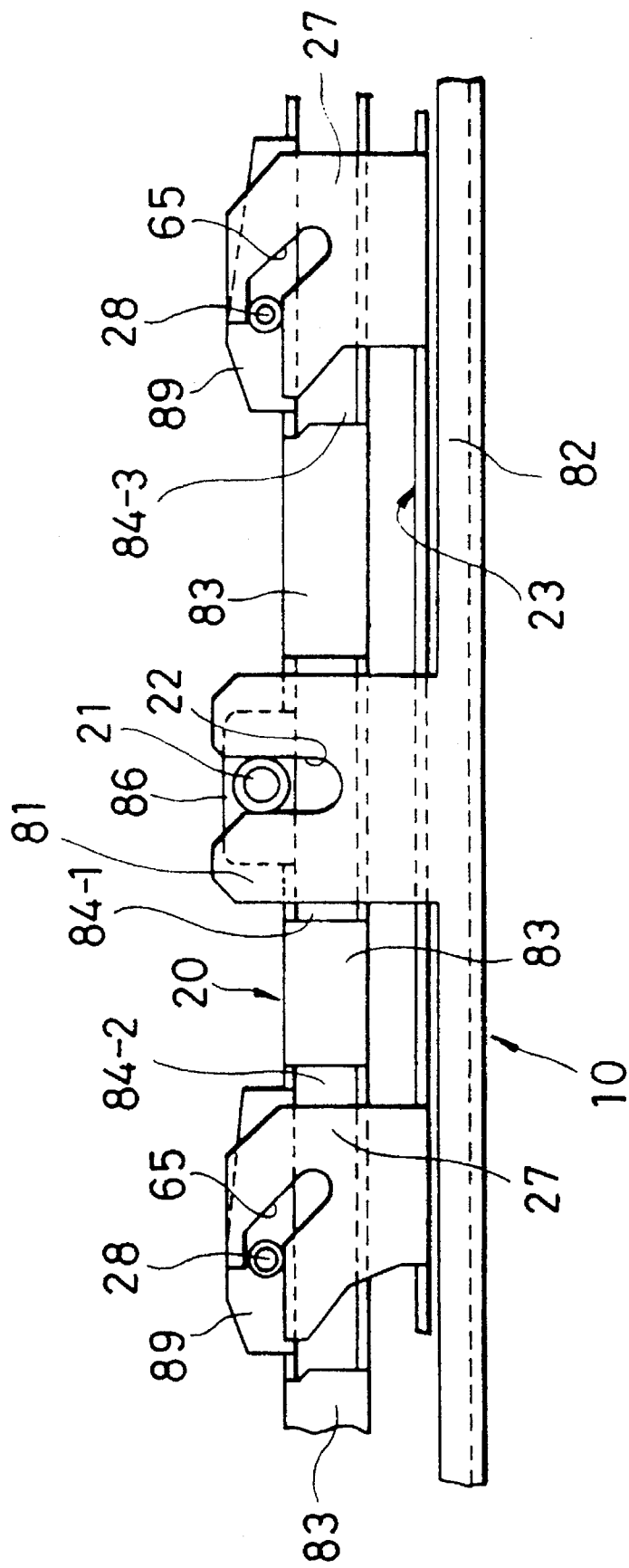
FIG. 19 is a side view taken along the line XIX—XIX in FIG. 18.
Figure 20:
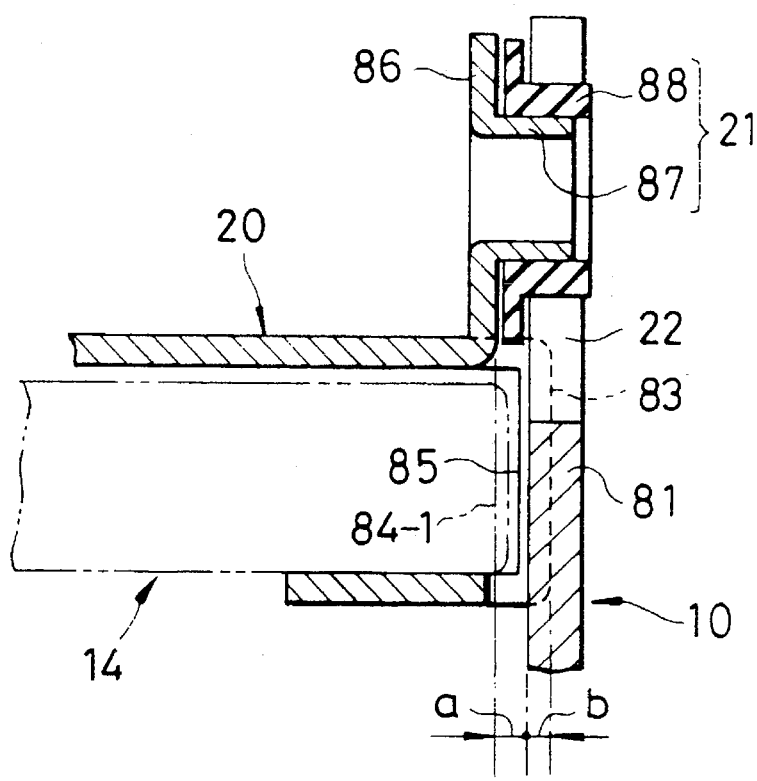
FIG. 20 is a partially sectional view taken along the line XX—XX in FIG. 18.
Figure 21:
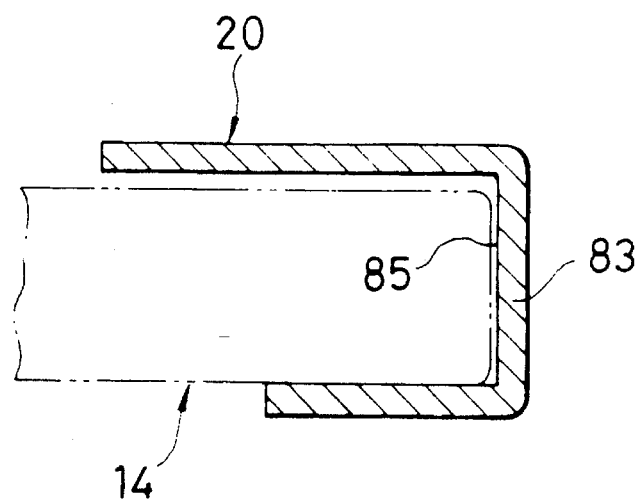
FIG. 21 is a partially sectional view taken along the line XXI—XX in FIG. 18.
Figure 22:
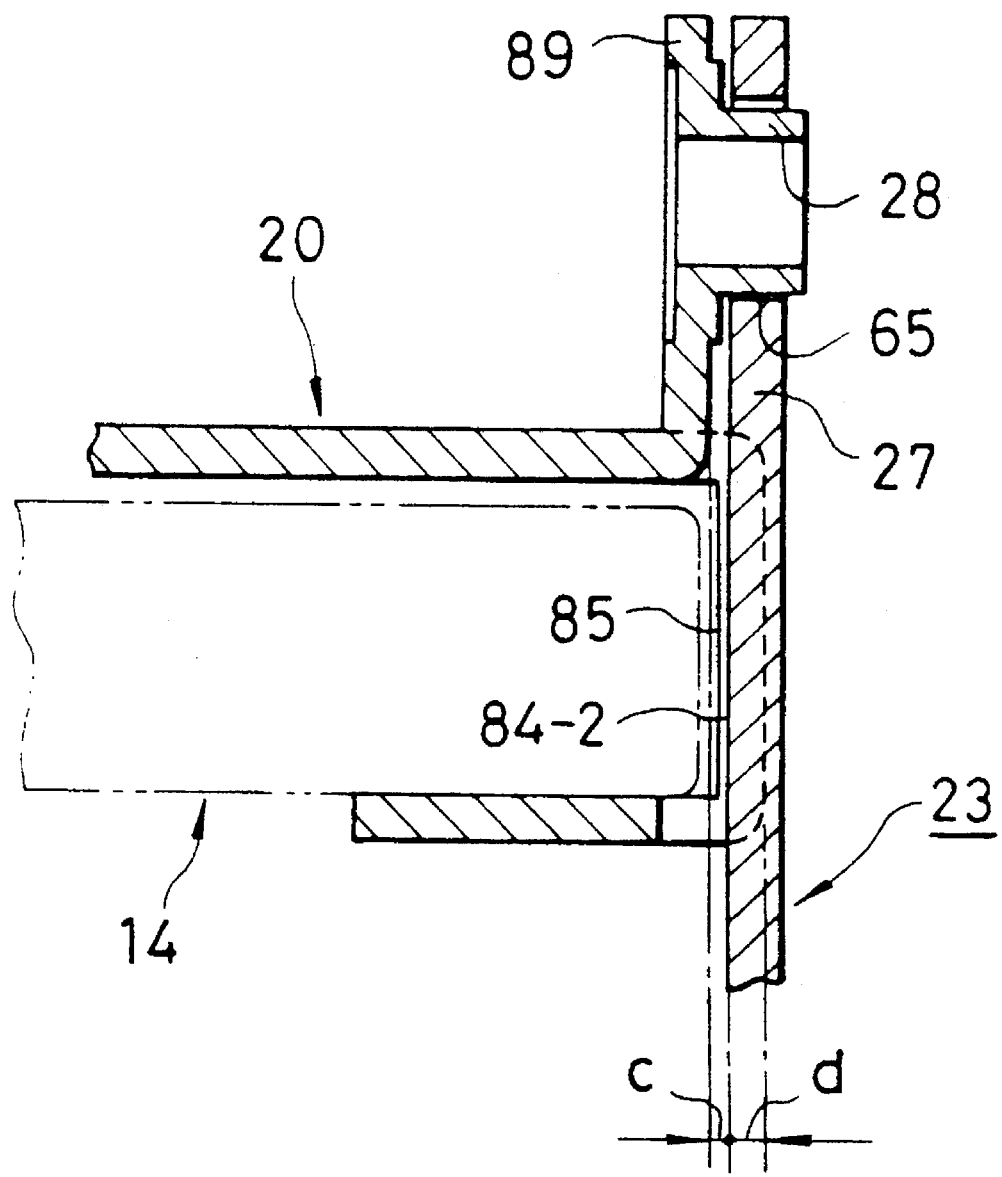
FIG. 22 is a partially sectional view taken along the line XXII—XXII in FIG. 18.

FIG. 18 is a plan view showing an embodiment of a disk drive according to the present invention, FIG. 19 is a side view taken along the line XIX—XIX in FIG. 18, FIG. 20 is a partially sectional view taken along the line XX—XX in FIG. 18, FIG. 21 is a partially sectional view taken along the line XXI—XXI in FIG. 18, and FIG. 22 is a partially sectional view taken along the line XXII—XXII in FIG. 18. In FIGS. 18–22, on both sides of the base 10, are formed side walls 81 (FIG. 19) each having the vertical slot 22 and low ribs 82 (FIG. 19). In side walls 83 (FIG. 19) of the cassette guide 20, are formed notched openings 84-1, 84-2, and 84-3 at positions corresponding to the side wall 81 of the base 10 and to the two upright portions 27 of the slide plate 23 so as to avoid the interference between the side walls 83 and the side wall 81 and upright portions 27. These side walls 81 and 83, and notched openings 84 are formed symmetrically at the opposite side of the base 10. The inner surface 85 of each side wall 83 of the cassette guide 20 makes a surface for guiding each edge of the disk cassette 14 housed in the cassette guide as shown in FIGS. 20 to 22.

In FIG. 20, the notched opening 84-1 of the cassette guide 20 has an end positioned inside by a distance a than the inner surface of the side wall 81 of the base 10. In addition, the side wall 83 of the cassette guide 20 and the side wall 81 of the base 10, which are formed in such a manner that they are free from interference, are disposed to overlap by an amount b in the left-to-right direction in FIG. 20. More specifically, the width of the cassette guide 20 (i.e., the length between the outer surfaces of the two opposite side walls 83) is made longer than the length between the inner surfaces of the opposite side walls 81 of the base 10 by an amount 2b; the depth of the notched opening 84-1 is set at (a+b); and hence the width of this portion of the cassette guide 20 is made smaller than the full width of the cassette guide 20 by an amount 2(a+b). Such construction enables the outer surface of each side wall 81 of the base 10 to be approximately coplanar with the outer surface of each side wall 83 of the cassette guide 20.

In FIG. 20, an upright portion 86 is formed on top end of the cassette guide 20 at the position corresponding to the notched opening 84-1. On the upright portion 86, is formed a projecting portion 87 facing outside. The projecting portion 87 has a cylindrical sliding member 88 which is mounted on the portion 87 by pressure insertion or the like, and is slidably fitted in the vertical slot 22 of the base 10. As the sliding member 88, is used a bush made of a low friction material with a high resistance such as polyamides (nylons) or polytetrafluoroethylene (Teflon). The position of the outer surface of the upright portion 86 in the left-to-right direction in FIG. 20 is approximately identical to the position of the end surface of the notched opening 84-1. The aforementioned guide pin 21 for guiding the up-and-down movement of the cassette guide 20 is composed of the projecting portion 87 and the sliding member 88 in this embodiment. FIG. 21 is a sectional view partially illustrating the disk cassette 14 guided by the portions at which the side walls 83 are formed and the inner surfaces 85 of the side walls 83.

In FIG. 22, the notched opening 84-2 of the cassette guide 20 has an end positioned inside by a distance c than the inner surface of the upright portion 27 of the slide plate 23. In addition, the side wall 83 of the cassette guide 20 and the upright portion (side wall) 27 of the slide plate 23, which are formed in such a manner that they are free from interference, are disposed to overlap by an amount d in the left-to-right direction in FIG. 22. More specifically, the full width of the cassette guide 20 (i.e., the length between the outer surfaces of the two opposite side walls 83) is made longer than the length between the inner surfaces of the opposite side walls (upright portions) 27 of the slide plate 23 by an amount 2d; the depth of the notched opening 84-2 is set at (c+d); and hence the width of this portion of the cassette guide 20 is made smaller than the full width of the cassette guide 20 by an amount 2 (c+d). Such construction enables the outer surface of each side wall (upright portion) 27 of the slide plate 23 to be approximately coplanar with the outer surface of each side wall 83 of the cassette guide 20.

Figure 27:
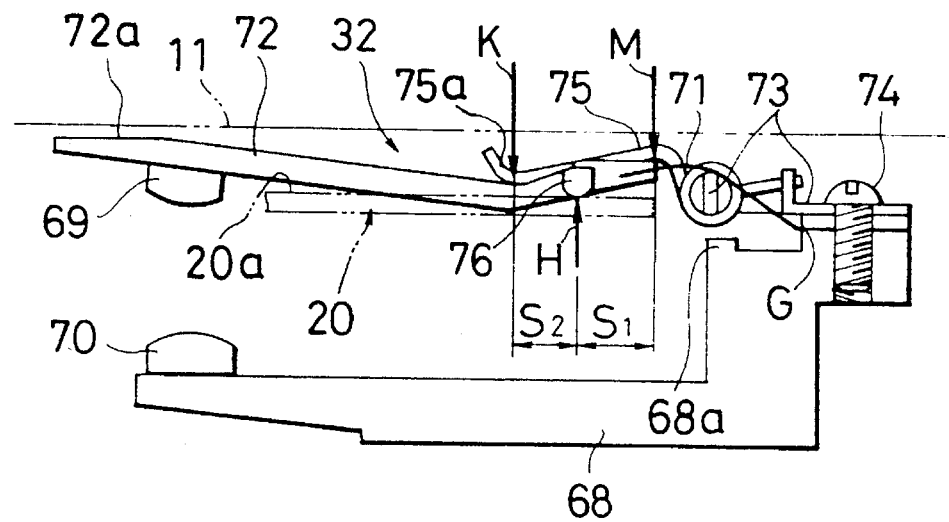
FIG. 27 is a side view showing a reference construction of a head arm having a conventional lifter portion, with the head arm unloaded.

In FIG. 22, an upright portion 89 is formed on top end of the cassette guide 20 at the position corresponding to the notched opening 84-2 (84-3). On the upright portion 89, is formed a projecting portion facing outside to constitute the cam pin 28. The cam pin 28 is slidably fitted in the cam slot 65 formed in the upright portion 27 of the slide plate 23, and makes the cassette guide move up and down in response to the back-and-forth movement of the slide plate 23. The position of the outer surface of the upright portion 89 in the left-to-right direction in FIG. 27 is approximately identical to the position of the end surface of the notched opening 84-2 (84-3).

The embodiment described above is arranged in such a manner that the outer surfaces of the side walls 81, 83 and 27 make the same plane: the side walls 81 are those of the base 10 as a case for installing the components of the disk drive; the side walls 83 are those of the cassette guide 20 for loading and guiding the disk cassette 14; and the side walls 27 are those of the slide plate 23 for moving the cassette guide 20 up and down. As a result; the dimension of the disk drive can be reduced by the amount of overlapping of those side walls in the lateral direction, thereby enabling reduction in the size and weight of the disk drive.

The side walls 83 of the cassette guide 20 form the inner surfaces 85 for guiding the insertion, ejection, loading and unloading of the disk cassette 14; the side walls 27 of the slide plate 23 form the side edge upright portions having cam slots 65 for moving the cassette guide 20 up and down; and the outer surfaces of these side walls 83 and 27 are made coplanar with the outer surface of the side walls 81 of the base 10. As a result, the full width of the base 10 can be restricted to a minimum against the width of the disk cassette 14 regardless of the thickness of each side walls 81, 83 and 89.

In addition, the cam mechanisms 28 and 65 for moving the cassette guide 20 up and down are positioned above the disk cassette 14 housed in the cassette guide 20; and the guide mechanisms 21 and 22 for guiding the up-and-down movement of the cassette guide 20 are disposed above the disk cassette 14. As a result, the full width of the disk drive can be reduced more easily.

SECOND EXAMPLE

Figure 23:
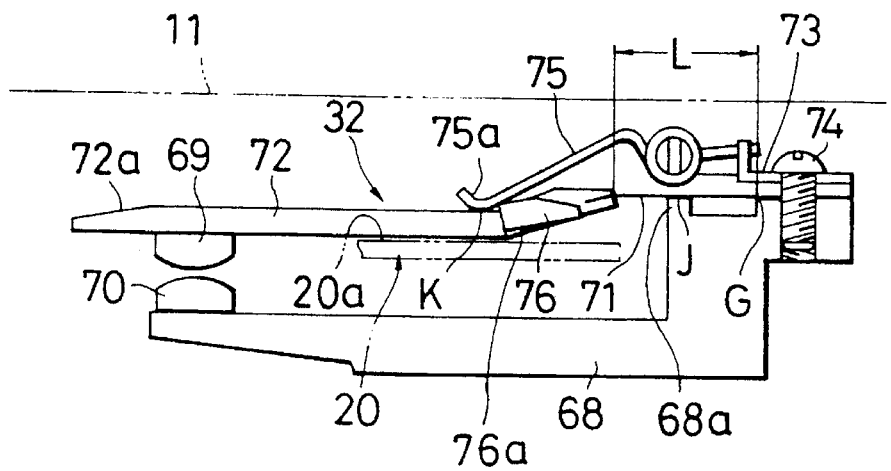
FIG. 23 is a partial side view showing the major portion of a second example of a disk drive in accordance with the present invention, illustrating a head loaded state.
Figure 24:
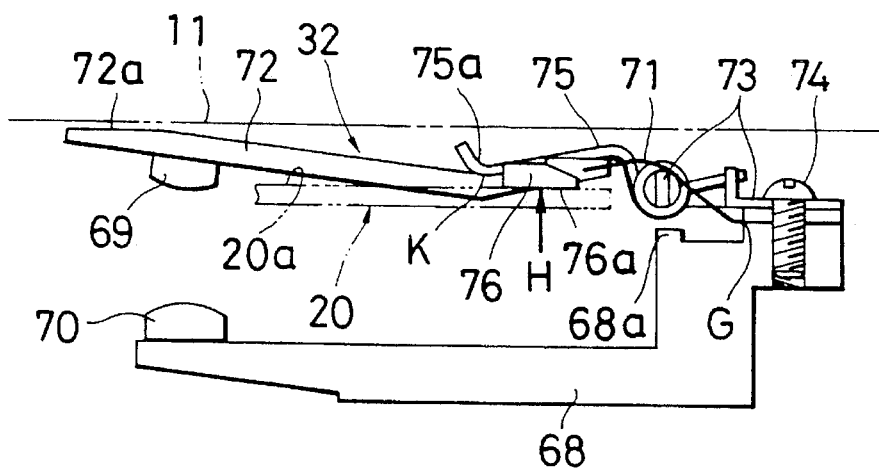
FIG. 24 is a partial side view showing the major portion of the second example of a disk drive in accordance with the present invention, illustrating a head unloaded state.
Figure 25:
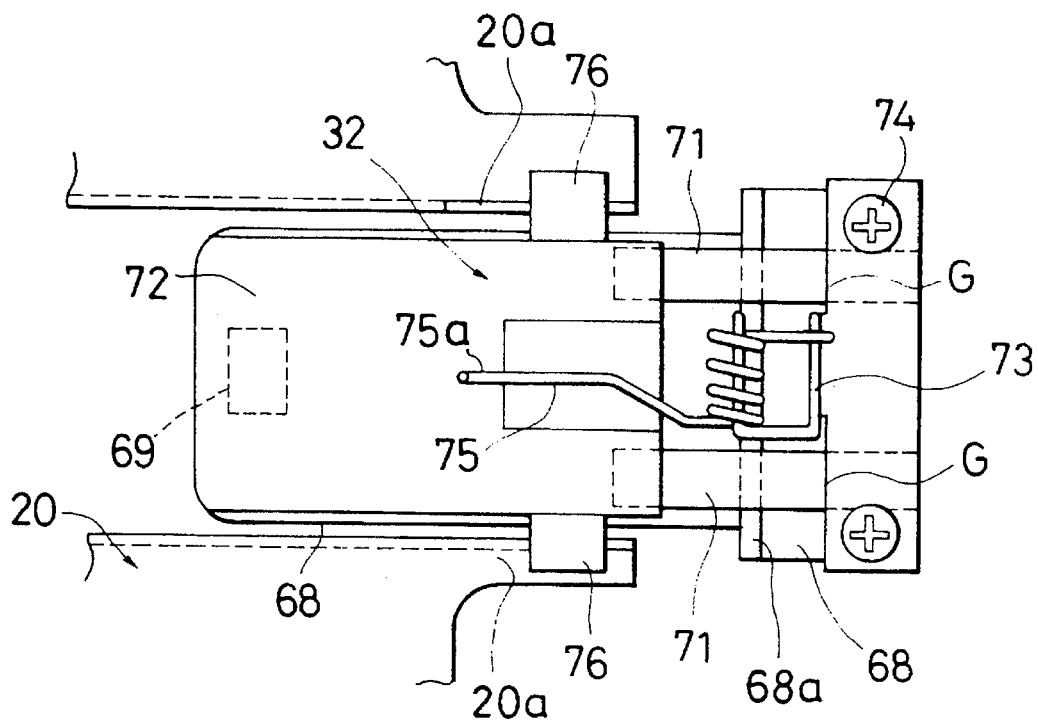
FIG. 25 is a plan view taken along the line XXV—XXV of FIG. 23.

FIGS. 23 and 24 are partial side views showing the major portion of an embodiment of a disk drive in accordance with the present invention. FIG. 23 illustrates a state in which the upper head is in a lowered position (loaded position), and FIG. 24 illustrates a state in which the heads are in non-loaded positions. FIG. 25 is a plan view taken along the line XXV—XXV of FIG. 23.

In FIGS. 23 to 25, the head arm 72 is connected through the leaf spring 71 to the carriage 68 which is supported and guided by the head seek means (FIG. 15). The head arm 72 has the upper head 69 on its top portion. The upper head 69 performs recording data on and/or reproducing data from upper tracks of a disk (recording medium). In this embodiment, the lower head 70 for recording data on and/or reproducing data from lower tracks of the disk is connected to a top portion of the carriage 68.

One end of the leaf spring 71 is fixed to the carriage 68 and the other to the head arm 72. The effective length or length of non-fixed portion, L, of the leaf spring 71 is set up to a relatively large value. In this embodiment, the leaf spring used is composed of two unit leaf springs 71 arranged separately and substantially parallel to each other so that they sandwich the coil spring 75 therebetween, as shown in FIG. 25. However, the leaf spring 71 may be composed of only one unit leaf spring or three unit leaf springs, if desired. Each of the base ends, i.e., proximal ends, G, of the leaf springs 71 on the side of the carriage 68 serves as a fulcrum for a portion movable up-and-down (or a swingable) portion composed of the leaf spring 71 and the head arm 72.

Figure 26:
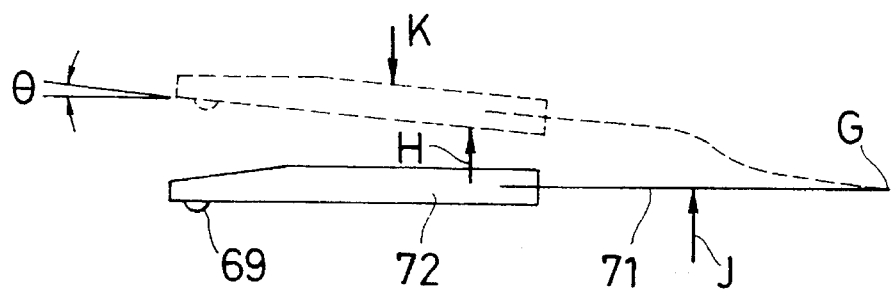
FIG. 26 is a schematic view illustrating a force acting on the head arm shown in FIGS. 23 and 24 and its action.

FIG. 26 is a schematic view illustrating a point of action at which a force acts on the head unit 32 and its action or movement when the head unit 32 goes up and down. In FIGS. 23 to 26, the head arm 72 has lifter portions (or projections) at predetermined positions thereof, more specifically, on both sides of the head arm 72 and at positions near the base portions of the leaf springs 71, respectively. The lifter portions or projections can be in contact with a guide surface 20a of the cassette guide 20. The lifter portions 76 are raised when the cassette guide 20 goes up, thereby elevating the head arm 72. The point of action at which a resultant of forces acts on one of the lifter portions is designated by "H".

On the other hand, the supporting member 73 fixed to the carriage 68 is provided with the head loading spring (e.g., torsion coil spring as shown in FIG. 25) 75, which urges the head arm 72 downward. The supporting member 73 and the leaf springs 71 are fitted to the carriage 68 with a plurality of (e.g., two as shown in FIG. 25) attaching screws 74. The head loading spring 75 pushes the upper side of the head arm 72 downward at its tip portion 75a, with the contact point between the tip portion 75a and the head arm 72 serving as a load point K of the head arm 72. In this case, the load point K is set at a position closer to the upper head 69 than the respective points of action H of the lifter portions 76.

The carriage 68 is provided with a projection or stopper 68a, which contacts the lower surface of the leaf spring 71 in the loaded state as shown in FIG. 23. The stopper 68a prevents the downward deformation of the leaf spring 71 when the head arm 72 is in the lowered state (head-loaded state) by the action of the spring 75. The position J of the stopper 68a is selected usually such that it is situated substantially at the center of the length L of the leaf spring 75 or somewhat deviated therefrom to the side of the head.

In this embodiment, each lifter portion 76 of the head arm 72 has a contact portion or surface 76a shaped such that when the lifter portion 76 is raised by the guide surface 20a of the cassette guide 20 (i.e., unloaded state), the contact portion 76a can contact the guide surface 20a over a predetermined contact distance or width (e.g., 3 to 10 mm) in the direction toward the head arm 72 as shown in FIG. 24. The contact portion 76a of each lifter portion 76a is in the form of a strip of a plane of a predetermined width. The head arm 72 has an upper surface or slant surface 72a at its nose portion, which is parallel to a lower surface 11 of an upper case (e.g., the cover 12 or the reinforcing member 17 as shown in FIG. 1A, 1B, 2A or 2B) when it is in a raised state or non-loaded state), as shown in FIG. 24. On the other hand, the guide surface 20a of the cassette guide 20 is a horizontal plane parallel to the base 10, and the contact surface 76a of the lifter portion 76 which can contact the horizontal plane over a predetermined length is also parallel to the lower surface 11 of the upper case, resulting in that when in the non-loaded state, the upper surface 72a of the head arm is parallel to the contact surface 76a of the lifter portion 76.

In FIG. 26, solid line indicates the lowered position of the head arm 72 as in FIG. 23 while broken line indicates the raised position of the head arm 72 as in FIG. 24. In this embodiment, when the head arm 72 is in the raised position, the pressing point (loading point) K of the head loading spring is set at a position closer to the upper head 69 than the point of action H of the upward force given by the cassette guide 20. As a result, a counterclockwise momentum is applied to the head arm 72. This causes the leaf springs 71 to be bent to such an extent that their nose portions become substantially horizontal, which is a so-called "drooping" or deflected state. The nose portion of the head arm 72 is relatively lowered as compared with the case where no such deflection occurs, and hence an angle of slant, θ, decreases. Since among the various components of the disk drive, the head arm 72 takes the highest position when it is in the raised state, it is possible to decrease the maximum height of the head arm 72 utilizing the "drooping" effect of the leaf spring 71, which enables reduction in the height (thickness) of the disk drive, thus making for compactness of the disk drive.

With the shape of the contact surface 76a of the lifter portion 76 allowing it to contact the guide surface 20a of the cassette guide 20 over a predetermined contact width when the head is raised, the position of the nose portion of the head arm 72 supported by the leaf springs 71 can be stabilized even when the head is in the raised state. Accordingly, gap between the head arm 72 and the lower surface of the upper case can be minimized, which again adds to the reduction in size or thickness of the disk drive.

The upper surface 72a of the head arm 72 being parallel to the contact surface 76a of the lifter 76 also minimizes the maximum height of the head arm 72 in the raised state, which makes the disk drive thinner.

Figure 28:
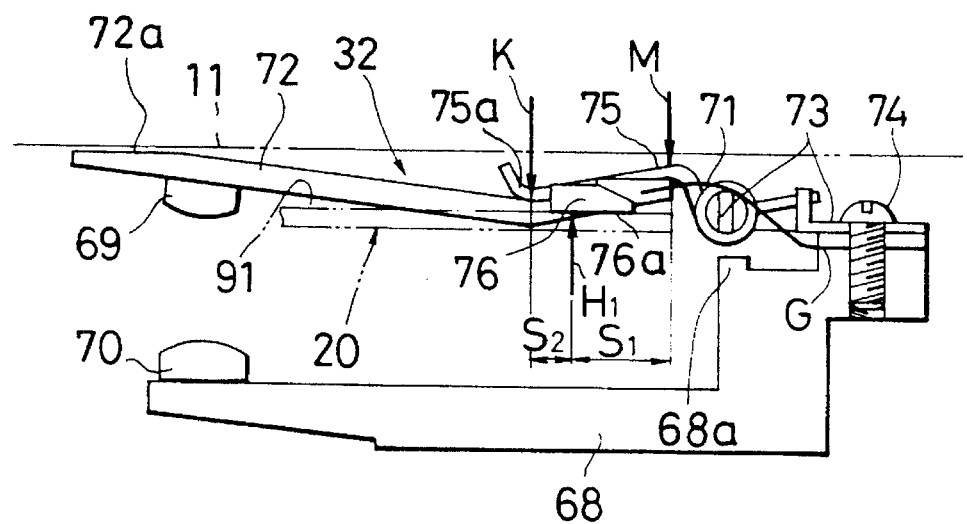
FIG. 28 is a partial side view of the disk drive of FIGS. 25 illustrating an example of shifting of reaction force in the lifter portion where the downward force applied to a head arm is larger than that applied to a leaf spring.
Figure 29:
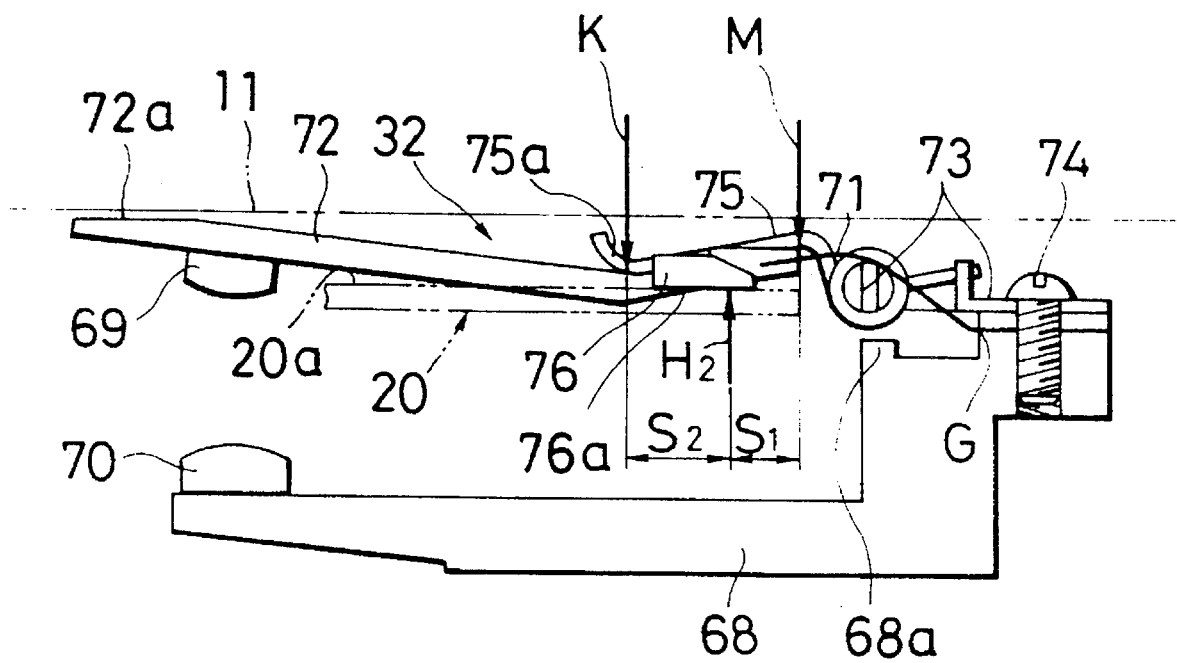
FIG. 29 is a partial side view of the disk drive of FIGS. 25 illustrating an example of shifting of reaction force in the lifter portion where the downward force applied to the head arm is smaller than that applied to the leaf spring.

Next, more concrete explanation will be made on the effect of the contact portion 76a of the lifter portion 76 in the form of a plane having a predetermined contact width. FIG. 27 illustrates a reference construction where the lifter portion 76 has the same shape and structure as a lifter portion used in a conventional disk drive; and FIGS. 28 and 29 illustrate cases where the contact portion 76a of the lifter portion 76 is a plane having a predetermined contact width according to the invention. In FIGS. 27 to 29, when the cassette guide 20 is in the raised state, the head arm 72 is pushed downward by the head loading spring 75 at the point K, and at the same time a downward force is urged on the leaf spring 71 at the point M. On the other hand, the lifter portion 76 of the head arm 72 is supported on the guide surface 20a of the cassette guide 20.

In the comparative case illustrated in FIG. 27, the lifter portion 76 is shaped such that the contact portion H thereof makes a linear contact with the guide surface, as adopted in a conventional disk drive, in order to reduce a sliding resistance generated upon a returning action, or unload-seeking, of the head carriage 68 in which the carriage 68 returns to the original starting position when the cassette guide 20 is in the raised position. Further, the load point K of the head loading spring 75 and the load point M of the leaf spring 71 are related to the contact point H of the lifter portion 76 such that the downward forces and distances satisfy the following equation:

$$KS_2 = MS_1$$

where K and M are strengths of the downward forces urged at the points K and M, respectively; $S_1$ is a distance between lines passing the point H and M and in the directions of the forces H and M, respectively, and in the directions of the forces urged at the points H and M; and $S_2$ is a distance between lines passing the points H and K, respectively, and in the direction of the forces urged at the points H and K, respectively.

In this case, there is a possibility that the downward forces K and M could be imbalanced due to fluctuation or difference of the kind of material and degree of processing. If the downward force urged at the load point K is stronger than that urged on the point M, a force will be urged on the upper head 69 to push it downward while on the contrary, if the downward force urged at the load point M is stronger than that urged at the load point K, a force will be urged on the upper head 69 to push it upward, thus generating fluctuation in the pressing force of the upper head 69. Because of the contact portion H of the lifter portion 76 being in a linear contact, the imbalance between the forces K and M results in fluctuation in the vertical position of the upper head 69. This gives rise to disadvantages that if the head 69 is situated in a lower position it will come into contact with a cassette inserted in the disc drive while if the head 69 is in an upper position, the head arm 72 come into contact with the case.

In contrast to the comparative construction, the disk drive according to this embodiment of the present invention is free of the above-described disadvantages even when there occurs the aforementioned imbalance between the forces K and M because the contact portion 76a of the lifter portion 76 is in a plane contact in a plane having a predetermined width. Assuming that the force given by the head loading spring 75 is, for example, 50 g ±10 g, and the force given by the leaf springs 71 is 50 g±10 g, then there is a possibility that the force actually given by the head loading spring 75 is 60 g, and that given by the leaf springs 71 is 40 g. That is, if the value at the point K is greater than the value at the point M, then a point of reaction force Hi urged on the lifter portion 76 to push it upward will be shifted from the center toward the side of the head 69 so that the reaction force can be balanced against the forces K and M, as illustrated in FIG. 28. More particularly, from the relationships:

$$K>M; \text{ and}$$

$$KS_2 = MS_1$$

the position of the point Hi is determined such that $S_2 < S_1$.

The converse is true. That is, if the fluctuation in the forces is reversed, i.e., the following relationships are met:

$$K<M; \text{ and}$$

$$KS_2 = MS_1$$

the point $H_2$ of reaction force will be shifted from the center toward the side of the leaf springs 71, and the position of the point H2 is determined such that $S_2 > S_1$, as illustrated in FIG. 29.

From the above consideration, according to the construction of this embodiment, the disadvantages such as fluctuation in the pressing force given by the head 69 or instability of the vertical position of the head 69, as encountered in the conventional disk drive with a construction in which the contact portion H of the lifter portion 76 is in a linear contact with the guide surface of the cassette guide, can be eliminated by setting up the contact width of the contact portion 76a of the lifter portion 76 in a range which covers ranges of fluctuation of the forces K and M, respectively, and range of distance in which the point H of reaction force is shifted.

THIRD EXAMPLE

Figure 30:
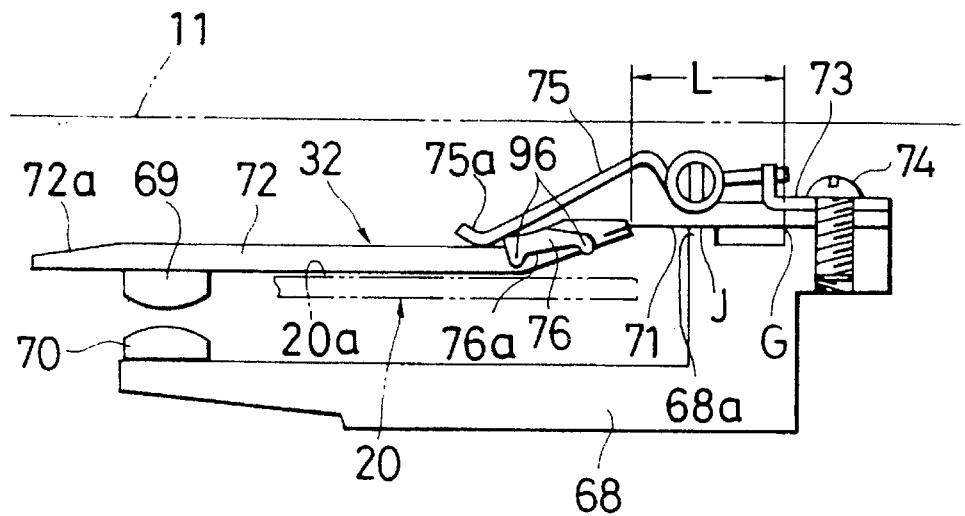
FIGS. 30 and 31 are partial side views, respectively, showing the major portion of a third example of a disk drive in accordance with the present invention, with FIG. 30 illustrating a head loaded state and FIG. 31 a head unloaded state.
Figure 31:
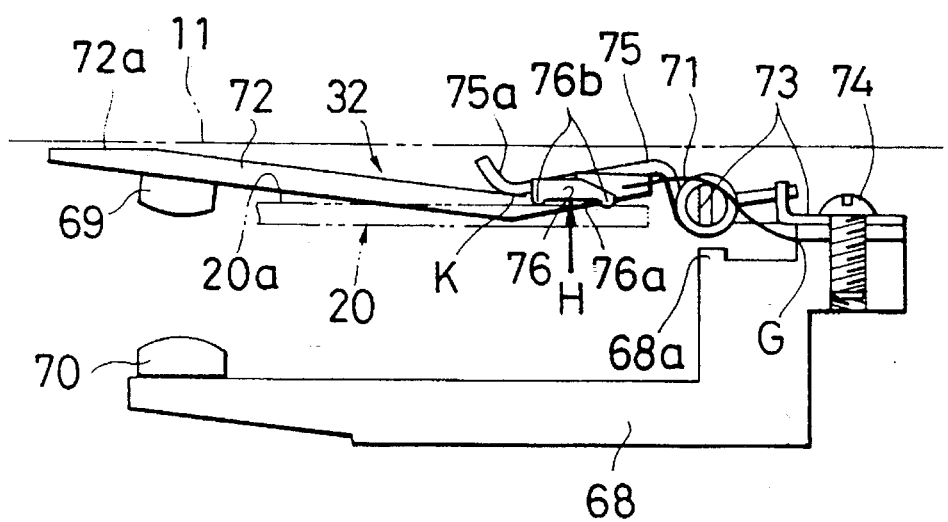

FIGS. 30 and 31 are partial side views, respectively, showing major components of a disk drive according to an embodiment of the present invention. FIG. 30 shows the head 69 in its lowered (loaded) state; and FIG. 31 shows the head 69 in its raised (unloaded) state. This embodiment is the same as the second example above except that the lifter portion 76 has a pair of protrusions 76b on the contact portion 76a spaced apart at a predetermined distance from one another along the length of the head arm 72. In FIGS. 30 and 31, the protrusions are formed at both ends of the contact portion 76a along the length of the head arm 72. The protrusions 76b have a round contour. Other parts or components are substantially the same as in the second embodiment and like parts are designated by like reference numerals and detailed explanation thereof are omitted here. This embodiment gives the same effects as those obtained in the second example described above.

FOURTH EXAMPLE

Figure 32:
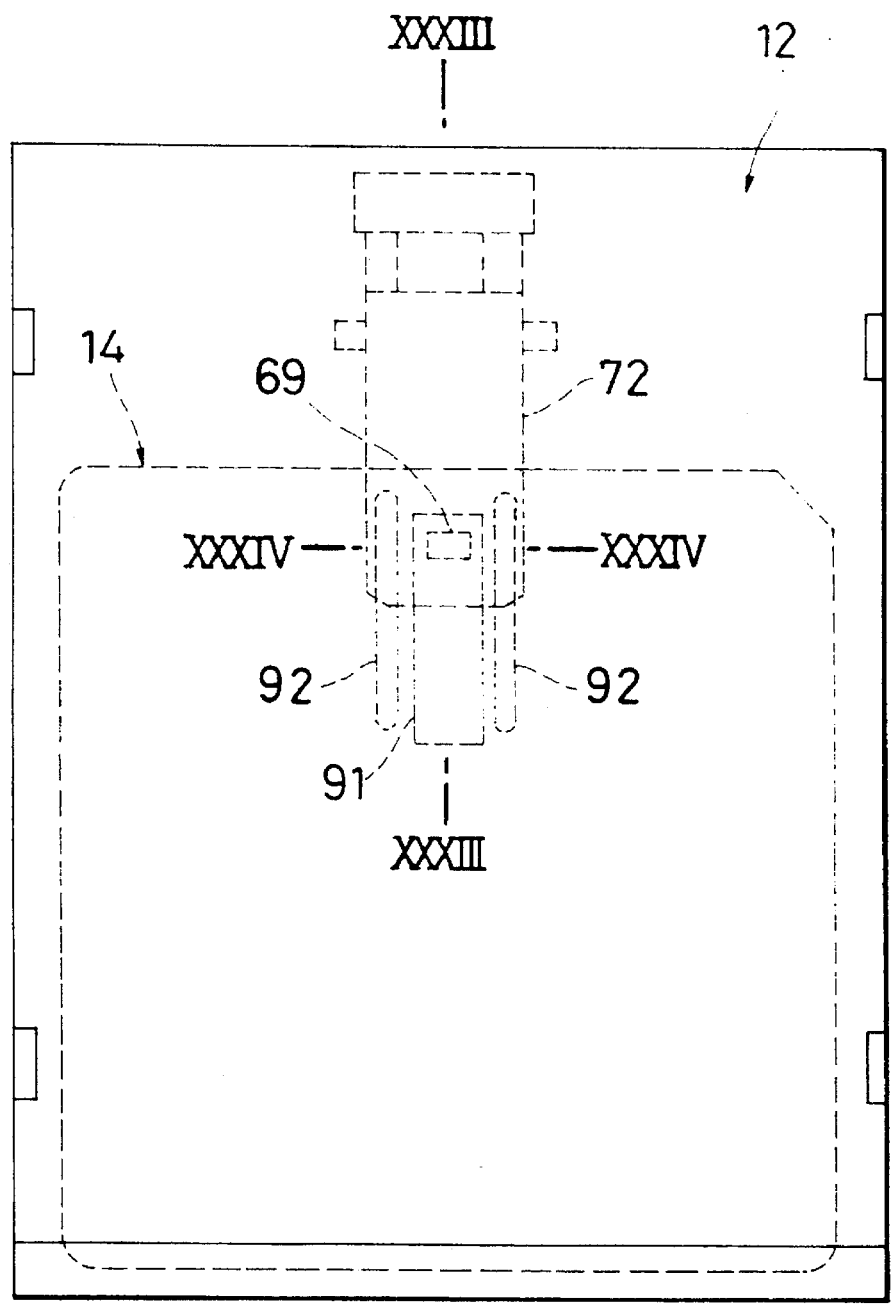
FIG. 32 is a top plan view showing the major portion of a fourth example of a disk drive in accordance with the present invention.
Figure 33:
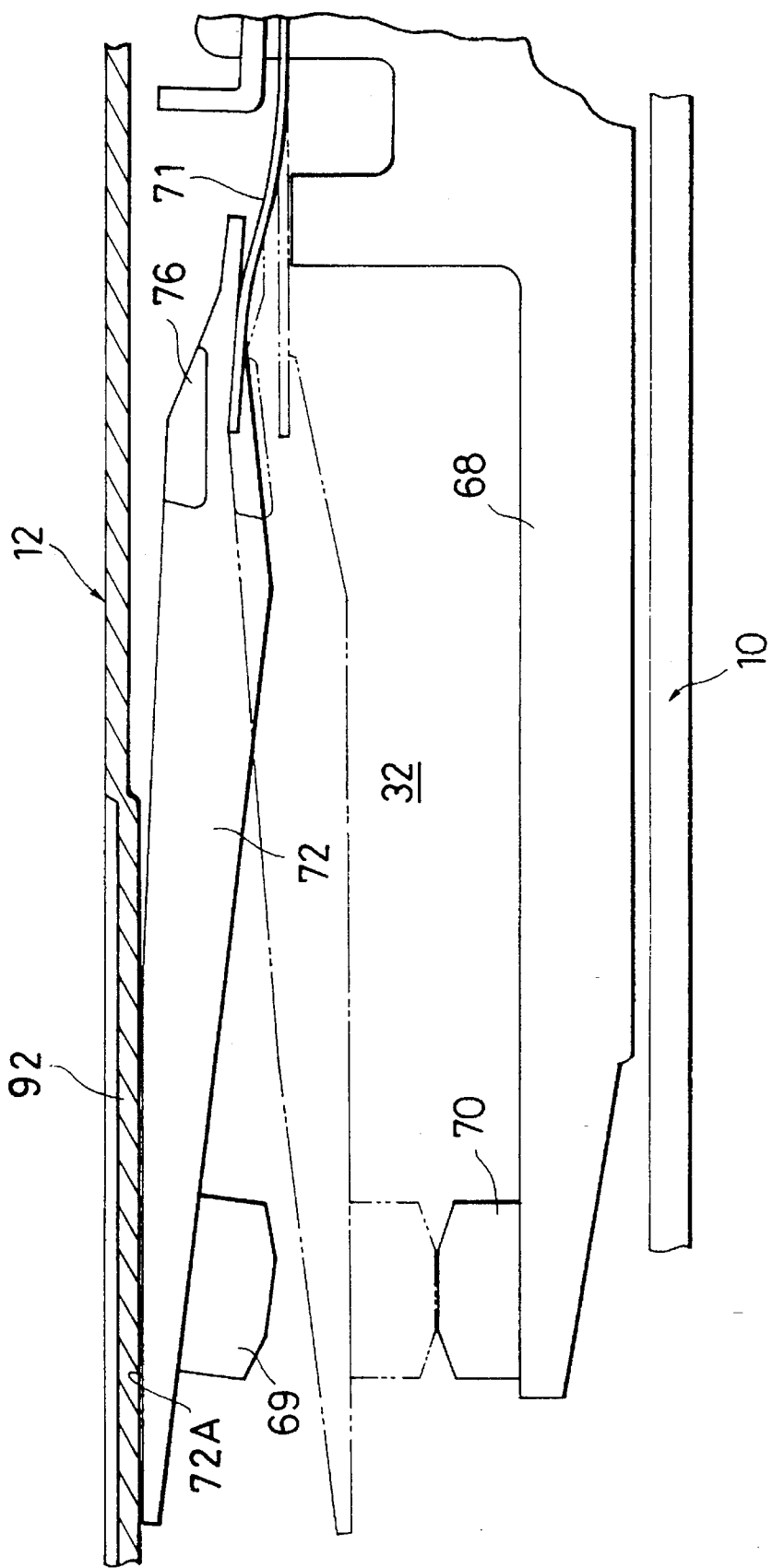
FIG. 33 is a partial cross sectional view taken along the line XXXIII—XXXIII of FIG. 32.
Figure 34:
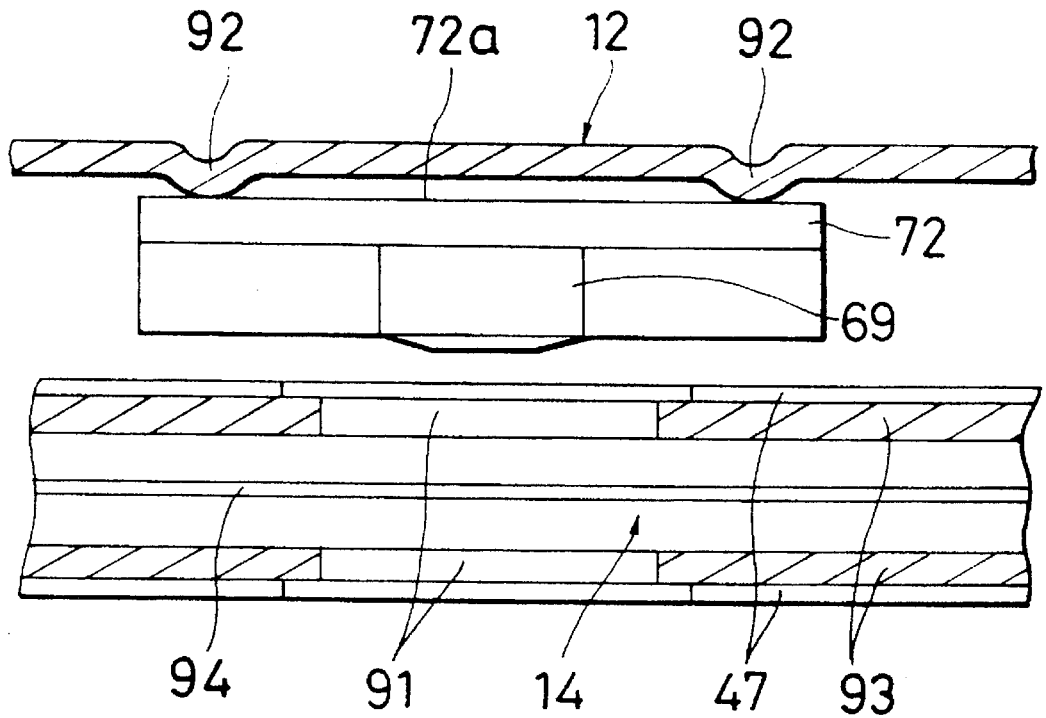
FIG. 34 is a partial cross sectional view taken along the line XXXIV—XXXIV of FIG. 32.

FIG. 32 is a plan view showing the major portion of an embodiment of a disk drive in accordance with the present invention. FIG. 33 is a cross sectional view taken along the line XXXIII—XXXIII of FIG. 32. FIG. 34 is a cross sectional view taken along the line of XXXIV—XXXIV of FIG. 32. As shown in FIGS. 32 to 34, the disk cassette 14 is provided with a head accepting aperture 91 which can be opened by moving the shutter 47 by means of the shutter lever 112 (FIG. FIG. 4) upon the insertion of the cassette 14. The head accepting aperture 91 is provided on each side of the disk cassette 14 (FIG. 34) and the both apertures 91 can be opened simultaneously by moving or shifting the shutter 47. Upon loading, the upper and lower heads 69 and 70, respectively, are inserted through the apertures 91 and brought in contact with a disk (recording medium) 94, and moved in the radial direction for seeking appropriate tracks for recording data thereinto or reproducing data therefrom. As shown in FIG. 34, the disk cassette 14 holds the disk 94 rotatably in a cassette case 93. The head accepting apertures 91 are formed in the cassette case 93.

When the head arm 72 is raised (unloaded), the nose portion of the head arm 72 contacts the inner surface of the cover 12 at the upper surface 72a of the head arm 72. This controls the height of the raised position of the head arm 72. In this embodiment, the cover 12 has two beads or ribs 92 extending inward on respective sides of the aperture 91 so that they can contact the head arm 72 on both sides thereof. The beads 92 serve as a stopper portion for controlling the height of the raised position of the head arm 72. The length of each bead 92 is set up to a value suitable for the seeking action (moving) of the head arm 72. The positions of the beads, i.e., contact positions of the head arm 72 and the cover 12 are situated at positions remote from the head accepting aperture 91. It is preferred that the beads 92 are situated as remote as possible from the head accepting aperture 91.

With the above construction, the head arm 72 can be held in slidable contact with the head cover 12, more specifically with the beads 92, to control the uppermost position, resulting in that the thickness (height) of the disk drive can be made lower than the case where a stopper is provided, thus making for compactness of the disk drive. In addition, selection of the position of the stopper portion 92 for the head arm 72 at a position remote from the head accepting aperture 91 prevents invasion of dust produced upon the sliding of the head arm 72 on the stopper portion 92 of the cover 12, thus avoiding the possibility that the disk 94 is damaged with dust or the like.

FIFTH EXAMPLE

Figure 35:
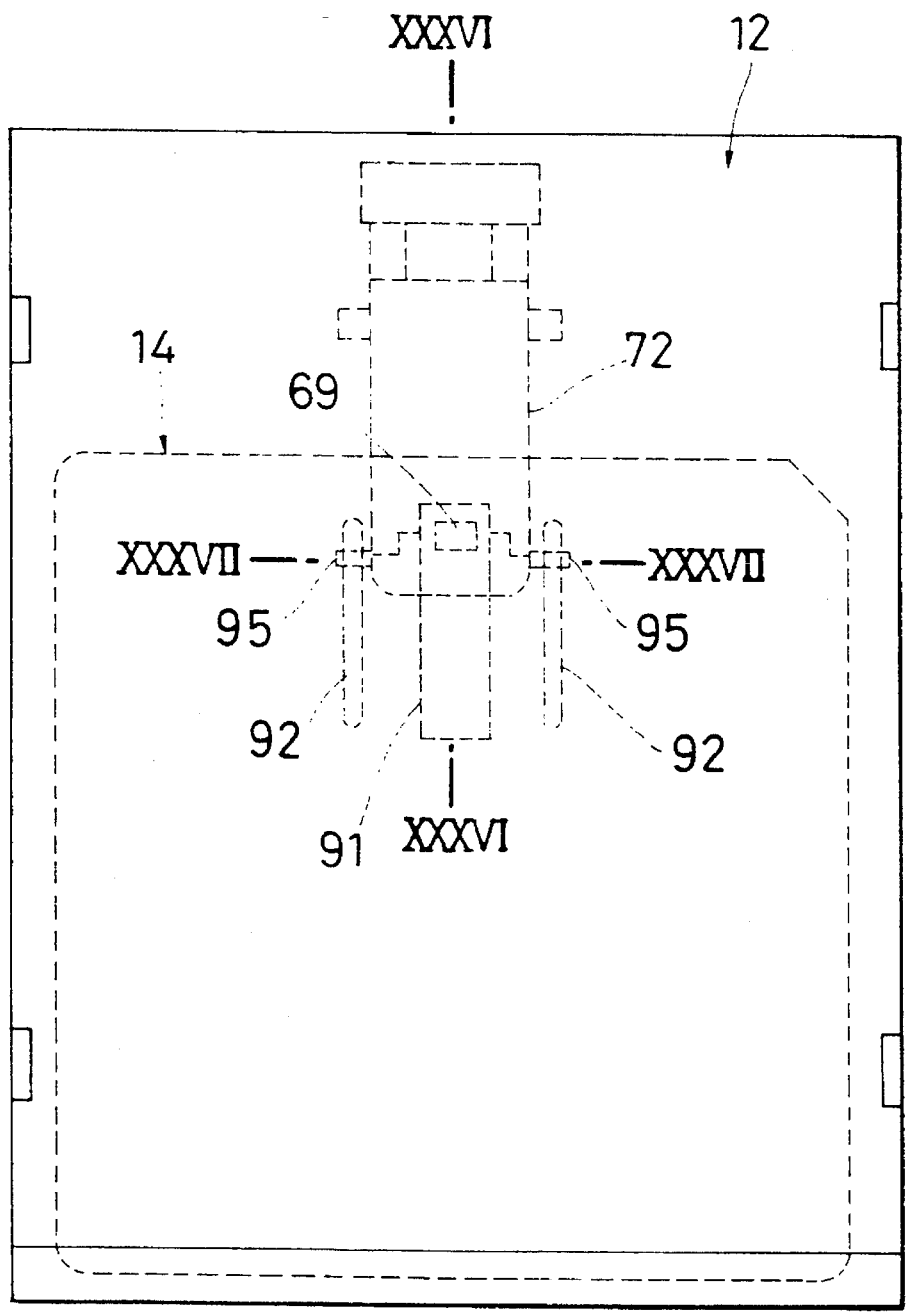
FIG. 35 is a top plan view showing the major portion of a fifth example of a disk drive in accordance with the present invention.
Figure 36:
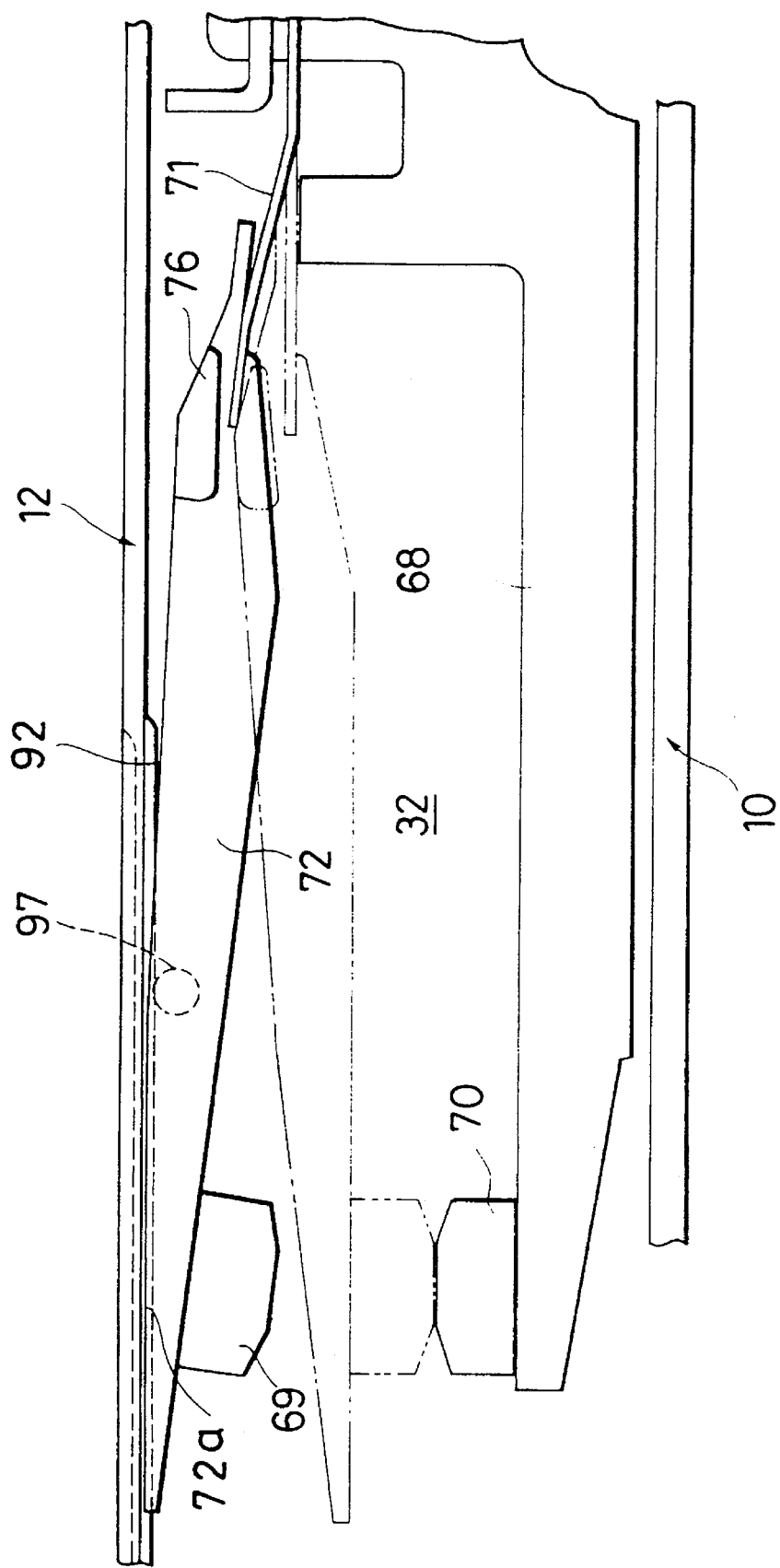
FIG. 36 is a partial cross sectional view taken along the line XXXVI—XXXVI of FIG. 35.
Figure 37:
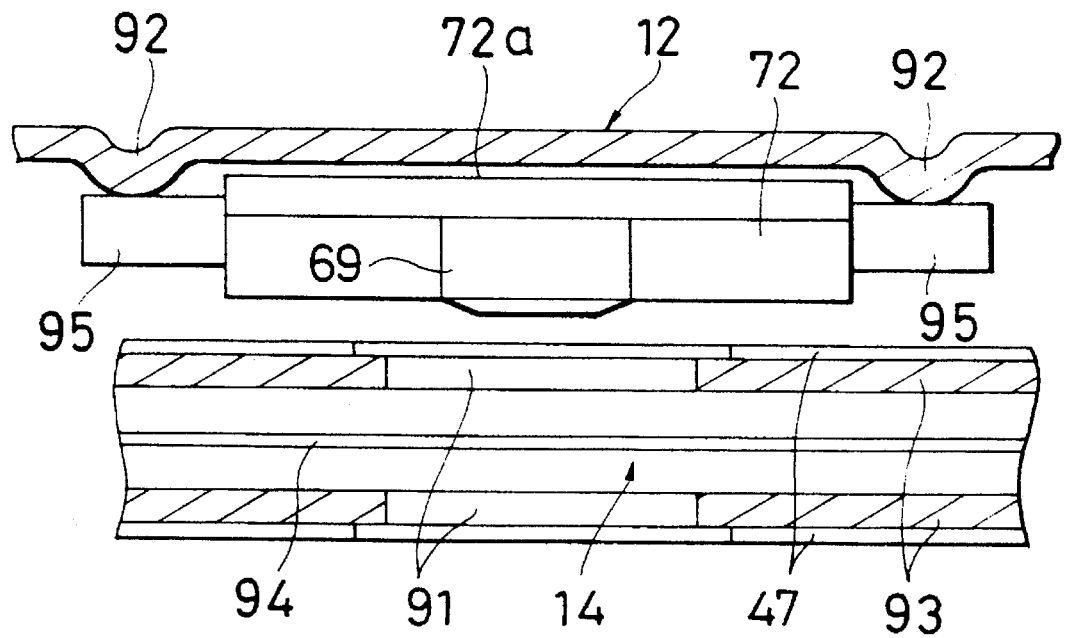
FIG. 37 is a partial cross sectional view taken along the line XXXVII—XXXVII of FIG. 35.

FIG. 35 is a plan view showing the major portion of an embodiment of a disk drive in accordance with the present invention. FIG. 36 is a partial cross sectional view taken along the line XXXVI—XXXVI of FIG. 35. FIG. 37 is a cross sectional view taken along the line of XXXVII—XXXVII of FIG. 35. As shown in FIGS. 35 to 37, a stopper boss 95 is provided on each side of the head arm 72, which is in a slidable contact with the corresponding bead 92 of the cover 12. As a result the height of the raised position (unloaded position) of the head arm 72 is controlled. In this case, the positions of the stopper bosses 95 (positions of contact portions between the head arm 72 and the cover 12) are selected to be sufficiently remote from the both sides of the head accepting aperture 91. The stopper bosses 95 are formed at positions slightly lower than the level of the upper surface 72a of the nose portion of the head arm 72. Other components are substantially the same as the corresponding ones in the fourth embodiment described above. Like parts are indicated with like reference numerals and detailed explanation thereon is omitted here.

According to the arrangement shown in FIGS. 35 to 37, the same effects as those in FIGS. 32 to 34 can be obtained. In addition, contact of the stopper bosses 95 provided on the both sides of the head arm 72 with the stopper portion 92 of the cover 12 makes it possible to set the position of the cover 12 as low as possible such that the upper surface 72a almost contact the inner surface of the cover 12. Therefore, as compared with the arrangement shown in FIGS. 32 to 34, the thickness of the disk drive can be made smaller by about the height of the beads 92, leading to a further reduction in the thickness of the disk drive. Also, the horizontal positions of the beads 92 may be selected so that the distance between the beads 92 can be made larger than the width of the head arm 72, resulting in that the distance between the positions at which the head arm 72 is sliding and the both edges of the head accepting aperture 91 are made greater, and hence invasion of dust such as abrasion dust into the head accepting aperture 91 can be prevented more firmly.

SIXTH EXAMPLE

Figure 38:
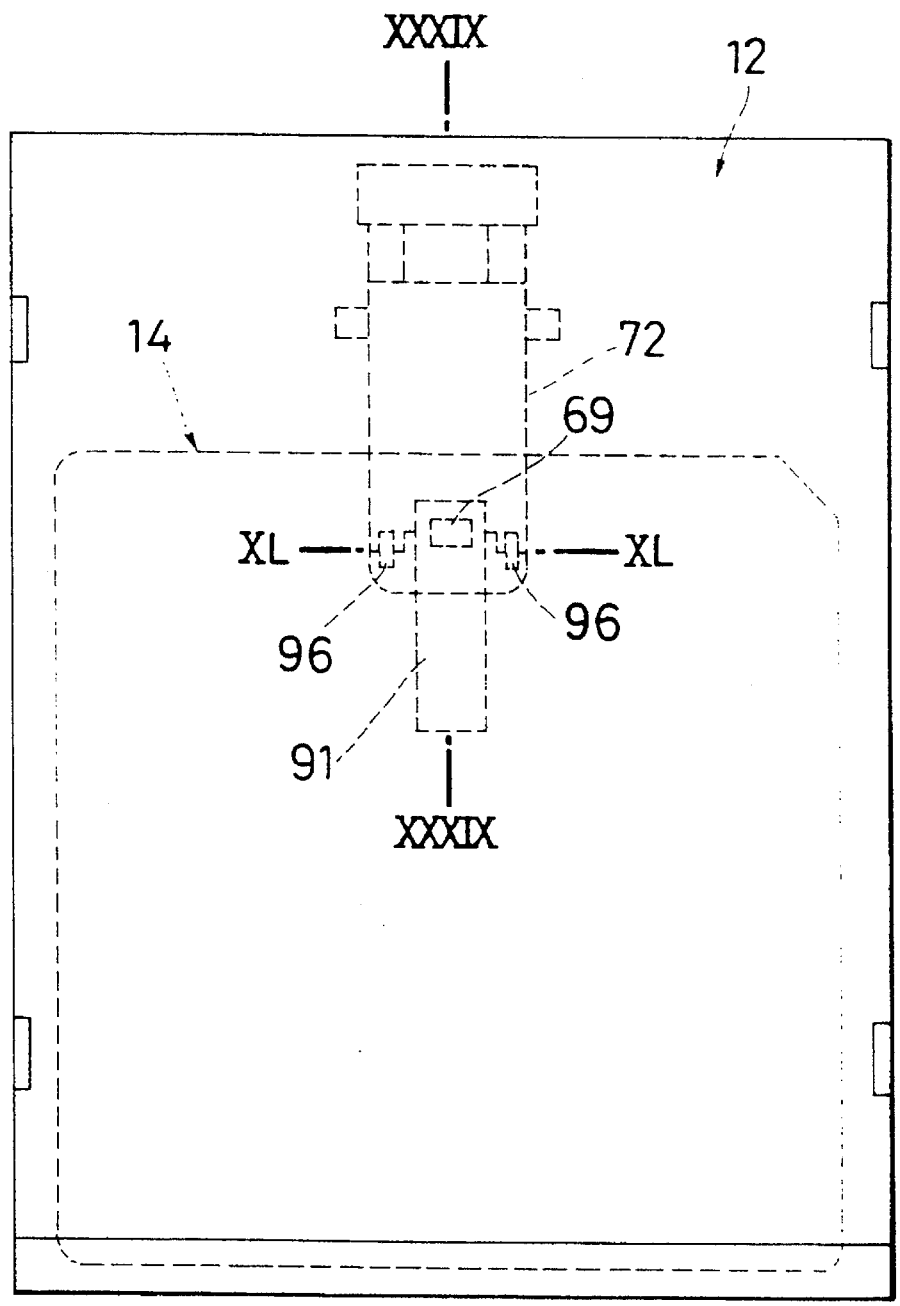
FIG. 38 is a top plan view showing the major portion of a sixth example of a disk drive in accordance with the present invention.
Figure 39:
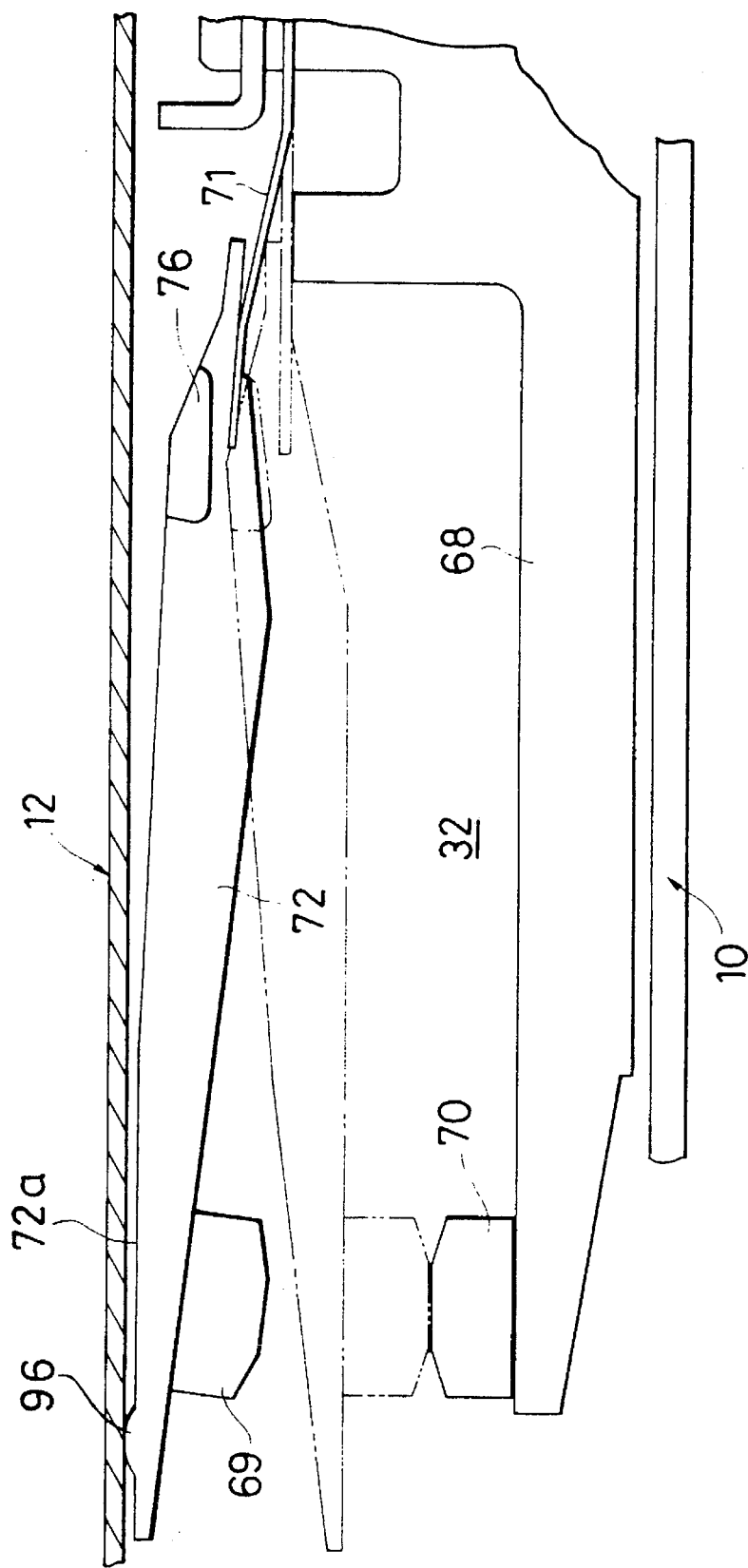
FIG. 39 is a partial cross sectional view taken along the line XXXIX—XXXIX of FIG. 38.
Figure 40:
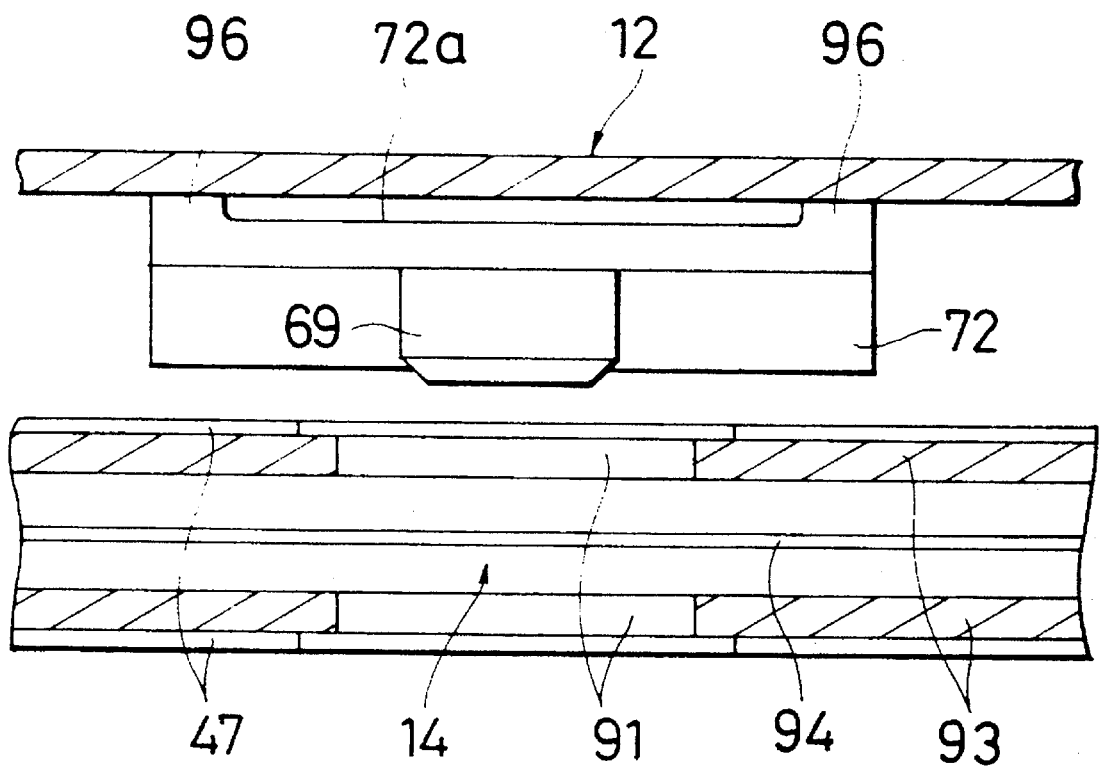
FIG. 40 is a partial cross sectional view taken along the line XL—XL of FIG. 38.

FIG. 38 is a plan view showing the major portion of an embodiment of a disk drive in accordance with the present invention. FIG. 39 is a partial cross sectional view taken along the line XXXIX—XXXIX of FIG. 38. FIG. 40 is a cross sectional view taken along the line of XL—XL of FIG. 38. In the arrangement shown in FIGS. 38 to 40, a protrusion 96 as a stopper is provided on each side of the upper surface 72a of the head arm 72. The protrusions 96 slidably contact the cover 12 to control the raised position (unloaded position) of the head arm 72. The horizontal positions of the protrusions 96 (position of the contact portion between the head arm 72 and the cover 12) are so selected that the stoppers 96 are remote outwardly from the both edges of the head accepting aperture 91. In other words, the arrangement according to this embodiment corresponds to that of the fourth example above as shown in FIGS. 32 to 34 except that the protrusions 96 are used as a stopper in place of the beads 92. Other components are substantially the same as those in the fourth embodiment, and like parts are indicated by like reference numerals. Therefore, detailed explanation thereon is omitted here.

The arrangement shown in FIGS. 38 to 40, like that shown in FIGS. 32 to 34, can decrease the thickness (height) of the disk drive to a larger extent than the conventional disk drive with the stoppers being provided otherwise. Thins reduces the thickness of the disk drive. Selection of the positions of the slidable stopper portions 96 of the head arms 72 at positions remote outwardly from the head accepting aperture 91 prevents the invasion of dusts such as abrasion dust through the aperture 91, thus avoiding a possibility that the disk 94 is damaged by the dust or the like.

SEVENTH EXAMPLE

Figure 41:
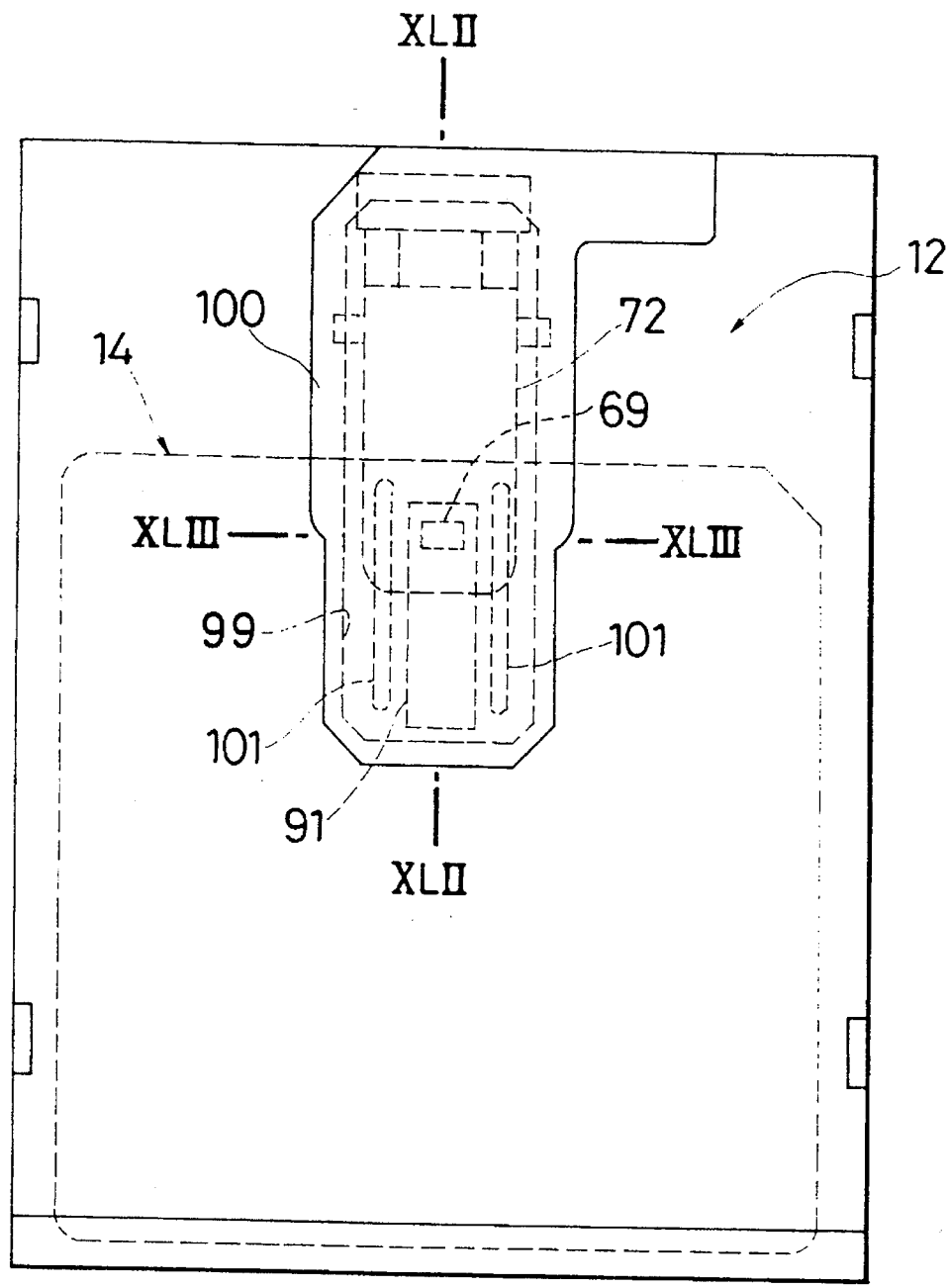
FIG. 41 is a top plan view showing the major portion of a seventh example of a disk drive in accordance with the present invention.
Figure 42:
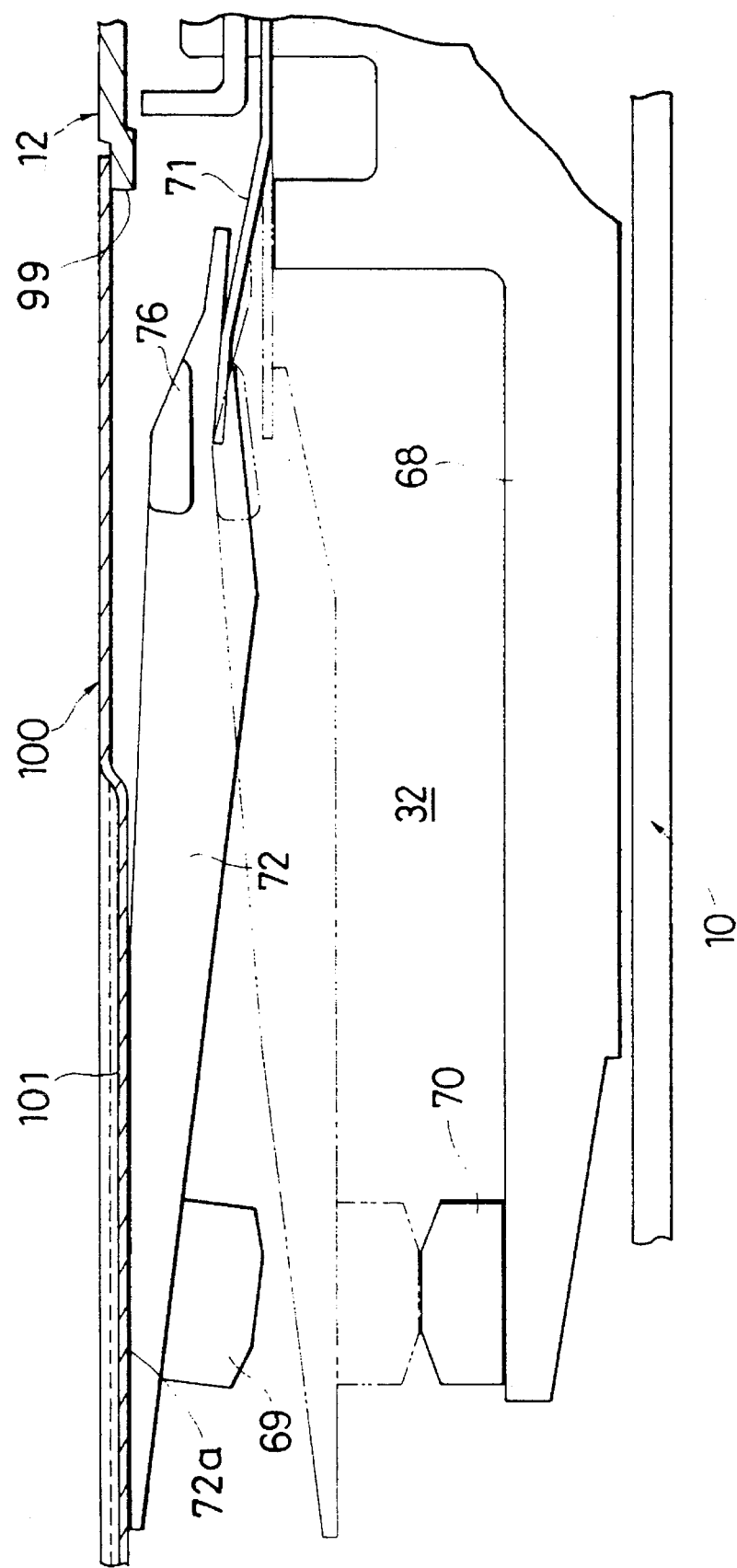
FIG. 42 is a partial cross sectional view taken along the line XLII—XLII of FIG. 41.
Figure 43:
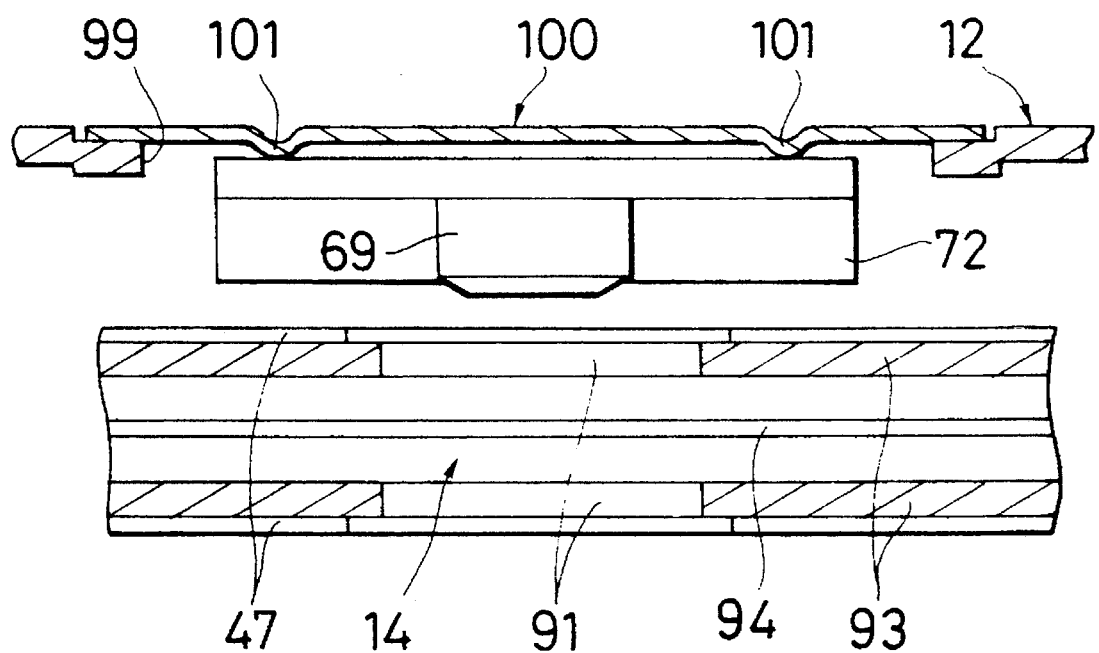
FIG. 43 is a partial cross sectional view taken along the line XLIII—XLIII of FIG. 41.

FIG. 41 is a plan view showing the major portion of an embodiment of a disk drive in accordance with the present invention. FIG. 42 is a partial cross sectional view taken along the line XLII—XLII of FIG. 41. FIG. 43 is a cross sectional view taken along the line XLIII—XLIII of FIG. 41. In the arrangement shown in FIGS. 41 to 43, an aperture 99 is formed in a region of the cover 12 corresponding to the head unit 32, and a cap 100 made of a thin plate is fitted in the aperture 99 so that the cap 100 can serve as a stopper portion for controlling the raised position of the head arm 72. In the arrangement shown in FIGS. 41 to 43, the cap 100 has, on its lower surface, beads 101 serving as a stopper for controlling the raised position of the head arm 72. The horizontal positions of the beads 101 are so selected that the beads 101 are as remote as possible outwardly from the both edges of the head accepting aperture 91 (substantially the same horizontal positions in the arrangement shown in FIGS. 32 to 34). The thickness of the cover 12 is selected to be, for example, about 0.2 to 0.6 mm while the thickness of the cap 100 may be selected to be about 0.08 to 0.15 mm. Other components are substantially the same as those in the fourth example above, and like parts are indicated by like reference numerals. Therefore, detailed explanation thereon is omitted here.

With the arrangement shown in FIGS. 41 to 43, the same effects as those obtained in the arrangement shown in FIGS. 32 to 34 can be obtained. In addition, slidable contact of the head arm 72 with the stopper portions 101 formed on the cap 100 which is of a smaller thickness than that of the cover 12 can decrease the height of the cover 12 corresponding to the uppermost height of the head arm 72. Therefore, as compared with the arrangement shown in FIGS. 32 to 34, the thickness of the disk drive can be reduced further by a difference between the thickness of the cover 12 and that of the cap 100. Since the cap 100 can be fitted to the cover 12 detachably, the user can access to the head unit 32 only by removing the cap 100, which increases the operability of the service and inspection of the disk drive.

With the above-described arrangement, the cover 12 or the head arm 72 is provided with protrusions (stoppers) 96 to decrease the sliding resistance. However, the protrusions 96 are optional and the head arm 72 may be brought in a surface-to-surface contact with the cover 12. In this case, the contact surface of the cover 12 or of the head arm 72 may be provided with a sheet or the like made of a lubricating material such as Teflon (polytetrafluoroethylene) affixed thereto. Further, only one protrusion 96 may be provided in the central portion of the contact surface of the head arm 72 instead of two protrusions provided on respective sides thereof.

EIGHTH EXAMPLE

Figure 44:
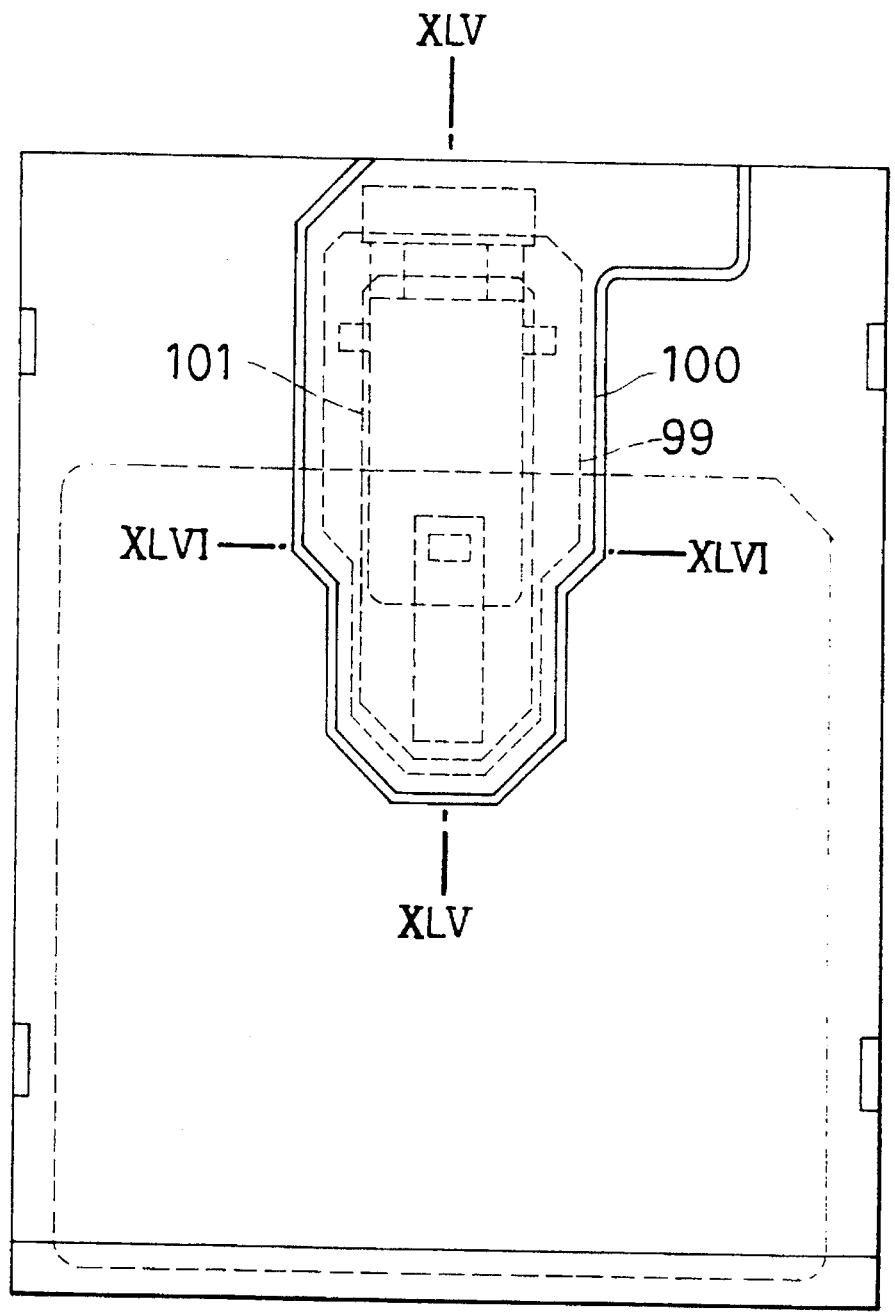
FIG. 44 is a top plan view showing the major portion of an eighth example of a disk drive in accordance with the present invention.
Figure 45:
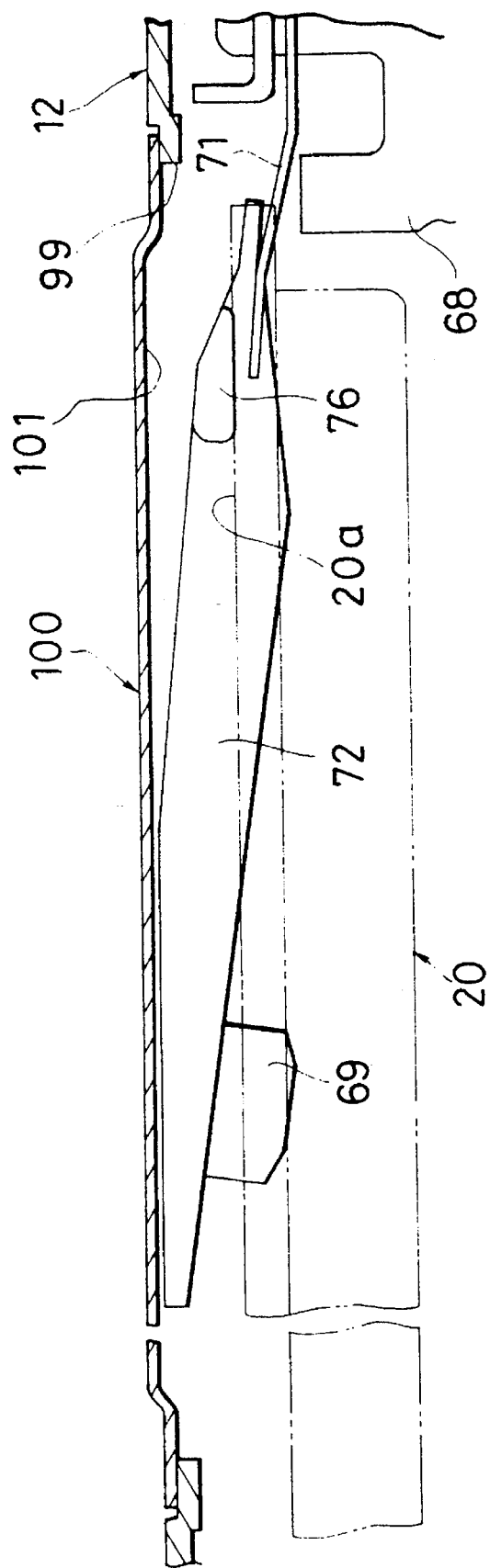
FIG. 45 is a partial cross sectional view taken along the line XLV—XLV of FIG. 44.
Figure 46:
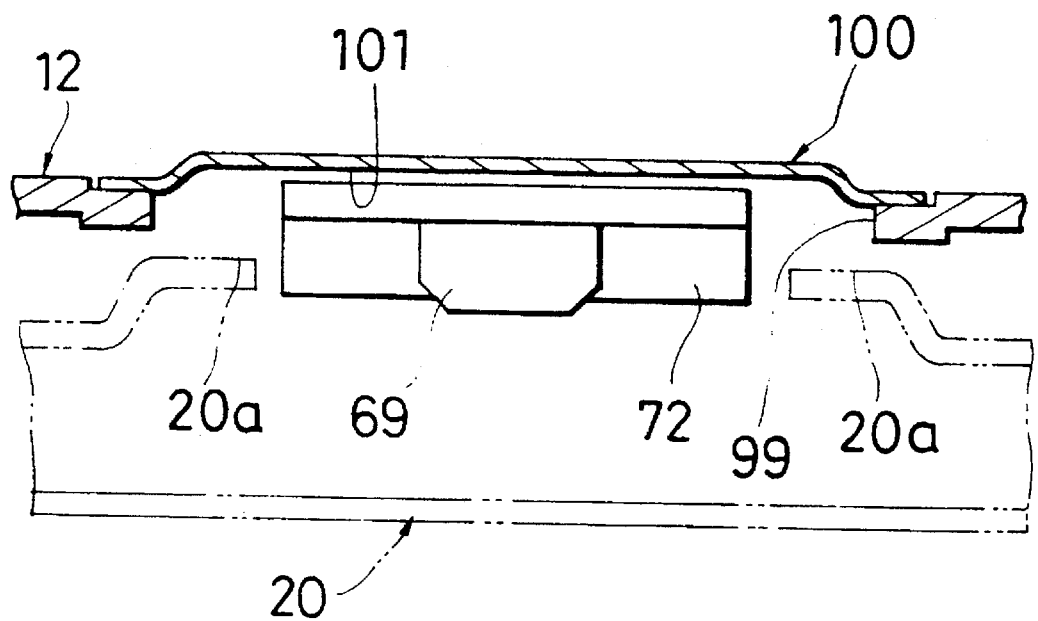
FIG. 46 is a partial cross sectional view taken along the line XLVI—XLVI of FIG. 44.

FIG. 44 is a plan view showing the major portion of an embodiment of a disk drive in accordance with the present invention. FIG. 45 is a partial cross sectional view taken along the line XLV—XLV of FIG. 44. FIG. 46 is a cross sectional view taken along the line of XLVI—XLVI of FIG. 44. In the arrangement shown in FIGS. 44 to 46, an aperture 97 formed in a region of the cover 12 corresponding to the head unit 32 fitted to the upper opening of the base 10. The cap 100 made of a thin plate is detachably attached to the opening portion 99. The cap 100 has a concave portion 101a (upward protrusion) in a region corresponding to the head arm 72.

As shown in FIGS. 45 and 46, the concave 101a serves as a space for housing the uppermost portion of the head arm 72 in the raised position (unloaded position). The depth of the concave is, for example, about 0.5 to 1.2 min. The head arm 72 is held in the raised position as shown in FIGS. 45 and 46, because the lifter portion 76 is elevated by the guide surface 20a of the cassette guide 20 which has been elevated upon unloading the head. The cap 100, like the cover 12, is formed of a non-magnetic metallic material such as aluminum so as to function as a shield cover for preventing the occurrence of noises and the invasion of dust.

Figure 47:
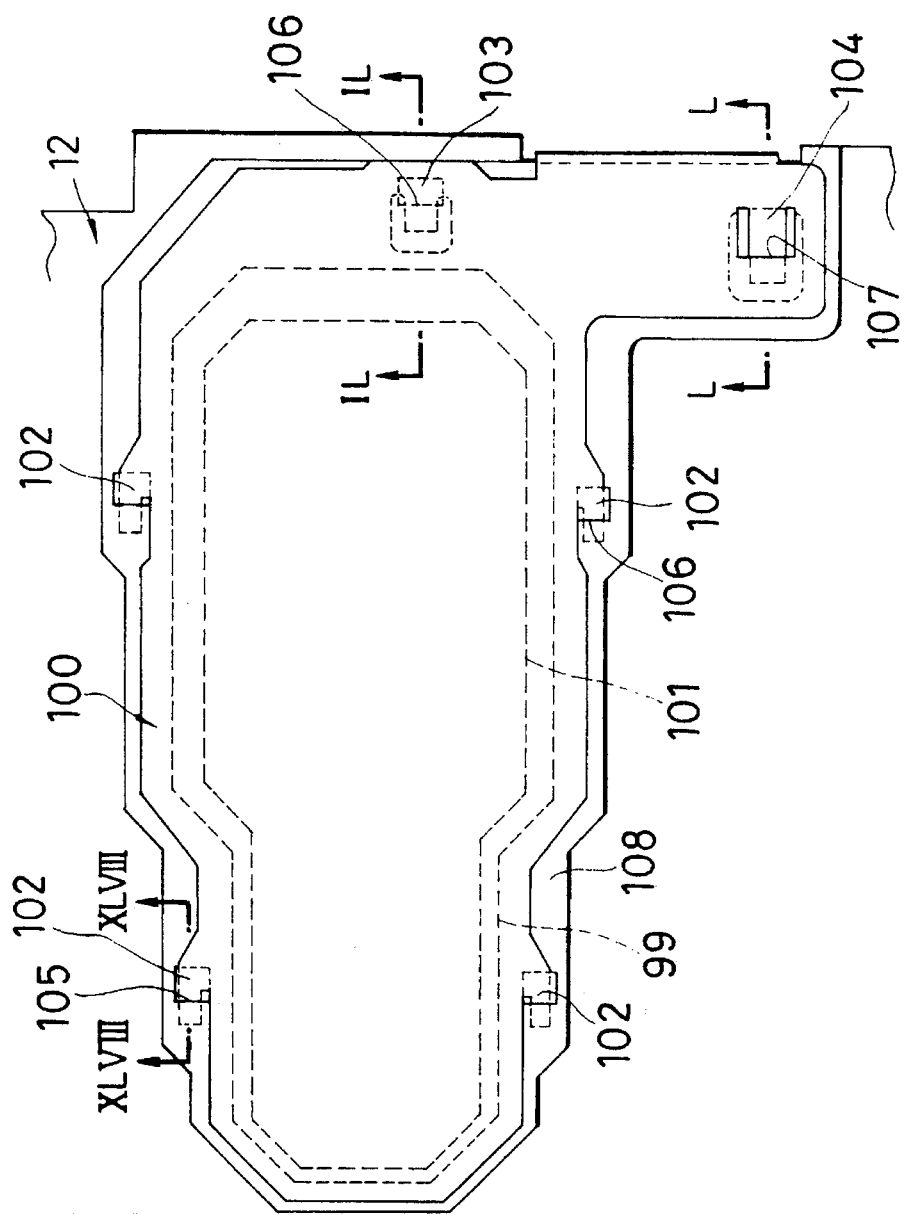
FIG. 47 is a partial top plan view illustrating attachment of the cap of FIG. 44.
Figure 48:
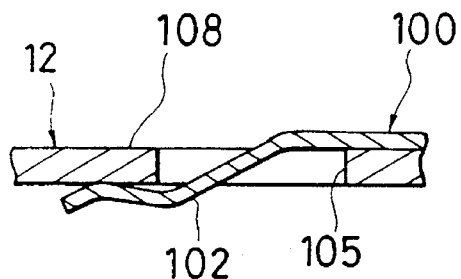
FIG. 48 is a partial cross sectional view taken along the line XLVIII—XLVIII of FIG. 47.
Figure 49:
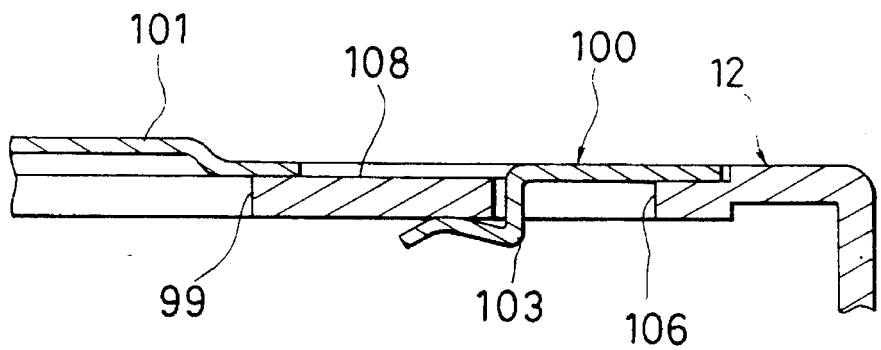
FIG. 49 is a partial cross sectional view taken along the line IL—IL of FIG. 47.
Figure 50:
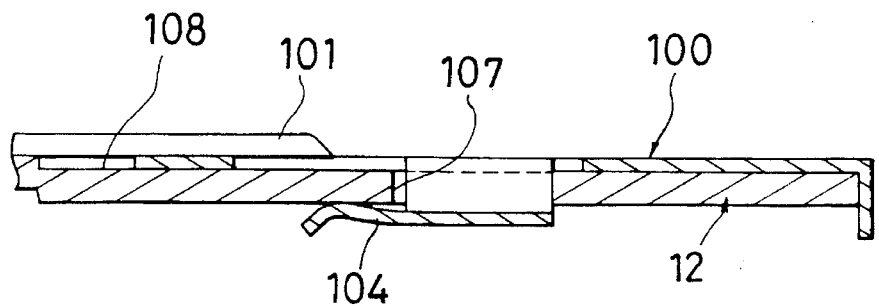
FIG. 50 is a partial cross sectional view taken along the line L—L of FIG. 47.

Next, referring to FIGS. 47 to 50, attachment of the cap 100 will be explained. FIG. 47 is a plan view illustrating attachment of the cap 100 to the cover 12 according to this embodiment. FIG. 48 is a partial cross sectional view taken along the line XLVIII—XLVIII of FIG. 47. FIG. 49 is a partial cross sectional view taken along the line IL—IL of FIG. 47. FIG. 50 is a partial cross sectional view taken along the line L—L of FIG. 47. In the arrangement shown in FIGS. 47 to 50, ear portions 102 (four), 103 (one), and 104 (one) for engagement are formed in a circumferential portion of the cap 100 by a notch pressing or the like. On the other hand, the cover 12 is formed with attachment apertures 105 (four), 106 (one), and 107 (one) for inserting the ear portions 102, 103 and 104, respectively, at respective positions corresponding thereto. The cap 100 can be aligned and detachably fitted to the cover 12 by inserting the respective ear portions 102, 103 and 104 through the corresponding apertures 105, 106 and 107, and pressing the respective tip portions of the ear portions onto the lower surface of the cover 12 to bring them into engagement therewith by respective elastic forces of the ear portions themselves.

In a circumferential portion of the upper surface of the cover 12 where the cap 100 is to be fitted, there are formed a stepped down surface or bearing surface 108 in a depth substantially the same as the thickness of the cap 100. Provision of the bearing surface 108 avoids difference or unevenness in the height of the cover 12 except for the concave 101a even when the cap 100 is fitted to the cover 12, resulting in no substantial increase in the thickness of the disk drive.

The arrangement shown in FIGS. 44 to 50 makes it possible to readjust the components through the aperture 99 after having detachably fitted the cover 12, which has a reinforcing function, to the base 10 because the cover 12 is formed with the aperture 99 to which is detachably fitted the cap 100 as a separate part. This improves the operability of assembling, service and inspection of the disk drive. Further, the provision of the concave portion 101a in the detachable cap 100 on the lower surface of thereof corresponding to the head arm 72 gives rise to an additional space for housing the head arm, thus reducing the substantial thickness of the disk drive from the base 10 to the cover 12 and making for thinness or compactness of the disk drive. The inner surface of the concave 101a of they cap 100 can be used as a stopper surface which the head arm 72 contact slidably when it is raised. This also adds to a further thinning of the disk drive.

NINTH EXAMPLE

Figure 51:
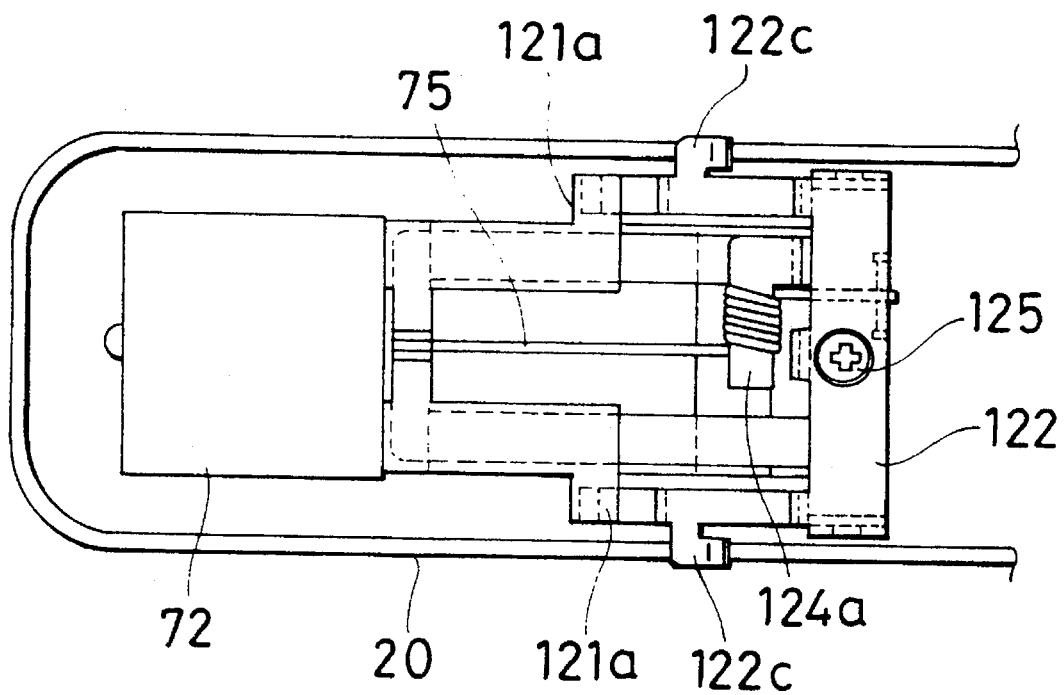
FIG. 51 is a top plan view showing the major portion of a ninth example of a disk drive in accordance with the present invention.
Figure 52:
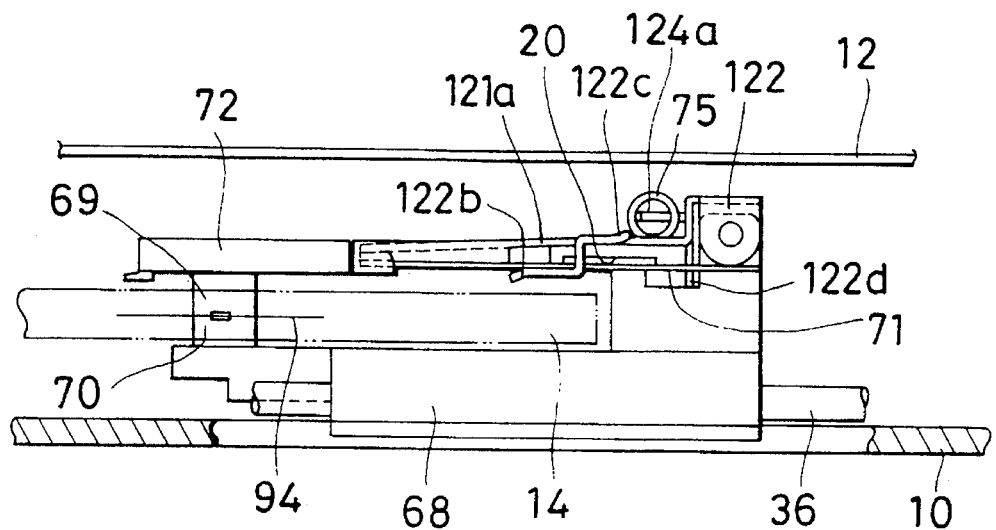
FIG. 52 is a partial side view of the disk drive of FIG. 51, with the side wall of the base removed, illustrating a head loaded state.
Figure 53:
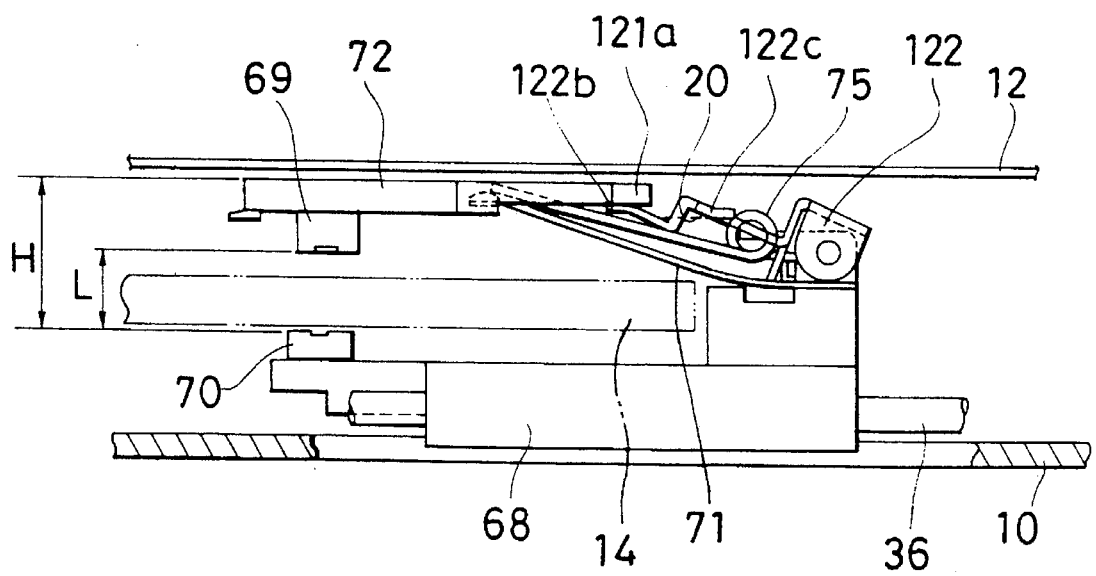
FIG. 53 is a partial side view of the disk drive of FIG. 51, with the side wall of the base removed, illustrating a head unloaded state.
Figure 54A:
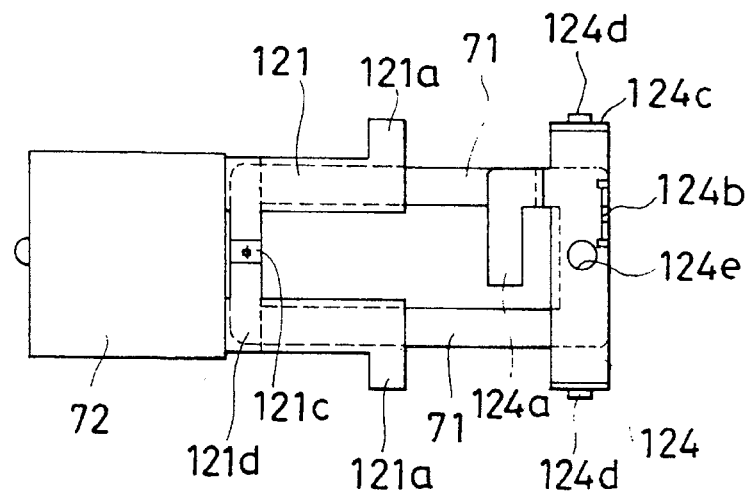
FIGS. 54A, 54B and 54C are a plan view, a front view, and a side view, respectively, of the head arm shown in FIGS. 51 to 53.
Figure 54B:
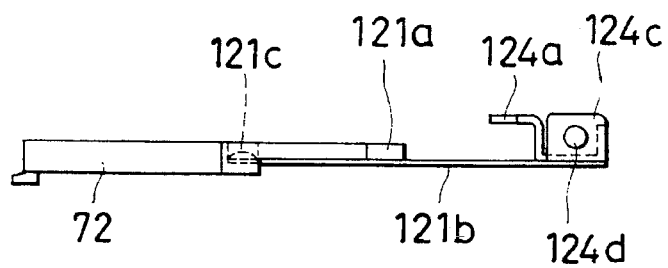
Figure 54C:
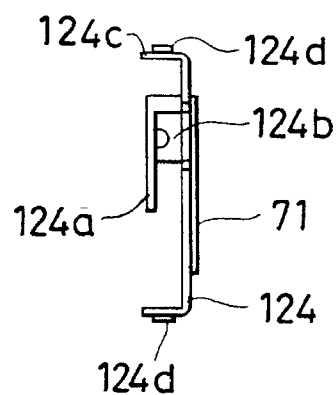
Figure 55A:
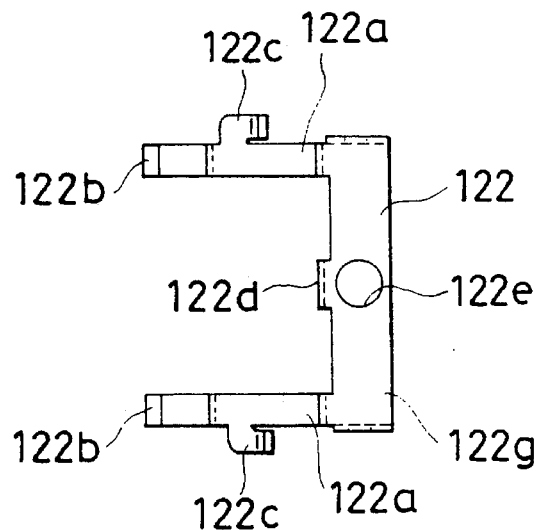
FIGS. 55A, 55B and 55C are a plan view, a front view, and a side view, respectively, of the lifter shown in FIGS. 51 to 53.
Figure 55B:
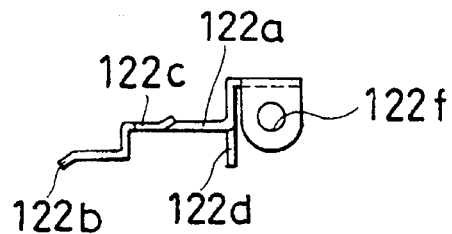
Figure 55C:
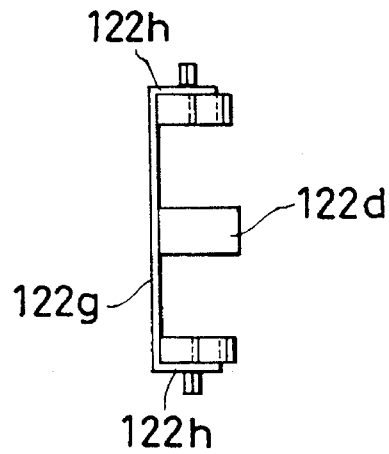

FIG. 51 is a plan view showing the major portion of an embodiment of a disk drive in accordance with the present invention. FIG. 52 is a partial side view of the disk drive shown in FIG. 51, illustrating a head loaded state. FIG. 53 is a partial side view of the disk drive shown in FIG. 51, illustrating a head unloaded state. FIG. 54A is a plan view showing the head arm used in the arrangement shown in FIGS. 51 to 53. FIG. 54B is a front view of the head arm shown in FIG. 54A. FIG. 54C is a side view of the head arm shown in FIG. 54A. FIG. 55A is a plan view showing the lifter used in the arrangement shown in FIGS. 51 to 53. FIG. 55B is a front view of the lifter shown in FIG. 55A. FIG. 55C is a side view of the lifter shown in FIG. 55A. Those parts or components not shown in FIGS. 51A to 55C are the same as corresponding ones used in the preceding examples as far as is applicable, or alternatively, the same as those used in conventional disk drives, and detailed explanation thereon will be omitted here.

In the arrangement shown in FIGS. 51A to 55C, the head arm 72 comprises a support member 121, the leaf spring 71, and a holder 124. The support member has a front portion bearing thereon the first head or upper head 69, and a rear portion formed with a rectangular cutout so as to be of a substantially U-shape. At each end of the rear portion is provided a lateral bracket 121a extending laterally and outward. The leaf spring 71, which extends rearward from the head arm 72, resiliently links the support member and the holder. One end of the leaf spring 71 serves as a support member fixing portion 121d, which is inserted in or otherwise fixed to the support member 121, and another end of the leaf spring is fixed to the holder 124 by spot welding or the like. The brackets 121a are situated in the rear of the support member fixing portion 121d of the leaf spring 71, i.e., on the side of the holder 124. As shown in FIG. 54C, the holder 124 has a generally U-shaped form and has on its front end (left end in FIG. 54A) a bracket 124a for supporting a coil portion of a spring 75 described hereinafter, and on its rear end (right end in FIG. 54A) an engaging portion 124b for supporting one end of the spring 75. The holder 124 has a bent portion 124c on each side thereof, each of the bent portions 124c having an embossment 124d.

A supporting portion 121c is provided near the supporting member fixing portion 121d of the leaf spring 71. The supporting portion 121c is circular in cross section and engaged with the other end of the spring 75.

As shown in FIGS. 55A, 55B and 55C, the lifter 122 has a base 122g, which is bent at both ends to form a generally U-shaped structure (FIG. 55C). Bent portions 122h is formed with a hole 122f as shown in FIG. 55B. The hole engages the embossment 124c of the holder 124. The base 122g has on each end thereof a bracket 122a extending forward (on the left side in FIG. 55A and 55B), the bracket 122a being generally perpendicular to the bent portion 122h. Each bracket 122a has at its distal end a slant portion 122b, which is positioned so that it can engage with the bracket 121a of the head arm 72. At its almost middle portion, each bracket 122a has a protrusion 122c which engages with the cassette guide 20. The base 122b has a stopper 122d in the center thereof, extending downward from the front end of the base 122g.

The first or upper head 69 and the second or lower head 70 are fixed to and supported by the head arm 72 and the carriage 68, respectively. The head arm 72 and the carriage 68 are connected to each other with a screw 125. The coil portion of the spring 75 engages the bracket 124a of the holder 124 by inserting the bracket 124a in the coil portion while the rear end of the spring 75 engages in a groove formed in the engaging portion 124b at its upper end. The other end of the spring engages the supporting portion 121c of the hear arm 72. In this state, the spring 75 urges the head arm 72 toward the lower head 70.

The lifter 122 is assembled by engaging the embossment 124c of the holder 124 in the hole 122f and also engaging the slant portion 122b with the bracket 121a of the head arm 72. The lifter 122 is rotatable around the embossment 124c. In the head loaded state as shown in FIG. 52, the stopper 122d of the lifter 122 contacts the carriage 68 and the lifter 122 is held horizontally. In this occasion, a slight gap is present between the slant portion 122 and the bracket 121a. In the state where the lifter 122 is assembled, the protrusion 122c of the lifter 122 is situated at a position allowing it to engage the cassette guide 20 as shown in FIG. 51. On the other hand, in the head loaded state, the protrusions 122c are not in contact with the cassette guide 20.

FIG. 53 illustrates the head non-loaded state. The action of ejecting the cassette guide 20 elevates the cassette guide 20 to engage it with the protrusions 122c of the lifter 122, thus rotating the lifter 122 clockwise in FIG. 53. After the rotation, the slant portion 122b engages the bracket 121a of the head arm 72, and the head arm 72 is lifted by being translated upward and substantially parallel according as the lifter 75 is rotated clockwise. In the state where the ejection of the cassette 14 is over, the upper head 69 and the lower head 70 are positioned with a predetermined distance or gap L, and the head arm 72 is held substantially horizontally. As a result, the heads 69 and 70 oppose one another substantially in a horizontal state.

In the arrangement shown in FIGS. 51 to 55C, the lift amount of the cassette guide can be set up freely by shifting the position of the protrusion 122c of the lifter 122.

TENTH EXAMPLE

Figure 56:
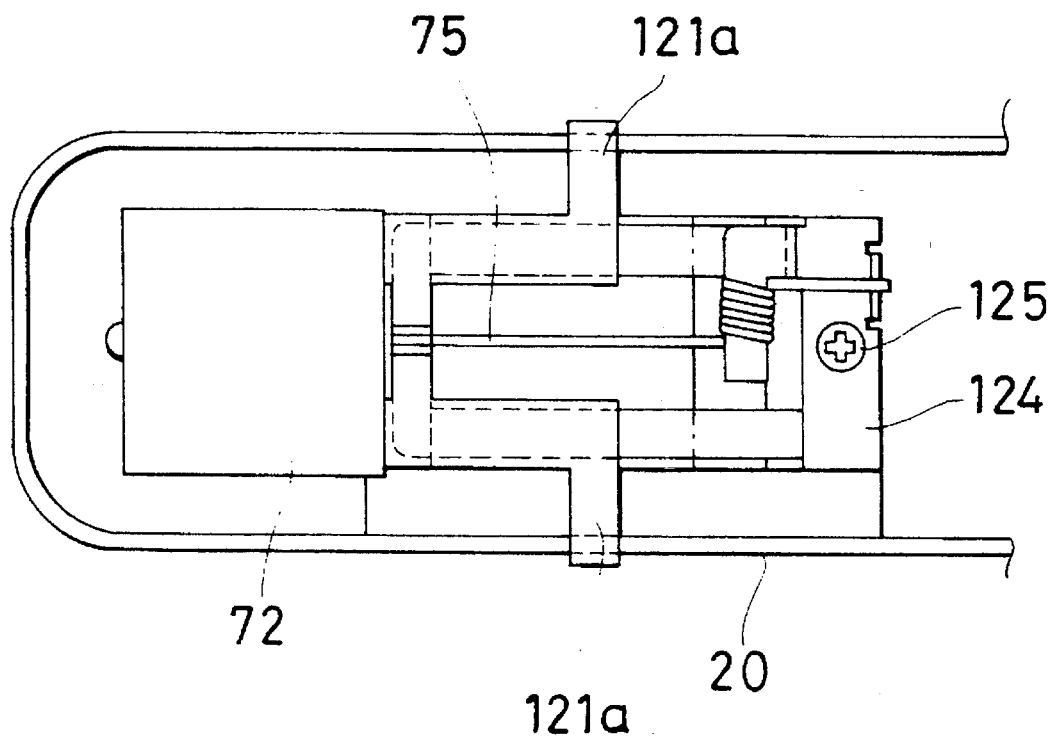
FIG. 56 is a top plan view showing the major portion of a tenth example of a disk drive in accordance with the present invention.
Figure 57:
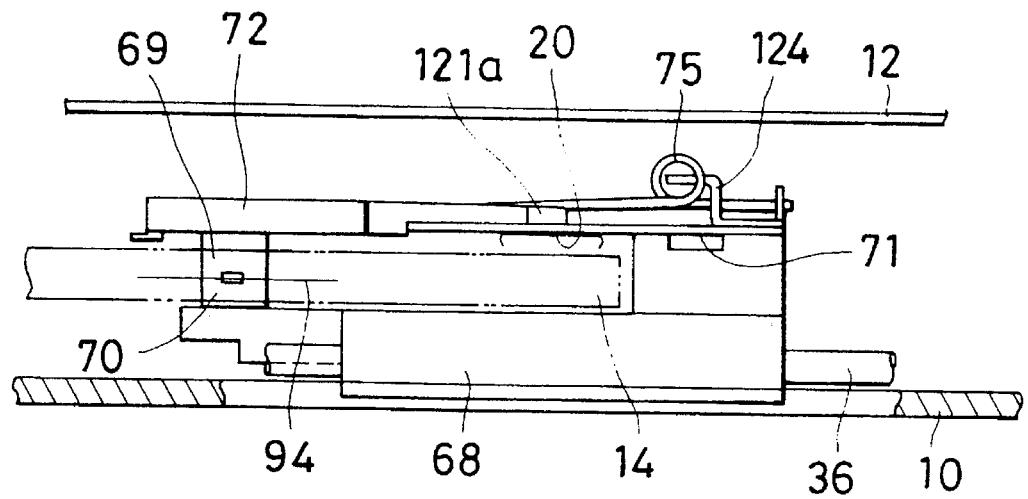
FIG. 57 is a partial side view of the disk drive of FIG. 56, with the side wall of the base removed, illustrating a head loaded state.
Figure 58:
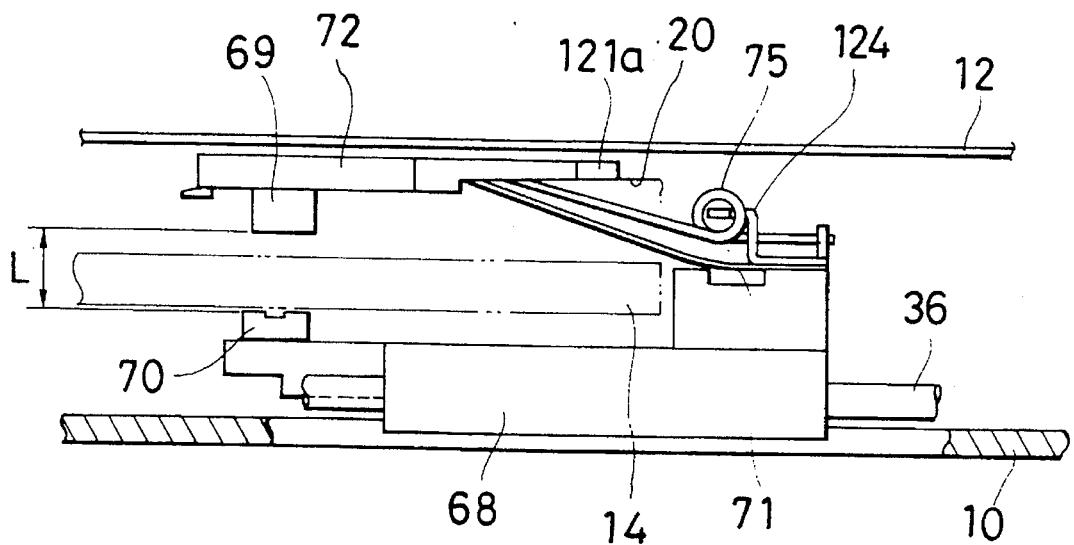
FIG. 58 is a partial side view of the disk drive of FIG. 56, with the side wall of the base removed, illustrating a head unloaded state.

FIG. 56 is a plan view showing the major portion of an embodiment of a disk drive in accordance with the present invention. FIG. 57 is a partial side view of the disk drive shown in FIG. 56, illustrating a head loaded state. FIG. 58 is a partial side view of the disk drive shown in FIG. 56, illustrating a head unloaded state. The arrangement shown in FIGS. 56 to 57 differs from the arrangement shown in FIGS. 51A to 55C in that no lifter 122 is used but the head arm 72 is lifted directly by the cassette guide 20.

As shown in FIG. 56, the bracket 121a of the head arm 72 extends to such an extent that it can contact the cassette guide 20. Hence, the upward force urged by the cassette guide 20 on the bracket 121a to lift it changes the head loaded state as shown in FIG. 57 to the head non-loaded state shown in FIG. 58.

In the arrangement shown in FIGS. 56 to 58, the amount of lift of the cassette guide 20 need be substantially equal to the predetermined gap, L, between the upper head 69 and the lower head 70.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A disk drive for recording data on and/or reproducing data from a disk comprising:

a base provided with a top opening and a front opening;

a cassette guide member housed in said base, said cassette guide member being supported so as to be freely movable upward and downward between an upper position, where said disk is to be installed on or removed from said disk drive, and a lower position, where said disk is to be loaded at a predetermined loading position;

a head unit housed in said base and having a head for recording data on and/or reproducing data from said disk, and a head arm having first and second end portions, said first end portion supporting said head;

a carriage movably supporting said second end portion of said head arm on one end thereof;

a resilient member connected on one end thereof to said head arm, and on another end thereof to said carriage, said head arm being resiliently movable upward and downward relative to said carriage;

pushing means for pushing said head arm downward relative to said carriage; and lifting means provided on said cassette guide member for elevating and lowering said head arm, said lifting means comprising:

an upper surface of said cassette guide member, and a lifter portion disposed between a position of said head arm where said pushing means pushes and said second end portion of said head arm on said head arm, said lifter portion having a contact surface parallel to said upper surface of said cassette guide member, when said head arm is located at said upper position and contacting said upper surface of said cassette guide member when said head arm is moved to said upper portion.

2. A disk drive as claimed in claim 1, wherein said contact surface of said lifter portion has a pair of protrusions, said protrusions being spaced apart at a predetermined distance in a longitudinal direction of said resilient member.

3. A disk drive as claimed in claim 1, wherein said head arm has an upper surface which is substantially parallel to said contact surface of said lifter portion.

4. A disk drive as claimed in claim 1, wherein said cassette guide member has a side wall formed with a concave portion and having an outer surface, and wherein said disk drive further comprises:

a slide member having an outer surface and an engage portion which engages with said cassette guide member to move said cassette guide member in response to installation or removal of said disk, said engage portion being disposed in said concave portion formed in said side wall of said cassette guide member, said outer surface of the side wall of said cassette guide member being substantially coplanar with said outer surface of a side wall of said slide member.

5. A disk drive as claimed in claim 4, wherein said engage portion is an upright portion which is formed at a side end portion of said slide plate, and at which a cam slot for fitting with a pin provided at said cassette guide member is formed.

6. A disk drive as claimed in claim 4, wherein said engage portion is an upright plate which is formed at a side end portion of said slide plate, and at an upper portion of which a cam slot for fitting with a pin provided at a top of said cassette guide member, is formed.

7. A disk drive as claimed in claim 4, wherein said engage portion engages said cassette guide member at an upper portion of said cassette guide member.

8. A disk drive as claimed in claim 5, wherein said engage portion engages said cam slot at an upper portion of said cassette guide member.

9. A disk drive as claimed in claim 1, wherein said cassette guide member has a side wall formed with a concave portion and having an outer surface, and wherein said disk drive further comprises:

a slide member having an outer surface and an engage portion which engages with said cassette guide member so as to move said cassette guide member in response to the installation or the removal of said disk, said engage portion being disposed in said concave portion formed in said side wall of said cassette guide member, said outer surface of the side wall of said cassette guide member being substantially coplanar with said outer surface of a side wall of said slide member.

10. A disk drive as claimed in claim 9, wherein said engage portion is an upright portion which is formed at a side end portion of said slide plate, and at which a cam slot for fitting with a pin provided at said cassette guide member is formed.

11. A disk drive as claimed in claim 9, wherein said engage portion is an upright plate which is formed at a side end portion of said slide plate, and at an upper portion of which a cam slot for fitting with a pin provided at a top of said cassette guide member, is formed.

12. A disk drive as claimed in claim 9, wherein said engage portion engages said cassette guide member at an upper portion of said cassette guide member.

13. A disk drive as claimed in claim 10, wherein said engage portion engages said cam slot at an upper portion of said cassette guide member.

14. A disk drive for recording data on and/or reproducing data from a disk, comprising:

a base;

a cover detachably connected to said base for covering said top opening of said base;

a cassette guide member housed in said base, said cassette guide member being supported so as to be freely movable upward and downward between an upper position, where said disk is to be installed on or removed from said disk drive, and a lower position, where said disk is to be loaded at a predetermined loading position;

a head unit housed in said base and having a head for recording data on and/or reproducing data from said disk, and a head arm having first and second end portions, said first end portion supporting said head;

a carriage supporting said second end portion of said head arm on one end thereof;

pushing means for pushing said head arm downward relative to said carriage; and a lifting means provided on said cassette guide member for elevating and lowering said head arm, said lifting means comprising:

an upper surface of said cassette guide member; and an engaging portion disposed between a position of said head arm where said pushing means pushes and said second end portion of said head arm on said head arm, said engaging portion having an engaging surface parallel to said upper surface of said cassette guide member, when said head arm is located at said upper position and engaging said upper surface of said cassette guide member when said head arm is moved to said upper position by said lifting means.

15. A disk drive as claimed in claim 14, wherein said engaging portion is provided on both sides of said head arm, and wherein said upper surface of said cassette guide member contacts said engaging surface of said engaging portion opposing said upper surface of said cassette guide member parallel thereto, when said head arm is in said upper position, thereby controlling a height and angle of said head arm.

16. A disk drive as claimed in claim 14, wherein said upper surface of said cassette guide member contacts said engaging surface of said engaging portion opposing said upper surface of said cassette guide member parallel there to, when said head arm is in said upper position, thereby controlling a height and angle of said head arm so that said head arm is supported substantially parallel to said inner surface of said cover.

* * * * *